United States Patent [19]
Yamada et al.

[11] Patent Number: 5,983,029
[45] Date of Patent: *Nov. 9, 1999

[54] OPTICAL APPARATUS EQUIPPED WITH SIGHT LINE DETECTOR

[75] Inventors: Akira Yamada; Keiji Nagata; Yoshiaki Irie, all of Yokohama; Akihiko Nagano, Ichihara, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/871,847

[22] Filed: Jun. 9, 1997

Related U.S. Application Data

[63] Continuation of application No. 08/712,000, Sep. 10, 1996, abandoned, which is a continuation of application No. 08/577,475, Dec. 22, 1995, abandoned, which is a division of application No. 08/425,776, Apr. 20, 1995, Pat. No. 5,696,998, which is a continuation-in-part of application No. 08/069,828, Jun. 1, 1993, abandoned.

[30] Foreign Application Priority Data

| Jun. 2, 1992 | [JP] | Japan | 4-167014 |
| Jul. 16, 1992 | [JP] | Japan | 4-213795 |
| Sep. 7, 1992 | [JP] | Japan | 4-262748 |
| Sep. 7, 1992 | [JP] | Japan | 4-264294 |

[51] Int. Cl.⁶ ............................. G03B 17/00; G03B 17/18
[52] U.S. Cl. ............................. 396/51; 396/121; 396/147; 396/282
[58] Field of Search ........................... 396/51, 121, 147, 396/282

[56] References Cited

U.S. PATENT DOCUMENTS

| 3,864,030 | 2/1975 | Cornsweet | 351/7 |
| 4,006,485 | 2/1977 | Yamanishi et al. | 396/282 |
| 4,557,578 | 12/1985 | Seely | 396/147 |
| 4,754,296 | 6/1988 | Neely | 396/147 |
| 4,950,069 | 8/1990 | Hutchinson | 354/62 X |
| 5,036,347 | 7/1991 | Tsunekawa et al. | 354/400 |
| 5,182,443 | 1/1993 | Suda et al. | 250/201 |
| 5,214,466 | 5/1993 | Nagano et al. | 354/219 X |
| 5,225,862 | 7/1993 | Nagano et al. | 354/62 |
| 5,235,380 | 8/1993 | Yamada et al. | 354/409 X |
| 5,245,371 | 9/1993 | Nagano et al. | 354/62 |
| 5,245,381 | 9/1993 | Takagi et al. | 354/219 X |
| 5,253,008 | 10/1993 | Konishi et al. | 354/432 X |
| 5,260,734 | 11/1993 | Shindo | 354/219 |
| 5,262,807 | 11/1993 | Shindo | 351/210 |
| 5,280,312 | 1/1994 | Yamada et al. | 351/211 |
| 5,298,927 | 3/1994 | Konishi et al. | 351/211 |
| 5,335,035 | 8/1994 | Maeda | 354/219 |
| 5,386,258 | 1/1995 | Nagano | 354/400 |

FOREIGN PATENT DOCUMENTS

| 0480774 | 4/1992 | European Pat. Off. . |
| 4034958 | 5/1991 | Germany . |
| 4205350 | 8/1992 | Germany . |
| 1-190177 | 7/1989 | Japan ........................... H04N 5/232 |
| 1-274736 | 11/1989 | Japan . |
| 3-11492 | 1/1991 | Japan . |
| 3-107909 | 5/1991 | Japan . |
| 4-138432 | 5/1992 | Japan . |
| 4-242630 | 8/1992 | Japan . |
| 1380355 | 1/1975 | United Kingdom . |
| 2117594 | 10/1983 | United Kingdom . |
| 2177276 | 1/1987 | United Kingdom . |

Primary Examiner—W. B. Perkey
Attorney, Agent, or Firm—Fitzpatrick, Cella, Harper & Scinto

[57] ABSTRACT

An optical apparatus including a detecting unit for detecting sight line direction of a human eye, a correcting data forming unit, electrically connected to the detecting unit, for forming correcting data as to personal difference of a human eye, a visual mark presenting unit electrically coupled to the correcting data forming unit for presenting a plurality of focus point detecting frames for sampling correcting data at different positions in a visual field and being capable of flickering and lighting without flickering, and a control unit for controlling the apparatus on the basis of the sight line direction and the correcting data.

22 Claims, 47 Drawing Sheets

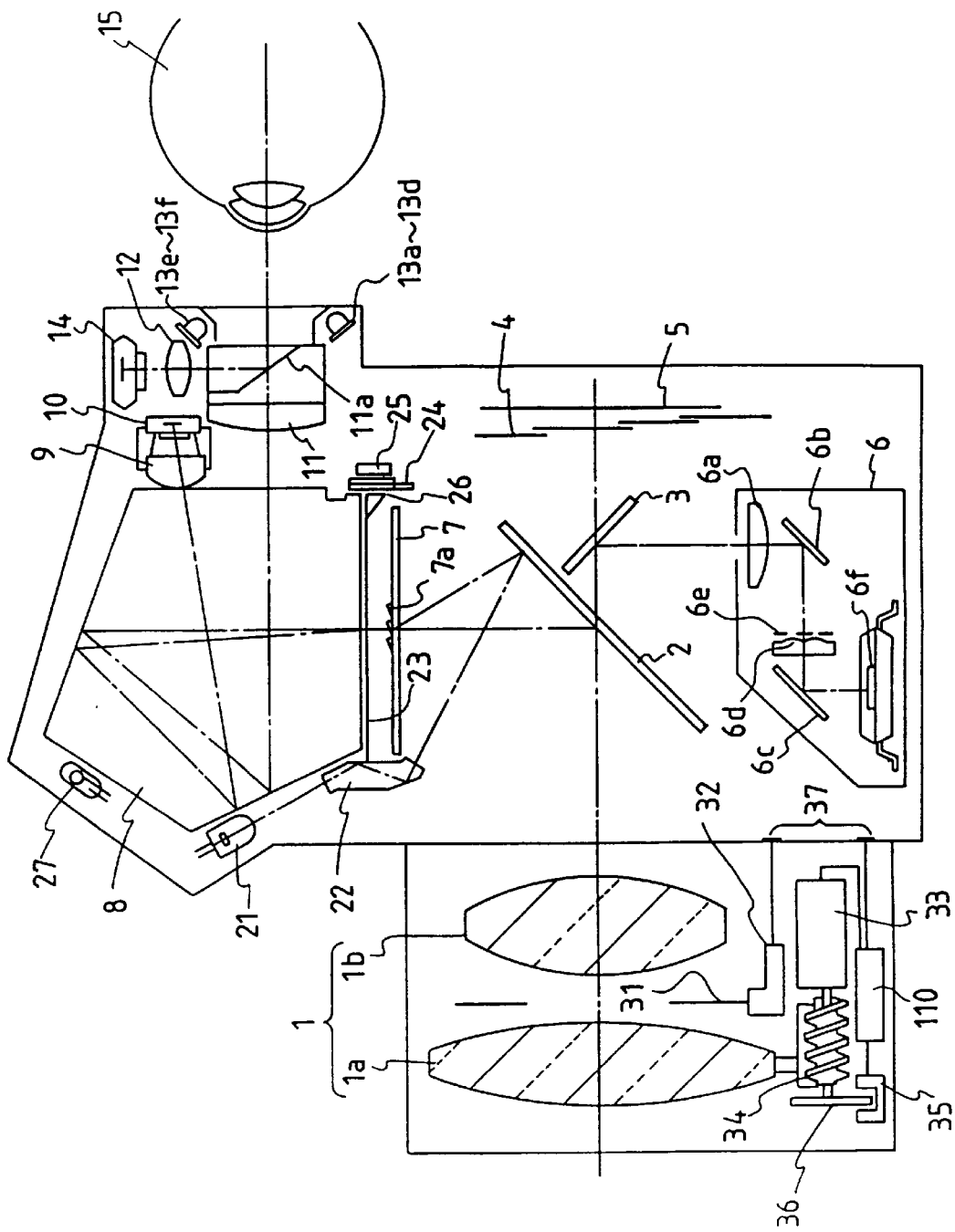

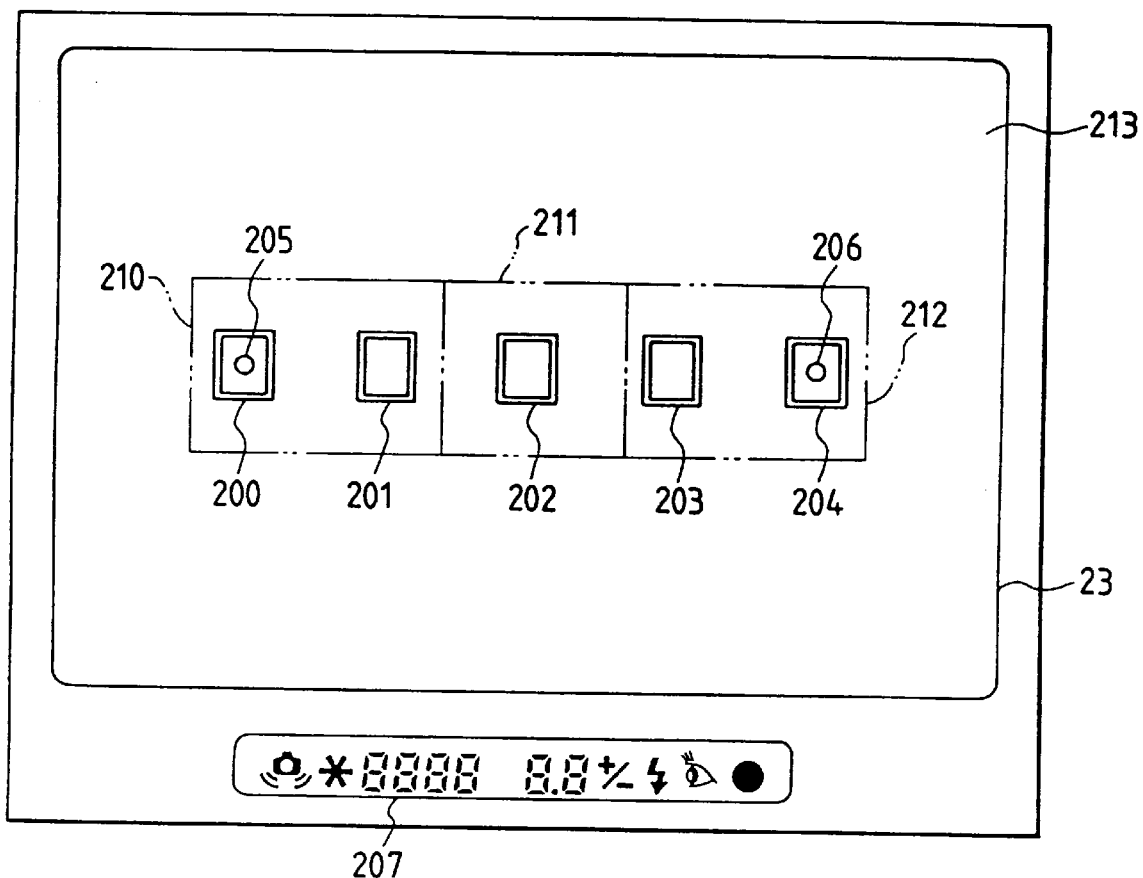

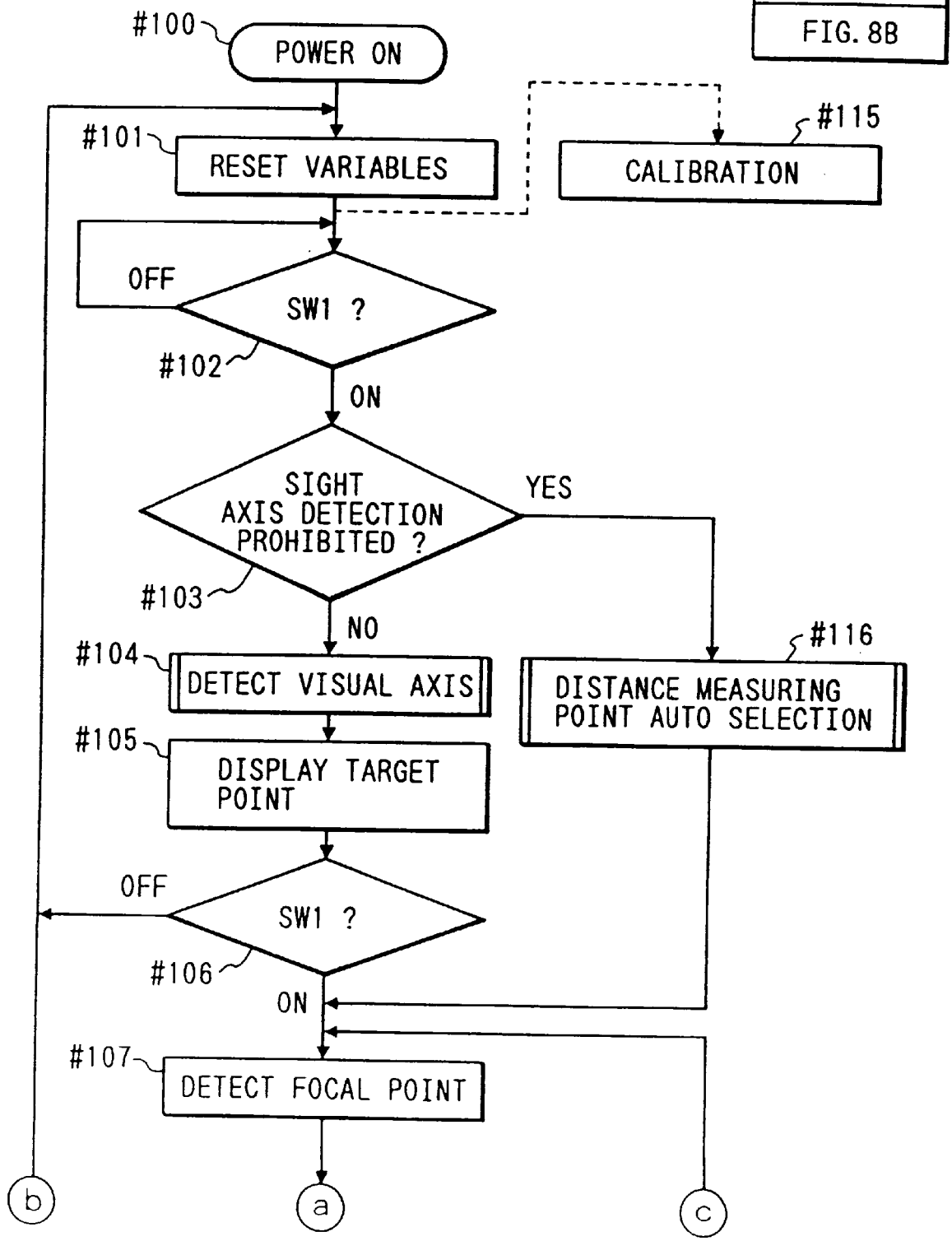

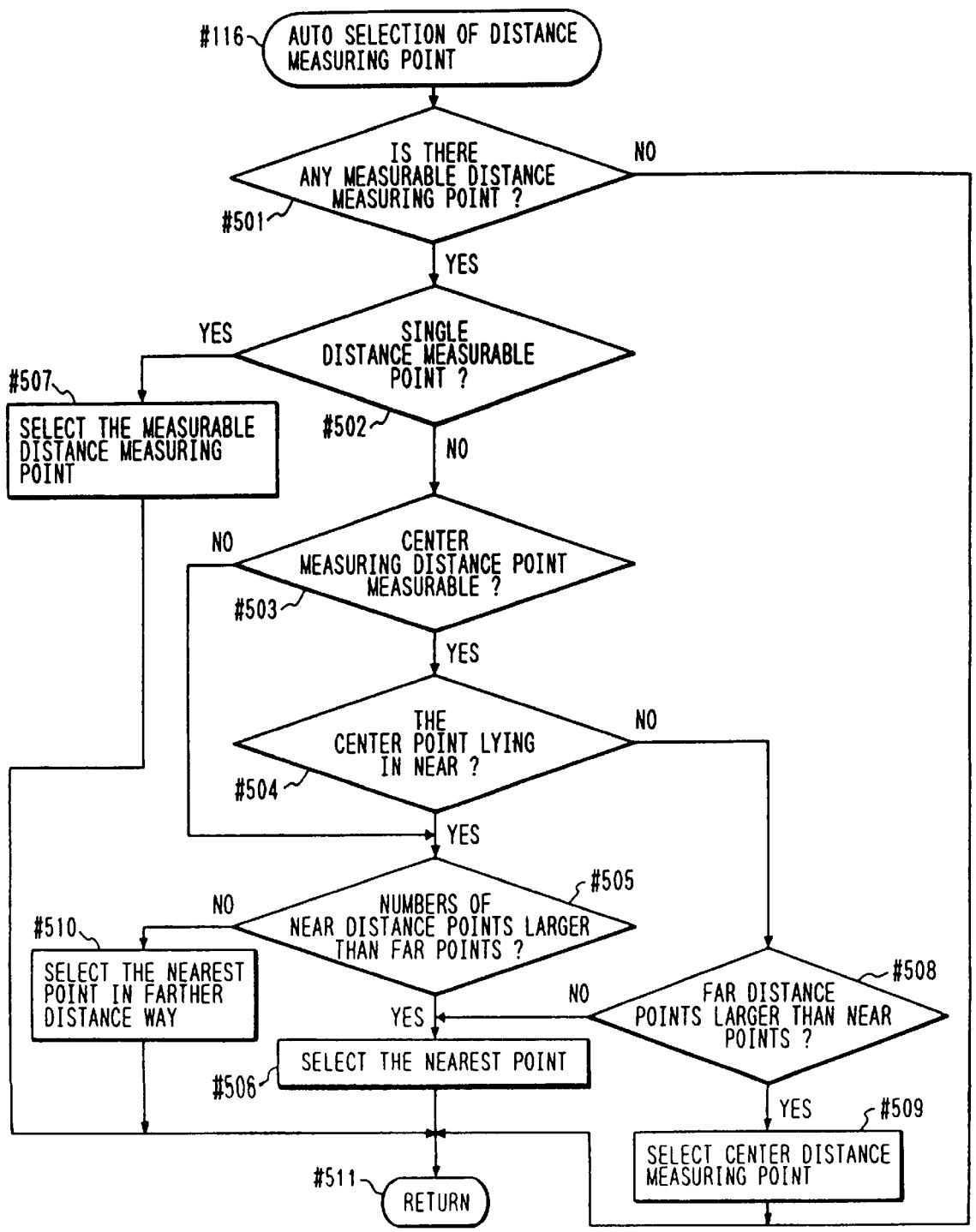

OPTICAL APPARATUS EQUIPPED WITH SIGHT LINE DETECTOR

This application is a continuation of application Ser. No. 08/712,000, filed Sep. 10, 1996, now abandoned, which is a continuation of application Ser. No. 08/577,475, filed Dec. 22, 1995, now abandoned, which is a divisional of application Ser. No. 08/425,776, filed Apr. 20, 1995, now U.S. Pat. No. 5,696,998, which is a continuation of application Ser. No. 08/069,828, filed Jun. 1, 1993, now abandoned.

BACKGROUND OF THE INVENTION

1. Field of the Invention

The present invention relates to an optical apparatus equipped with a sight line detector, and more particularly to an optical apparatus equipped with a sight line detector for detecting an axis in the direction of a visual point, so-called sight line (sighting axis) at which an observer's (photographer's) eyes are turned through a finder system on an observing plane (focusing plane) on which an object image is formed by an imaging system making use of a reflected image of eyes obtained when the observer's eyes are illuminated.

2. Related Background Art

Heretofore, a variety of apparatuses for detecting so-called sight line (sighting axis) (e.g. eye camera) have been proposed for determining the position on an observing plane at which an observer's eyes are turned.

For example, in Japanese Patent Application Laid-Open No. 1-274736, a parallel light flux is projected from a light source onto a front eye portion of an observer's eye, and then a sighting axis is obtained from a cornea-reflected image formed by the reflected light from the cornea and an imaging position of the pupil.

Further, the present applicant has proposed an optical apparatus equipped with a sight line detector capable of calibrating a sight line for offsetting the difference in the sight line between observers in Japanese Patent Application Laid-Open No. 3-11492.

FIG. 34 is an explanatory view for the principles of a well known sight line detecting method. In FIG. 34, the numerals 13a, 13b designate light sources such as LED emitting infrared light that is not sensed by the observers. The light sources 13a, 13b are substantially symmetrically disposed in the x direction with respect to the optical axis of a light-receiving lens 12 to illuminate eyes 15 of the observer. A part of the light reflected from the eye 15 is then collected to an image sensor 14 through the light-receiving lens 12.

FIG. 33A is a schematic view showing an eye image projected onto the image sensor 14, while FIG. 33B is a graphic diagram showing an intensity of output signal from the image sensor in FIG. 34. A method of detecting the sight line will now be described with reference to these Figures.

The infrared light emitted from the light source 13b illumintes the cornea 16 of the observer's eye 15. At this time, a cornea-reflected image d (virtual image) is collected through the light-receiving lens 12 and then imaged at a position d' on the image sensor 14.

In the same manner, the infrared light emitted from the light source 13a illuminates the cornea 16 of the eye 15. At this time, a cornea-reflected image e formed by a part of the infrared light reflected on the surface of the cornea 16 is collected through the light-receiving lens 12 and then imaged at a position e' on the image sensor 14. Further, the light flux from the end portions a and b of iris 17 act to make an image of the end portions a and b at positions a' and b' not shown on the image sensor 14 through the light-receiving lens 12.

When a rotational angle of an optical axis of the eye 15 with respect to the optical axis of the light-receiving lens 12 is small, coordinates xc of a central position c of the pupil 19 can be expressed as follows:

$$xc \approx (xa+xb)/2$$

where xa, xb: x coordinates of the end portions a and b respectively of the iris 17.

Further, the x coordinates of the central point of the cornea-reflected image d and e are substantially accorded with the x coordinates xo of a center of curvature O of the cornea 16. Therefore, with the x coordinates of the cornea-reflected image generating positions d and e as xd and xe, a standard distance from a center of curvature O of the cornea 16 to the center C of the pupil 19 as OC, and a factor for correcting the personal errors for the distance OC (sight line correcting factor) as A, the rotational angle θ of the optical axis 15a of the eye 15 will substantially meet the following relational equation:

$$(A*OC)*\text{SIN } \theta \approx xc-(xd+xe)/2 \quad (1)$$

where the mark * stands for multiplication.

Therefore, as shown in FIG. 34, the rotational angle of the optical axis 15a of the eye 15 can be obtained by detecting the position of the characteristic points (cornea reflected images d, e and iris end portions a, b) of the eye 15 projected onto the image sensor 14. The equation (1) can be substituted by the following equation (2):

$$\beta*(A*OC)*\text{SIN } \theta \approx (xa'+xb')/2-(xd'+xe')/2 \quad (2)$$

where β stands for magnification determined by the position of the eye 15 with respect to the light-receiving lens 12 and is practically calculated as a function of a space |xd'-xe'| of the cornea reflected image.

The rotational angle of the optical axis of the eye 15 can be represented as:

$$\theta = ARC*\text{SIN } \{(xc'-xf')/\beta/(A*OC)\} \quad (3)$$

where $$xc' \approx (xa'+xb')/2$$
$$xf' \approx (xd'+xe')/2$$

The optical axis 15a and the sighting axis of the observer's eye 15 are not accorded. Therefore, if the rotational angle θ in the horizontal direction of the optical axis of the observer's eye is calculated, the sight line θx in the horizontal direction of the observer can be obtained by correcting the angle difference δ between the optical axis and sighting axis of the observer's eye.

The sight line θx in the horizontal direction of the observer can be expressed as follows:

$$\theta x = \theta \pm (B*\delta) \quad (4)$$

where B: a factor (sight line correcting factor) for compensating personal error for a correcting angle for the optical axis and the sighting axis of the eye. As to the code "±", if the rotational angle toward the right with respect to the observer is supposed to be positive, it would be "+" when the observer's eye viewing the observing device (finder system) is his left eye, while it would be "−" in the case of the right eye.

Although FIG. 34 illustrates a case of the observer's eye rotating in z–x plane (e.g. horizontal plane), the same detection can be achieved also in the case of it rotating in y–z plane (e.g. vertical plane). In this case, however, the vertical component of the observer's sight line is accorded with the vertical component (not shown) of the optical axis of the eye, such that the sight line θy in the horizontal direction would be expressed as follows:

$$\theta y = \theta'$$

In the case of the observer viewing a finder of an optical apparatus, a position (xn, yn) on a focusing plate can be obtained from the sight line data θx, θy as follows:

$$xn \simeq m * \theta x \qquad (5)$$
$$\simeq m * [ARC * SIN\{(xc' - xf')/\beta/(A*OC)\} \pm (B*\delta)]$$

$$yn \simeq m * \theta y$$

where m: a constant depending on the finder optical system of the camera.

In this case, since there are two factors A and B for compensating the personal error in the sight line, it is possible to calculate these factors A and B from the rotational angle of the observer's eye when the observer looks at two visual marks at different positions.

The factors A and B typically correspond to the rotational angle in the horizontal direction of the observer's eye, so the two visual marks provided in the finder of the camera are set to be horizontal with respect to the observer.

Upon determination of the factors A and B and the position on the focusing plate of the sight line of the observer viewing the finder system, the sight line information can be used for the focusing adjustment or the exposure control of the lens.

It is generally not so easy to accurately detect the sight line of the photographer who is viewing the field of view of the finder and to perform photographic control with simplified entire apparatus structure, because of the reasons described below.

For example, if the photographer wears spectacles with high surface reflecting rate, the sight line detecting accuracy would be degraded by the reflected light from the eye when the eye is illuminated by the light flux from a high-lightness object (light source or sunlight) existing in the field of view of the finder, due to the undesirable effect of the ghost generated from the reflected light from the spectacles.

The sight line could not be detected in such cases as: any extremely high-lightness object appears in the field of view of the finder such that the photographer sometimes instantaneously closes his eyes; and the photographer's sight line quickly moves to follow to any high-speed moving object.

In recent years, there have been proposed a variety of cameras incorporating a multiple detecting area-type automatic focus detecting means being capable of automatically detecting focus at a plurality of detecting areas in the field of view of the finder. In this type of camera, the detecting area is previously limited in the photographic screen. Unless the area based on the sight line information from the sight line detecting means is accorded with the detecting area, therefore, the automatic focus detection cannot be carried out on the basis of the sight line information.

In compensating the personal error in the sight line detection of the eyes of the photographers, if any of the previously set correcting values cannot be fit to the photographer, this would cause a detection error leading to an undesirable photographic operation.

There is another method in which a plurality of data for correcting the personal error are stored in the memory means such that many and unspecified persons can operate. This method, however, has such disadvantages that the photographer and the correcting data cannot easily corresponded one to one, and that the memory capacity is restricted.

Further, there is also an alternative method in which data for correcting the personal error in the sight line direction are collected (hereinafter referred to as "calibration"). In this method, it is necessary to newly provide operating means for performing the calibration and the sight line detection, thereby complicating the entire apparatus.

Thus, in cameras having sight line detecting means, the sight line information is sometimes inaccurate or unobtainable. In such a case, the photographer cannot photograph as desired so as not to obtain a desired image.

Meanwhile, the magnitude of the pupil of the observer changes depending on the environmental lightness or his psycological condition. Also, the central position (c) of the pupil and the positions of the Purkinje image (d, e) vary depending on the magnitude of the pupil.

FIG. 35 is an explanatory vies for showing a relationship between the pupil diameter rp of the observer i.e., the environmental lightness function, and the position xn at which the eye is turned. The position xn is calculated by the conventional sight line calculating method. When the observer's pupil diameter rp varies in such a manner, the calculated point xp would be changed in accordance therewith even if the observer is viewing the same fixed target. Therefore, the sight line detecting accuracy would be degraded.

For enhancing the detection accuracy, the sight line must be corrected at every change of the observing condition of the observer i.e. the environmental lightness, this would easily disturb the operational property of the camera.

SUMMARY OF THE INVENTION

It is therefore an object of the present invention to provide a sight line detector or an optical apparatus equipped with a sight line detector which is capable of absorbing any inconvenience occurring when practically used.

In the present invention, the use of the sight line photographing mode in which the optical apparatus is controlled on the basis of the sight line information from the sight line detecting means is restricted, so that it is possible to suitably select the sight line prohibiting photographing mode in which the controlling operation can be carried out without using any sight line information when the photographer is changed etc. As a result, it is possible to always provide images desired by the photographers.

The present invention further has another object of providing an optical apparatus having a sight line detecting means for always rendering images desired by the photographers, by informing the photographer whether the photographing operation is being carried out on the basis of the sight line information from the sight line detecting means.

It is another object of the present invention to provide an optical apparatus having a sight line detecting means capable of rendering desirable images based on a photographer's intention and of providing easy calibration and sight line detection even when the photographer is changed, by appropriately utilizing correcting data for correcting the personal error in detecting the sight line obtained by the sight line detection correcting means.

It is another object of the present invention to provide an optical apparatus having a sight line detecting device capable of correcting the error in detecting the sight line due to the environmental lightness around the photographer by using a properly established sight line detecting device, thereby enabling high-accuracy sight line detection.

Two visual marks used for calculating the factors A and B for correcting the personal errors in the sight line are disposed in the finder of the camera to be horizontal with respect to the eye of the observer generally when the observer is laterally holding the camera.

In the sight line correcting mode for providing sight line correcting data for correcting the personal sight line errors, it is effective to form the visual marks by use of a light source such as an LED such that the photographer can easily view the visual mark set in the finder. Even when the photographer sets the camera to the sight line correcting mode in which the light source such as the LED is turned on in the finder to be ready for detecting the sight line correcting data for the photographer, however, if the photographer leaves the camera as it is without performing any subsequent operations, the battery of the power source would be unnecessarily consumed to eventually make the camera itself inoperative due to the dead battery.

The present invention is aimed at providing an optical apparatus having a sight line detecting device, in which: a time counting means is provided in a part of the sight line detecting device; during the sight line correcting mode for correcting the personal error in detecting the sight line, the passed time is measured by the time counting means; setting the device to a waiting state while not displaying any information in the optical apparatus on the LED etc. to reduce the power consumption in the optical apparatus.

The present invention is further aimed at providing an optical apparatus having a sight line detecting device which is capable of always detecting the sight line at high accuracy by controlling the detection of the sight line correcting data by the sight line detecting means when the camera (optical apparatus) is longitudinally disposed.

When the sight line is calibrated to provide the correcting factor A and B of the photographer's sight line, the reliability of the resulting factors sometimes becomes low due to the undesirable ghost generated on the image sensor or due to the low contrast of the obtained eye image.

In such a case, the reliability of the sight line calculated by use of the correcting factor would correspondingly be lowered. Therefore, using thus obtained sight line information to control the camera would lead to erroneous operation.

Further, if the photographer wears spectacles, it would be effective to illuminate the eye from lateral side such that the illuminating light does not reach the image sensor even when reflected from the spectacles. If it is not known whether the photographer wears spectacles or not such that the photographer's eye wearing spectacles are illuminated from substantial front side, however, ghost would be generated by the reflected light from the spectacles to make the sight line detection unable.

What the present invention intends is to provide an optical apparatus having a sight line detecting device which is capable of accurately detecting the sight line by suitably using the sight line correcting data for correcting the personal error in detecting the sight line.

Undesirable ghost generated on the image sensor and lower contrast in the obtained eye image might make the resulting sight line correcting data erroneous or the errors too large. Using such sight line data to control the camera would cause mis-operation of the apparatus.

The present invention is aimed at providing a sight line detecting device which is capable of correctly controlling the optical apparatus by providing a sight line correcting means for correcting personal errors in detecting the sight line and a judging means for judging reliability of sight line correcting data calculated by the sight line correcting means, and determining the reliability of the sight line information in accordance with the reliability of the sight line correcting data.

As the sight line correcting data (sight line correcting factor) A and B to be used for accurately detecting the sight line of the photographer, there is known, in addition to the sight line correcting data for calculating the sight line, spectacles information as to whether the photographer wears spectacles. The same photographer, however, may sometimes use spectacles while at other times not. Therefore, if the spectacles information is not the same as that set on the basis of the sight line correcting data, the sight line could not be accurately detected.

The present invention is aimed at providing an optical apparatus having a sight line detecting device which is capable of accurately detecting sight line by providing a sight line correcting means for correcting personal errors in detecting the sight line by use of sight line correcting data, a memory means for storing the sight line correcting data, and a confirming means for confirming the sight line correcting data stored in the memory means. When the confirming means judges, on the basis of the sight line correcting data stored in the memory means, that the sight line correcting data being set in the camera (optical apparatus) are incorrect, it changes that data.

Immediately after the photographer buys a camera (optical apparatus), there are no registered sight line correcting data for correcting the sight line of the photographer, but the sight line correcting data are set to a predetermined initial value. Therefore, with the sight line correcting data being at initial value, controlling the camera by use of the photographer's sight line information would cause erroneous operation.

The present invention is aimed at providing an optical apparatus having a sight line detecting device which is capable of preventing the camera from erroneously operating, by providing a sight line correcting means for correcting personal errors in detecting the sight line by use of sight line correcting data and a memory means for storing the sight line correcting data, and controlling the operation of the camera based on sight line information if no sight line correcting data is stored in the memory means e.g. by prohibiting the operation.

In general, when an image sensor is used as a light-receiving means, reading photographer's all eye image data input to the image sensor would require significant time. Therefore, if the sight line of the photographer is calculated by use of the eye image data after totally reading out the eye image data from the image sensor and thereafter controlling the camera (optical apparatus) using the calculated sight line information, the sequential camera operation would be seriously retarded.

Further, when the sight line correcting data of the photographer is detected, the photographer should turn his eyes for a predetermined time at a visual mark formed in the finder of the camera. This would become an agony for the photographer particularly if the time is long.

The present invention is aimed at providing an optical apparatus having a sight line detecting device which is capable of detecting sight line in short time, by detecting a rotational angle of optical axis of photographer's eye, setting a reading region in an image sensor for receiving the photographer's eye image by calculating the photographer's sight line from the rotational angle, and reading idle the regions other than the reading region in the image sensor.

An optical apparatus having a sight line detecting device according to the present invention comprises a sight line detecting means for detecting a rotational angle of an optical axis of photographer's eye viewing the field of view of finder and detecting the photographer's sight line from the rotational angle, and can operate in both sight line photographing mode for controlling the photographic function by use of the sight line information from the sight line detecting means and sight line photographing prohibited mode for controlling the photographic function without using the sight line information form the sight line detecting means. It is possible to freely select the sight line photographing mode and the sight line photographing prohibited mode.

The present particularly features to include a focus point detecting means being capable of detecting a focus point at a plurality of detecting regions in the field of view of the finder, and a multi-dividing photometric means for dividing an effective region in the field of view of the finder into a plurality of sub-regions and measuring the lightness at the sub-regions, and to select any of the sub-regions and/or weighting the sub-regions as one of the aforementioned photographic function.

The present invention further includes a display means for indicating the sight line photographing mode for controlling the photographic function on the basis of the sight line information from the sight line detecting means which detects the sight line of the photographer from a detected rotational angle of the optical axis of the photographer's eye viewing the field of view of the finder.

The present invention further comprises a focus detecting means which is capable of detecting a focus point at a plurality of detecting regions in the field of view of the finder. The aforementioned display means indicates in the field of view of the finder that any of the detecting regions is selected by the photographic function.

The present invention includes a sight line detecting means for detecting a rotational angle of an optical axis of a photographer's eye viewing a field of view of a finder and detecting the sight line of the photographer from the rotational angle, a sight line correcting means for correcting the personal errors in detecting the sight line obtained by the sight line detecting means, a memory means for storing the correcting data obtained by the sight line correcting means, and a selecting means for selecting any one of the correcting data stored in the memory means or prohibiting the operation of the sight line detecting means.

In another aspect, the present invention comprises a sight line detecting means for detecting a rotational angle of an optical axis of photographer's eye viewing a field of view of the a finder and detecting a sight line of the photographer from the rotational angle, a sight line correcting means for correcting the personal errors in detecting the sight line by the sight line detecting means, a memory means for storing the correcting data obtained by the sight line correcting means, and a selecting means for selecting either one of a correcting operation mode for selecting any one of the correcting data stored in the memory means and setting the sight line correcting means to the operating state or correcting prohibiting mode for setting the sight line correcting means to a non-operating state. When the correcting operation mode is selected, the sight line detecting means detects the sight line on the basis of the selected correcting data, photographs using the obtained sight line information, and when the correcting prohibited mode is selected, the sight line detecting means ceases to detect the sight line.

In another aspect, the present invention comprises a sight line detecting means for detecting a rotational angle of an optical axis of a photographer viewing a field of view of a finder and detecting a sight line of the photographer from the rotational angle, a sight line correcting means for correcting the personal errors in detecting the sight line by the sight line detecting means, a memory means for storing the correcting data obtained by the sight line correcting means, a selecting means for selecting any one of the correcting data stored in the memory means, and a display means for making an indication in accordance with the correcting data selected by the selecting means.

The present invention particularly features that: the display means indicates that the correcting data stored in the memory means is at an initial value or at a no input state and input state; the display means makes the indication using in common a part of the variable numerical value display segment for displaying photographic information of the optical apparatus; and the selecting means is composed of an operating member for selecting the photographing information such as the shuttering time and the stopping value of the optical apparatus.

In particular, the present invention comprises a focus point detecting means for detecting a focus point at a plurality of detecting regions in the field of view of the finder, the visual mark exists near or in the detecting frame showing the detecting regions, both the visual mark and the detecting frame are simultaneously turned on or off to display, the sight line correcting means differently indicates the visual mark in the state where the correcting data are sampled while the photographer is turning his eyes at the visual mark from the state where a predetermined time of the detection using the visual mark has been carried out and the sampling of the correcting data has been completed, and the sight line correcting means is composed to sample the correcting data while the photographer is turning his eyes at the visual mark only during the switch interlocking with the release button of the optical apparatus turned on.

In another aspect, the present invention comprises a sight line detecting means for detecting a rotational angle of the optical axis of the photographer's eye viewing a field of view of finder and detecting the sight line of the photographer from the rotational angle and a sight line correcting means for correcting the personal errors in detecting the sight line by the sight line detecting means, the sight line correcting means includes a visual mark provided in at least two different positions in the field of view of the finder and capable of indicating both the turning-on state and turning-off state, and successive operations for providing the correcting data are performed by use of the visual mark and photographic information display provided out of the field of view of the finder.

In particular, in the present invention: the completion of the successive operations of the sight line correcting means and the acquisition of the correcting data are displayed by use of a part of the photographic information display; when no correcting data are obtained by the sight line correcting means, utilizing the sight line information obtained by the sight line detecting means is prohibited, and the warning display therefore is made by use of a part of the photographic information display; during the correcting data is sampled by the sight line correcting means, the photographic information display is turned off to turn on only the visual mark.

In an optical apparatus having a sight line detecting means according to the present invention, when the rotational angle of an optical axis of the photographer's eye viewing a field of view of a finder and the sight line of the photographer is detected from the rotational angle, the sight line is detected from a function of the lightness around the photographer's eye and the sight line correcting data by the sight line detecting device.

The present invention in particular includes a sight line correcting means for calculating sight line correcting data in accordance with the lightness around the photographer's eye for correcting the personal errors in detecting the sight line.

An optical apparatus, having a sight line detecting device for detecting a rotational angle of an optical axis of the photographer's eye viewing a field of view of a finder system and detecting a sight line of the photographer from the rotational angle, according to another aspect of the invention includes a sight line detecting means having a sight line correcting mode for correcting personal errors in detecting the sight line by use of sight line correcting data and a time counting means for measuring the time having been passed during the sight line correcting mode, and the predetermined operations of the optical apparatus is controlled on the basis of the signals from the time counting means.

In particular, the control means controls the display by the display means by use of a power source of the optical apparatus, and controls the operations in the sight line correcting mode on the basis of the signals indicating that the operating means of the optical apparatus are operated.

According to another aspect of the present invention, an optical apparatus having a sight line detecting device for detecting a rotational angle of an optical axis of a photographer's eye viewing through a finder system and detecting a sight line of the observer from the rotational angle, the apparatus comprises a sight line detecting means having a sight line correcting mode for correcting the personal errors in detecting the sight line by use of sight line correcting data and a time counting means for measuring the time having been passed during the sight line correcting mode, and the sight line correcting mode is terminated by a control means on the basis of the signal from the time counting means.

In particular, the control means resets the time counting means on the basis of the signals indicating that the operating means of the optical apparatus are operated, and the control means sets the sight line detecting means to a sight line detection prohibited state upon termination of the sight line detecting mode of the sight line detecting means.

The above and other advantages, features and additional objects of this invention will be manifest to those versed in the art upon making reference to the following detailed description and the accompanying drawings in which a structural embodiment incorporating the principles of this invention is shown by way of illustrative example.

BRIEF DESCRIPTION OF THE DRAWINGS

FIG. 1 is a diagram showing an optical arrangement according to a first embodiment of the present invention which is incorporated into a single-lens reflex camera;

FIG. 3 shows a field of view of finder in FIG. 1;

FIG. 9 is a flow diagram of detecting region-automatic selection algorithm;

DETAILED DESCRIPTION OF THE PREFERRED EMBODIMENTS

Figure 2A:
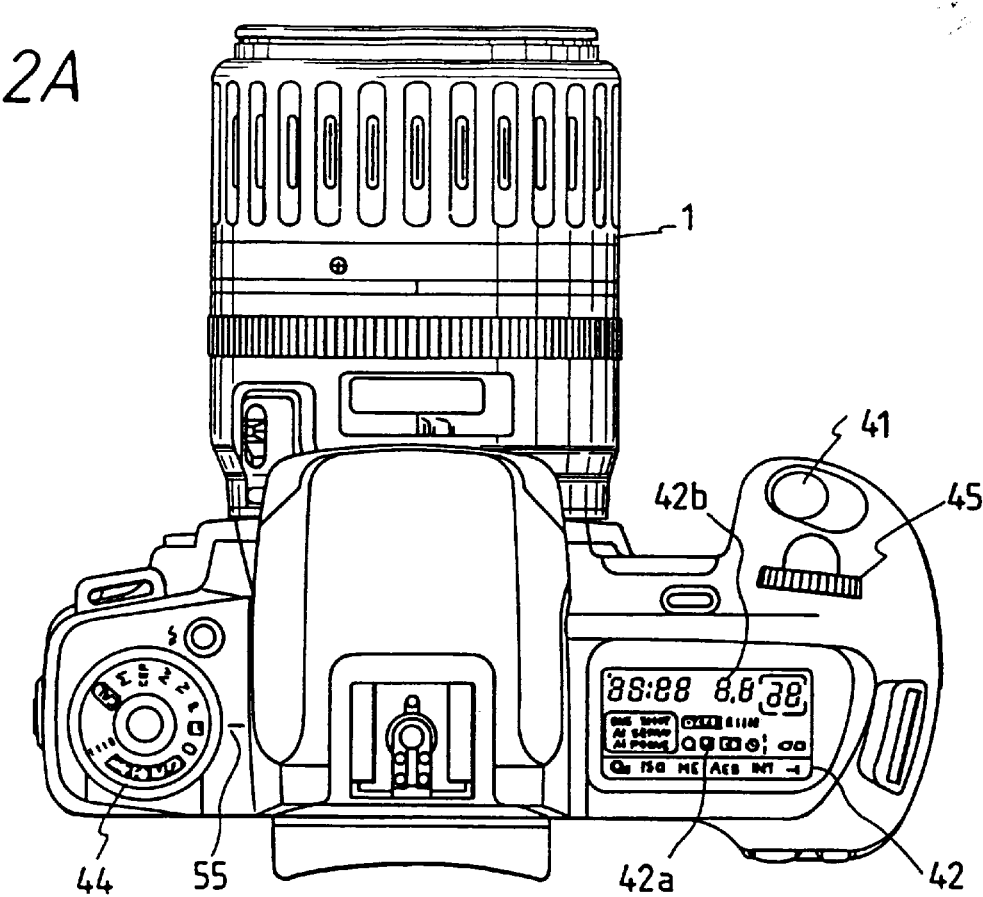
FIGS. 2A and 2B are a perspective view and a back view respectively of the single-lens reflex camera shown in FIG. 1.
Figure 2B:
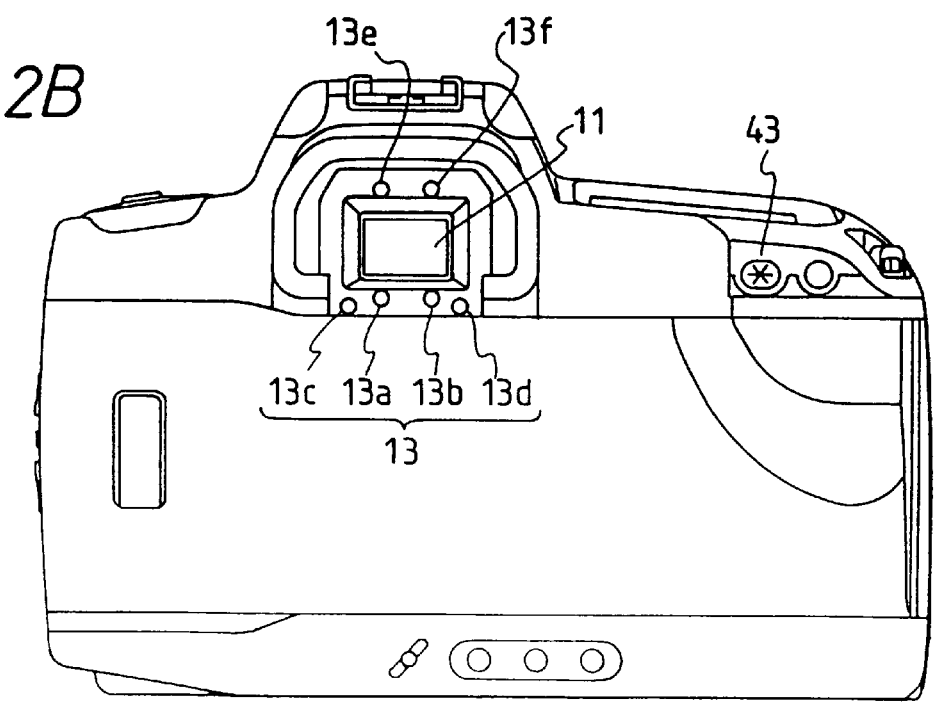

FIGS. 1 to 22B are for the explanation of a first embodiment according to the present invention, wherein FIG. 1 is an optical cross-sectional view of a single-lens reflex camera incorporating the present invention, FIGS. 2A and 2B are an upper perspective view and a back view of the single-lens reflex camera shown in FIG. 1, and FIG. 3 shows a field of view of a finder in FIG. 1.

In these Figures, the numerals designate respectively: 1, a removable or fixed photographic lens which is practically a single focus lens or a zoom lens composed of a number of lenses in spite of being shown as two lenses 1a and 1b for simplification; 2, a main mirror being mounted diagonally with respect to or retracted from a photographic optical path in accordance with the observing state and the photographing state; 3, a sub-mirror for reflecting light flux having passed through the main mirror 2 downwardly from the camera body; 4, a shutter; 5, a photosensitive member being composed of silver film, a CCD type or MOS type solid-state imaging element, or an imaging tube such as vidicon; 6, a focus detecting device using well known phase difference method being composed of a field lens 6a disposed near an imaging surface, reflecting mirrors 6b and 6c, a second imaging lens 6d, iris 6e, and a line sensor 6f being composed of a plurality of CCDs. The shown focus detecting device 6 is composed to be capable of detecting the focus for a plurality of regions (five detecting region marks 200–204) in an observing screen 213 as shown in FIG. 3.

Further, the numerals designate respectively: 7, a focus plate disposed on a supposed imaging surface of the photographing lens 1; 8, a pentagonal prism for changing a finder light path; 9 and 10, an imaging lens and a photometric sensor for measuring an object lightness in the observing screen, wherein the imaging lens 9 conjugately relates the focus plate to the photometric sensor 10 through a reflective light path in the pentagonal prism 8.

An eye piece 11 having an optical dividing surface 11a behind a projecting surface of the pentagonal prism 8 being used for observing the focus plate 7 through the eye 15 of the photographer. The optical dividing surface 11a is composed, for example, of a dichloic mirror for reflecting infrared light while passing visual light. The numerals 12 and 14 designate a light-receiving lens and an image sensor composed of two-dimensionally arranged rows of photoelectric elements such as a CCD. The image sensor is disposed to be conjugate with the vicinity of the pupil of the photographer's eye 15 located at a predetermined position with respect to the light-receiving lens 12. The image sensor 14 and the light-receiving lens 12 constitute a component of a light receiving means. As an infrared light-emitting diode 13 (13a–13f) is an illuminating light source (light projecting means of the photographer's eye 15 is disposed around the eye-piece 11 as shown in FIG. 2B.

There is provided a high-lightness superimposing LED 21 capable of being identified even in a high-lightness object. The light having been emitted from the superimposing LED will be reflected by the light-projecting prism 22 and the main mirror 2 and is then deflected vertically by a micro prism array 7a disposed on a display portion of the focus plate 7, and eventually reaches the photographer's eye 15 through the pentaprism 8 and the eye-piece 11. Therefore, the micro prism array 7a formed in frame-shape at a position corresponding to the focus detecting region of the focus plate 7, and is illuminated by five superimposing LEDs 21 (LED-L1, LED-L2, LED-C, LED-R1, and LED-R2).

As can be seen from the field of view of the finder in FIG. 3, the detecting region marks 200, 201, 202, 203 and 204 are illuminated in the field of view 213 of the finder to indicate the focus detecting region (hereinafter referred to as superimposing display).

Further, dot marks 205 and 206 are formed in the detecting regions 200 and 204 at the left and right ends for indicating the visual marks used when the sight line correcting data (sight line correcting factors) A and B for correcting the personal errors in detecting the sight line are sampled (hereinafter referred to as calibration).

The numerals further designate: 23, a visual field mask for forming visual field region of the finder; 24, an in-finder LCD for displaying photographing information out of the finder visual field to be illuminated by the illuminating LED (F-LED) 25. The light having been passed through the in-finder LCD 24 is introduced into the triangle 26 into the finder and then displayed at a region 207 out of the finder visual field for the observation of the information by the photographer. The numerals designate respectively: 27, a position detecting means being a mercury switch for sensing the position of the camera; 31, an iris provided in the photographic lens 1; 32, an iris driving device including an iris driving circuit 111 mentioned later; 33, a lens driving motor; 34, a lens driving member composed of driving gears etc.; 35, a photo-coupler for detecting the rotation of the pulse plate 36 interlocking with the lens driving member 34 and transmitting the detected information to a lens focus adjusting circuit 110. The lens focus adjusting circuit 110 drives the lens driving motor by a predetermined amount on the basis of the information as to the lens driving amount supplied from the camera side. A mount contact point 37 would be a known interface between the camera and the lens.

In FIGS. 2A and 2B, the numerals designate respectively: 41, a release button; 42, a monitoring LCD as an external monitor display device composed of a fixed segment display section 42a for displaying a predetermined character pattern and a seven-segment display section 42b for displaying variable numerical value; 43, an AE lock button for holding a photometric value; 44, a mode dial for selecting a photographing mode etc. The other members are omitted from explanation because of being unessential in understanding the present invention.

Figure 4A:
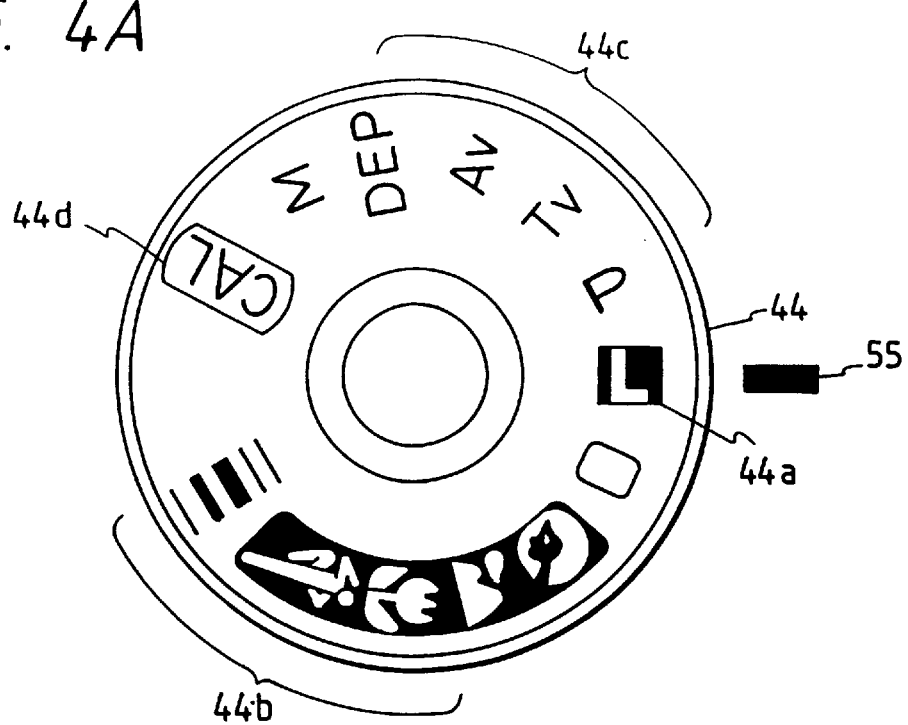
FIGS. 4A and 4B are explanatory views for a mode dial in FIGS. 2A and 2B.

FIG. 4A is a detailed explanatory diagram of the mode dial shown in FIGS. 2A and 2B. The photographing mode is set by adjusting its indication to the visual mark 55 formed in the camera body. The numeral 44b designates an automatic photographing position being controlled by a photographing program predetermined by the camera. The numeral 44c designates a manual photographing mode position in which the photographer manually decides the photographing manner. There are photographing modes of: program AE; shutter preferential AE; iris preferential AE; object depth preferential AE; and manual exposure. The numeral 44d designates a "CAL" position in which the calibration mode for calibrating the sight line is carried out as mentioned later.

Figure 4B:
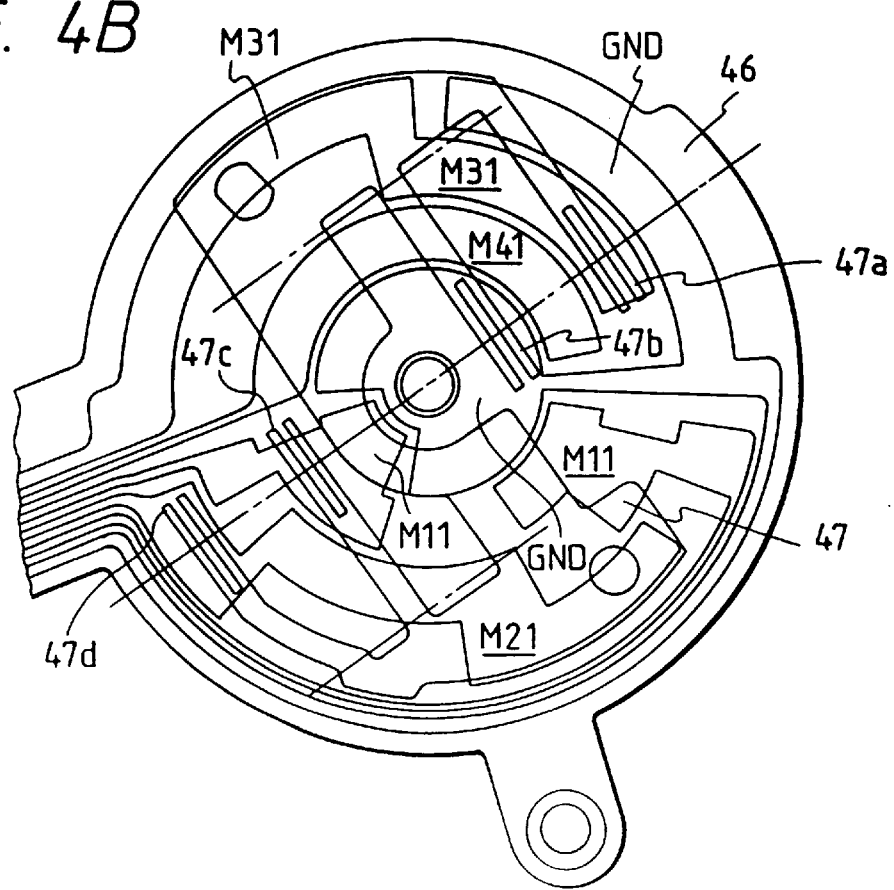

FIG. 4B is an explanatory view of the internal structure of the mode dial 44. The numeral 46 designates a flexible print board on which switch patterns (M11, M21, M31 and M41) as mode dial switch and GND pattern are arranged as shown. By sliding four contact pieces (47a, 47b, 47c and 47d) of the switch contact piece 47 interlocking with the rotation of the mode dial 44, it is possible to set thirteen positions shown in the mode dial 44 at four bits.

In FIG. 2A, the numeral 45 designates an electronic dial for selecting a setting value being further selectable in the mode selected through the mode dial by generating click pulse. For example, if a shutter-preferential photographic mode is selected by the mode dial 44, a shutter speed being presently set is displayed on the in-finder LCD 24 and the monitoring LCD 42. It is constructed that, as the photographer rotates the electronic dial 45 the shutter speed value accordingly varies from the presently set speed.

Figure 5A:
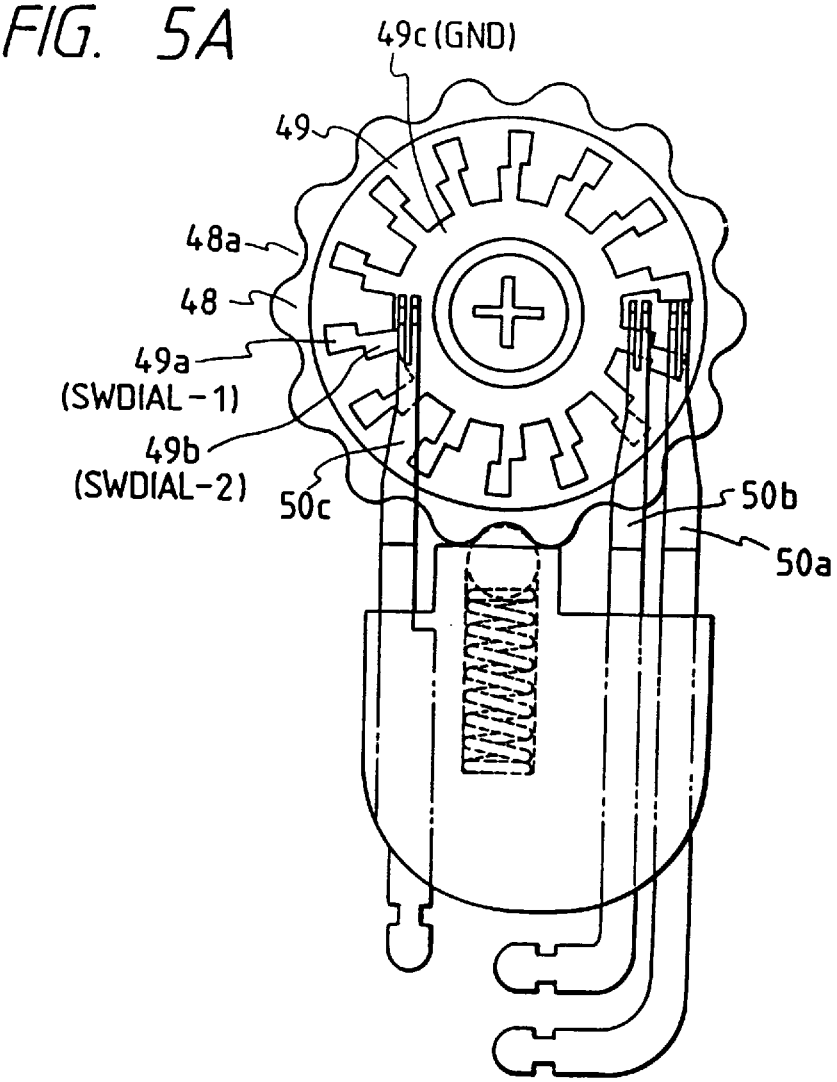
FIGS. 5A and 5B are explanatory views for an electronic dial in FIGS. 2A and 2B.
Figure 5B:
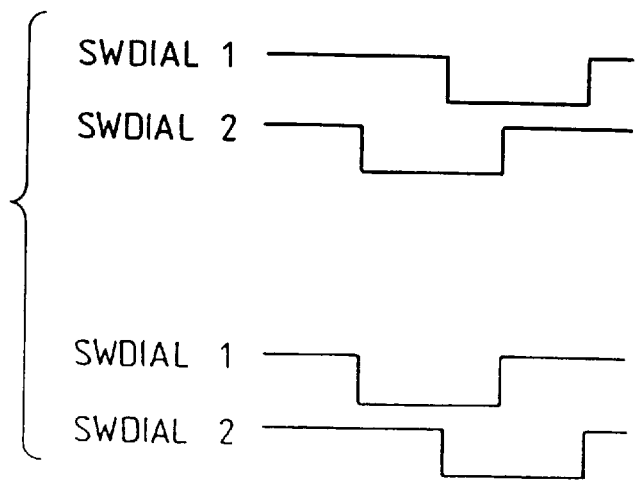

FIGS. 5A and 5B show detailed internal structure of the electronic dial 45. There is provided a click plate 48 rotating along with the electronic dial 45, to which the print board 49 is secured. The print board 49 includes a switch pattern 49a (SWDIAL-1) and 49b (SWDIAL-2) and GHD pattern 49c which are arranged as shown, while a switch contact piece 50 having three sliding contact pieces 50a, 50b and 50c is fixed to the fixing member 51.

A click ball 52 is fitted to a concave portion 48a formed in the outer periphery portion of the click board 48. A coil spring 53 biasing this click ball 52 is held by the fixing member 51. In the normal state (a state in which the click ball 52 is fitted to the concave portion 48a), the sliding contact pieces 50a, 50b are in contact with neither the switch pattern 49a nor 49b.

In the electronic dial 45 composed as mentioned above, when the photographer rotates the electronic dial 45 in the clockwise direction in FIGS. 5A and 5B, the sliding contact point 50b firstly contacts with the switch pattern 49b, and then the sliding contact point 50a comes to contact with the switch pattern 49a. With such a timing, the setting value is counted up. In the case of the counter-clockwise rotation, the relationship between the sliding contacts and the switch patterns becomes vice-versa, and with the same timing the setting value is counted down.

FIG. 5B is a timing diagram showing pulse signals and their timing generating in the switch patterns 49a and 49b when the dial is rotated. The upper stage and the lower stage relate to the cases of one-click rotation in the clockwise and counter-clockwise directions respectively. Thus, the timing of the counting up and down, and the rotating direction are detected.

Figure 6:
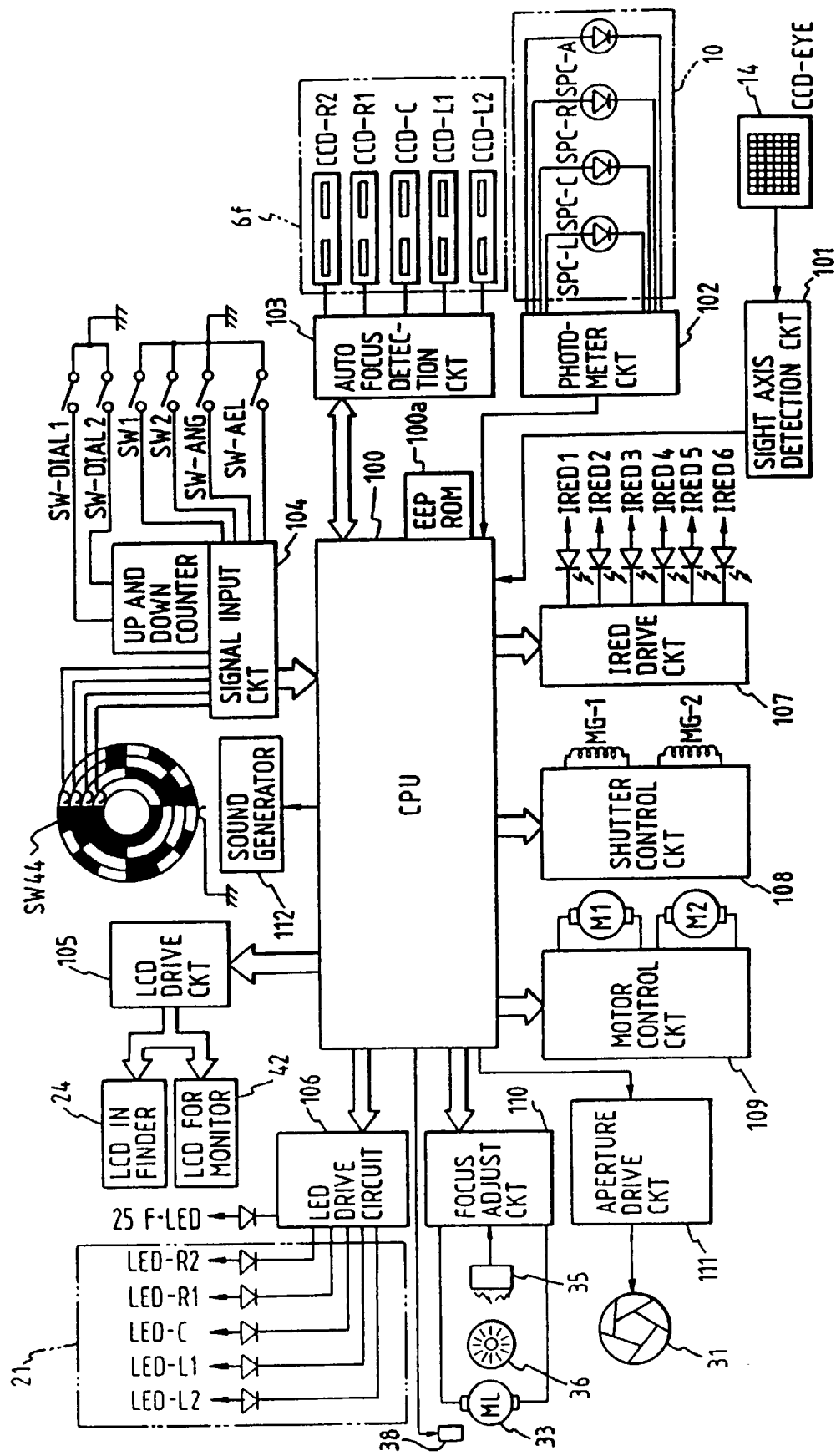
FIG. 6 is a block diagram showing an electric circuit according to a first embodiment of the present invention.

FIG. 6 is an essential block diagram showing an electric circuit incorporated into a camera body according to this embodiment. The same components as those in FIGS. 5A and 5B are designated by the same numerals.

There are connected to a central processing unit (hereinafter referred to as CPU) of a microcomputer, a sight line detecting circuit 101, a photometric circuit 102, an automatic detecting circuit 103, a signal input circuit 104, an LCD driving circuit 105, an LED driving circuit 106, an IRED driving circuit 107, a shutter control circuit 108, and a motor control circuit 109. Further, signals are transmitted to a focus adjusting circuit 110 and an iris driving circuit 111 provided in the photographic lens through the mount contact point 37 shown in FIG. 1.

An EEPROM 100a as a memory means associated with the CPU 100 has a function for storing sight line correcting data for correcting personal errors in the sight line detection. By adjusting the "CAL" position of the mode dial 44 to the visual mark 55 (FIGS. 4A and 4B). It is possible to select the calibration mode for obtaining sight line correcting data for correcting the personal errors in sight line detection (hereinafter referred to as calibration data), and to select a calibration number corresponding to the calibration data and to set the calibration operation to "OFF" and the sight line detection-prohibited mode through the electronic dial 45. A plurality of types of calibration data can be set, which would be effective for differently setting that depending on: the users of the camera; the observing states by the same user, e.g. whether using spectacles or not; and whether using a sight line correcting lens or not. Further, the data of the thus selected calibration number or the set condition of sight line detection-prohibited state are also stored in the EEPROM 100a as a calibration data number (1, 2, 3, . . . or 0).

The sight line detecting circuit 101 converts the output of the eye image from the image sensor 14 (CCD-EYE) into digital data and transmits the converted data to the CPU 100. The CPU 100 extracts the characteristic points of the front eye portion necessary for the sight line detection in accordance with a predetermined algorithm as mentioned later, and calculates the photographer's sight line from the positions of the characteristic points. The CPU 100, the sight line detecting circuit 100 and the image sensor 14 constitute a component of the sight line detecting device.

The photometric circuit 102 amplifies, logarithmically compresses, and A/D-converts the output from the photometric sensor 10, and supplies that as the lightness information for the sensors to the CPU 100. The photometric sensor 10 is composed of four photodiodes: SPC-L for measuring light in the left region 210 including the left side detecting points 200 and 201 in the visual field in the finder shown in FIG. 3; SPC-C for measuring light in the central region 211 including the central detecting point 202; SPC-R for measuring light in the right side region 212 including the right side detecting points 203 and 204; and SPC-A for measuring light in the peripheral region 213 thereof.

The line sensor 6f is a conventional CCD line sensor being composed of five sets of line sensors CCD-L2, CCD-L1, CCD-C, CCD-R1 and CCD-R2 which correspond to the five detecting points 200–204 in the screen as mentioned above. The automatic focus detecting circuit 103 A/D-converts the voltage obtained from the line sensor 6f and transmits that to the CPU 100.

The characters designate respectively: SW-1, a photometric switch which is turned on by the first stroke of the release button 41 for starting the photometric, AF and sight line detecting operations; SW-2, a release switch which is turned on by the second stroke of the release button; SW-ANG, a position detecting switch sensed by the mercury switch 27; SW-AEL, an AE lock switch which is turned on by depressing the AE lock button 43; SW-DIAL1 and SW-DIAL2 dial switches provided in the already mentioned electronic dial 45 and connected to the up/down counter of the signal input circuit 104 for counting the rotational click amount of the electronic dial 45; and SW-M11 to M41, dial switches provided in the mode dial mentioned above.

The signals of these switches are input to the signal input circuit 104 and then supplied to the CPU 100 through the data bus.

The numeral 105 designates a well known LCD driving circuit for driving the liquid crystal display element LCD to make display of stopping value, shuttering time, set photographing mode etc. simultaneously on both the monitoring LCD 42 and the in-finder LCD 24.

The LED driving circuit 106 controls the illuminating LED (F-LED) 25 and the superimposing LED 21 to turn on and off. The IRED driving circuit 107 selectively turns on the infrared light emitting diode (IRED 1–6) depending on the situation. The shutter control circuit 108, upon energized, controls a magnet MG-1 for driving a former screen and a magnet MG-2 for driving a latter screen to make the photosensitive member be exposed by a predetermined light amount.

The motor control circuit 109 controls a motor M1 for winding the film up and down and a motor M2 for charging the main mirror 2 and the shutter 4. A camera release sequence is operated by the shutter control circuit 108 and the motor control circuit 109.

Figure 7A:
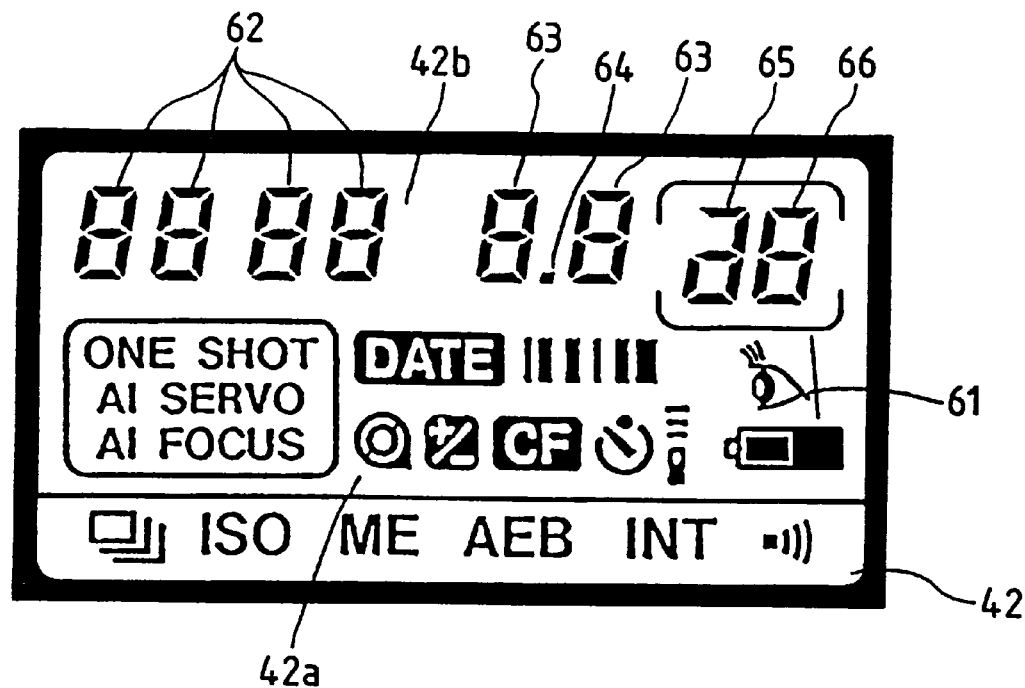
FIGS. 7A and 7B are partial explanatory views of FIGS. 2A and 2B.
Figure 7B:
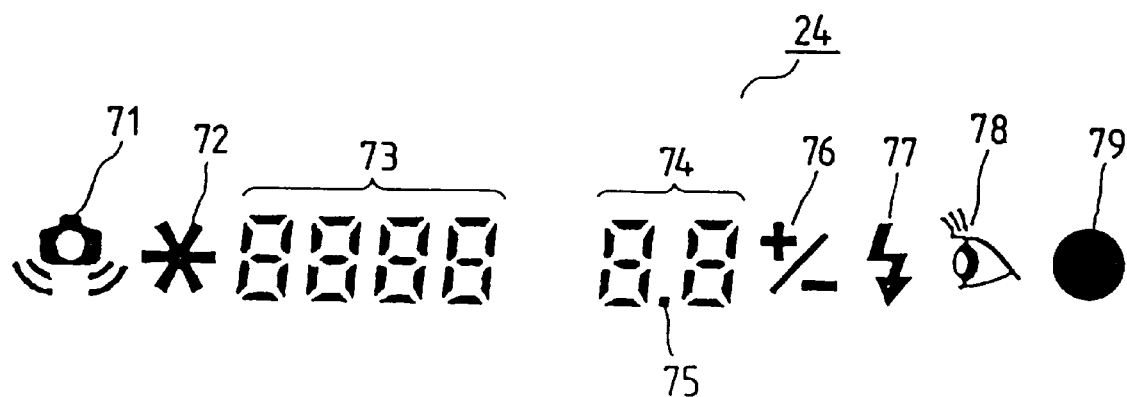

FIGS. 7A and 7B show contents in all the display segments of the monitoring LCD 42 and the in-finder LCD 24. In FIG. 7A, the fixed display segment portion 42a includes a sight line input mode display 61 for indicating, in addition to the well known photographing mode, that the photographing operations such as the AF function and the photographing mode selection are controlled by sight line information having been detected.

The seven-segments portion 42b for displaying variable numerical value is composed of a four-digits seven-segments 62 for displaying the shuttering time, a two-digit seven-segment 63 and a decimal point 64, a finite numerical value display segment 65 and a one-digit seven-segment 66 for displaying the number of films.

In FIG. 7B, the numerals designate respectively: 71, a blurring warning mark; 72, an AE lock mark; 73, 74 and 75, the same display segments as the aforementioned shutter time display and the stopping value display; 76, an exposure correction setting mark; 77, a strobe charge-completed mark; 78, a sight line input mark for displaying the sight line input state; and 79, a focusing mark for indicating the focused state of the photographic lens 1.

Basic Operations of Camera

The operations of the camera having a sight line detecting device and the display state in the finder will now be described with reference to FIGS. 8A and 8B, 15A to 15C, 16A and 16B, respectively.

When the mode dial 44 is rotated to set the camera from an inoperative state to a predetermined photographing mode (in this embodiment, the shutter-preferential AE state will be described as an example), the camera power source is turned on (#100). Then, the variable to be used for the sight line detection other than the calibration data for the sight line stored in the EEPROM is reset in the CPU 100 (#101).

The camera is then in stand-by state until the release button 41 is depressed to turn the switch SW1 on (#102). When the signal input circuit 104 detects the half-depression of the release button 41 and the turning on of the switch SW1, the CPU confirms which data should be used in the EEPROM 100a for the sight line detection (#103).

At this time, if the calibration data of the confirmed calibration data number remains unchanged as the initial value or the sight line detection-prohibited mode is set, the sight line detection is not carried out, but a particular detecting point is selected by the detecting point automatically detecting sub-routine (#116) without using any sight line information. At this detecting point, the automatic focus point detecting circuit 103 detects the focus point (#107). Thus, there are both the photographing mode for selecting the detecting point without using any sight line information (sight line detection prohibited-automatic focus photographing mode) and the photographing mode for selecting the detecting point using the sight line information (sight line automatic focus photographing mode). Therefore, the photographer can select either of them depending on whether the sight line detection prohibited mode is set or not. There would be several examples for the algorithm of the detecting point automatic selection, but a near point-preferential algorithm weighting the central detecting point would be effective, an example of which is shown in FIG. 9 to be mentioned later.

On the other hand, if the calibration data of the sight line corresponding to the calibration data number is set to a predetermined value and the CPU 100 confirms that data have been input by the photographer, the sight line detecting circuit 101 performs the sight line detection in accordance with the calibration data (#104). At this time, the LED driving circuit 106 turns the illuminating LED (F-LED) 25 on while the LCD driving circuit 105 turns the sight line input mark 78 in the in-finder LCD 24 on. As a result, the photographer can confirm that the camera is detecting the sight line in the region 207 out of the visual field of the finder (FIG. 15A).

Further, the set shuttering time is displayed in the seven-segment 73 (a case of shutter-preferential AE of 1/250 sec is shown by way of example). The sight line having been detected in the sight line detecting circuit 101 is converted into the coordinates on the focus plate 7 at which the eyes are turning. The CPU 100 selects the detecting point near that coordinates and supplies signals to the display circuit 106 to make the detecting point mark on the superimposing LED 21 flicker (#105).

Figure 15A:
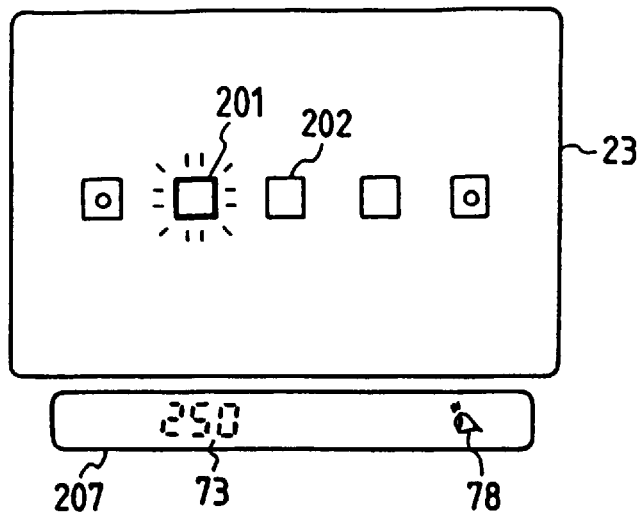
FIGS. 15A to 15C are explanatory views for a display state in a field of view of the finder shown in FIG. 1.
Figure 15B:
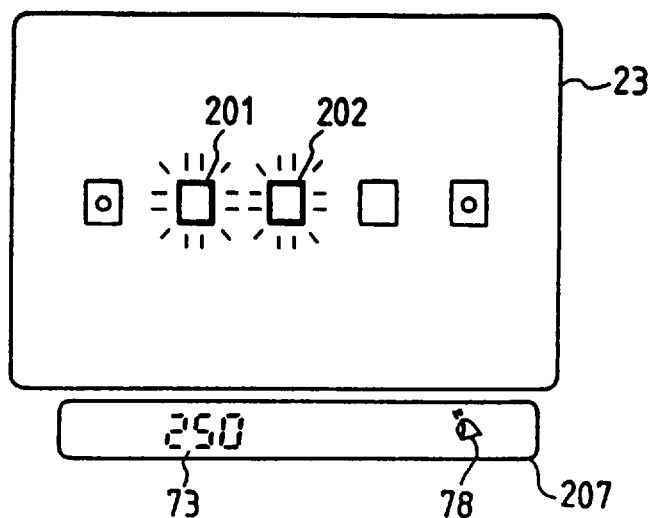
Figure 15C:
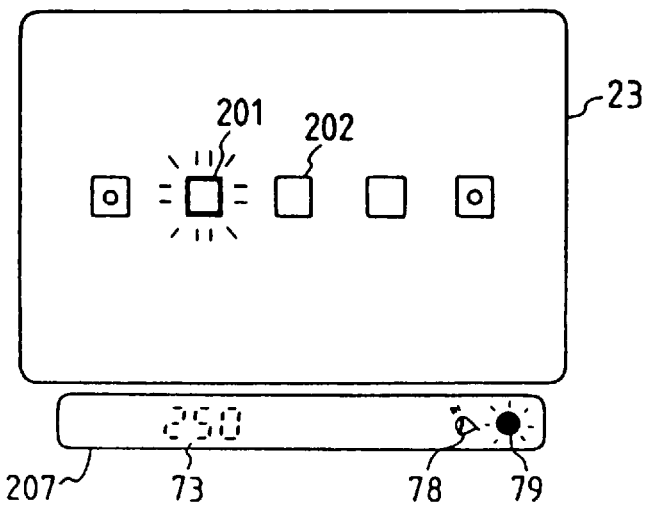

FIGS. 15A and 15C show a state in which the detecting point 201, as an example, is selected. At this time, if the reliability of the detected sighting point coordinates is low, the CPU 100 provides signals for displaying with the number of the detecting points to be selected being varied in accordance with the degree of the reliability.

In the state of FIG. 15B, the reliability of the sighting point is lower than that in the case of FIG. 15A, such that the detecting point marks 201 and 202 are selected. When the photographer looks at the display indicating the detecting point selected by his sight line and confirms that it is incorrect to release his hand from the release button 41 and turn the switch SW1 off (#106), the camera remains in the stand-by state until the switch SW1 is turned on (#102).

Thus, the photographer can know, that the detecting point has been selected by the sight line information, by the flickering of the detecting point mark in the visual field in the finder, so he can readily confirm if the desired selection has been made.

When the photographer recognizes by the display that the detecting point has been selected by the sight line and continues turning the switch SW1 on (#106), the automatic focus detecting circuit 103 performs the focus detecting operation at equal to or more than one detecting points by use of the sight line information (#107). In this step, it is judged if the detection can be carried out at the selected detecting points (#108), and if the result is negative, the CPU 100 supplies signals to the LCD driving circuit 105 to flicker the focus mark 79 of the in-finder LCD 24 to warn the photographer of NG (No Good or impossible) (#118) to continue the flickering until the switch SW1 is released (#119).

Figure 16A:
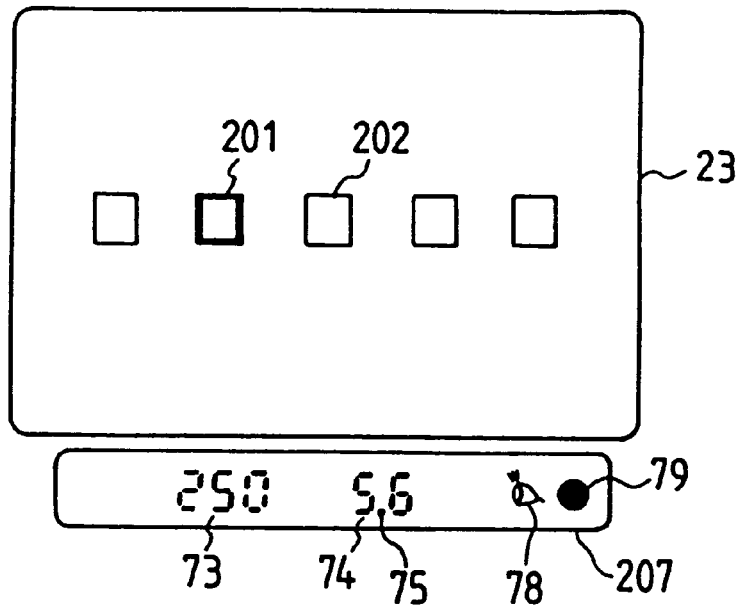
FIGS. 16A and 16B are explanatory views of a display state in a field of view of the finder shown in FIG. 1.
Figure 16B:
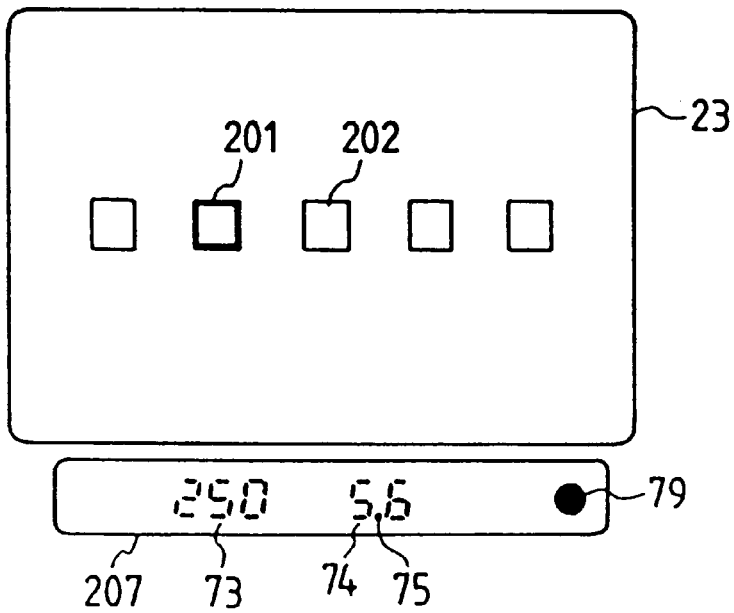

Meanwhile, if the detection is possible and the focus adjusting state at the detecting point selected by the predetermined algorithm is not in focus (#109), the CPU 100 supplies signals to the lens focus adjusting circuit 110 to move the focus lens 1a of the photographic lens 1 by a predetermined amount (#117). After the lens is moved, the automatic focus detecting circuit 103 detects the focus again (#107) to judge if the photographic lens 1 is in focus or not (#109). In a predetermined detecting point, if the photographic lens 1 is in focus, the CPU 100 supplies signals to the LCD driving circuit 105 to turn the focus mark 79 of the in-finder LCD 24 on and also to the LED driving circuit 106 to make display indicating that the detecting point 201 is in focus (FIG. 16A).

At this time, the flickering display of the detecting point selected by the sight line ceases. But since the detecting point being displayed to be in focus and the detecting point selected by the sight line are usually identical, so the focused detecting point is set to turning-on state to inform the photographer of the fact of focusing. When the photographer looking at the display of the focused detecting point in the finder recognizes that the detecting point is incorrect and releases his hand from the release button 41 to turn the switch SW1 off (#111), the camera remains in the stand-by state until the SW1 is turned on (#102).

If the photographer continues turning the SW1 on even after looking at the display indicating the focused detecting point (#111), the CPU 100 supplies signals to the photometric circuit 102 for photometric operation (#112). At this time, an exposure value is calculated by weighting the photometric areas 210–213 including the focused detecting points.

In this embodiment, a well known photometric calculation weighting the photometric region 210 including the detecting point 201 is executed. As a result, a stopping value (F5.6) is displayed by use of the seven-segment 74 and the decimal point 75 (FIG. 16A).

Further, it is judged if the release button 41 is depressed and the switch SW2 is turned on (#113). If the switch SW2 is turned off, the state of the switch SW1 is confirmed again (#111). Meanwhile, if the switch SW2 is turned on, the CPU 100 supplies signals to the shutter control circuit 108, the motor control circuit 109 and the stopping drive circuit 111.

After energizing the motor M2, turning up the main mirror 2 and stopping down the stopping 31, the magnet MG1 is energized to open the former screen of the shutter 4. The stopping value of the stopping 31 and the shutter speed of the shutter 4 are determined from the exposure value and the sensitivity value of the film 5 detected by the photometric circuit 102. After passing a predetermined shuttering time (1/250 sec.), the magnet MG2 is energized and the latter screen of the shutter 4 is closed. Upon completion of the exposure to the film 5, the motor M2 is energized again and the film is frame-fed, thereby terminating a series of shutter-releasing sequence operations (#114). Thereafter, the camera remains in stand-by state until the switch SW1 is turned on again (#102).

Figure 8B:
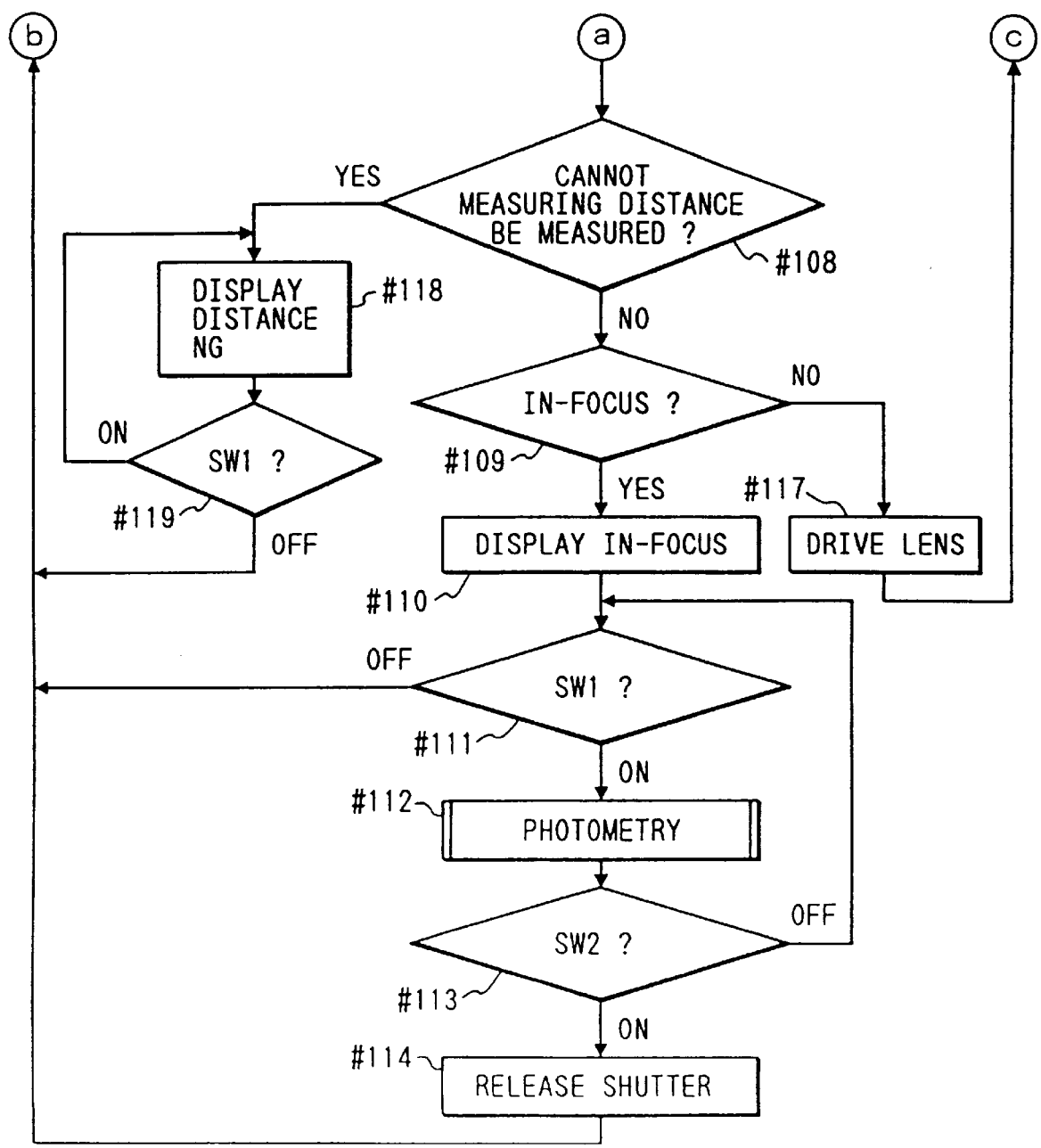
FIG. 8 is comprised of FIG. 8A and FIG. 8B showing flow diagrams of operation of the single-lens reflex camera in FIG. 6.

When the signal input circuit 104 detects that the mode is changed by the mode dial 44 and the sight line calibrating mode is set during a series of operations other than the shutter-releasing operations of the camera (#114) shown in FIGS. 8A and 8B, the CPU 100 temporarily stops the operation of the camera and supplies signals to the sight line detecting circuit 101 to set it to a sight line calibration-enabling state (#115). The sight line calibrating method will be described later.

Detecting Point Automatic Selection Sub-routine

A detecting point automatic selection sub-routine #116 will now be described with reference to FIG. 9. This sub-routine is executed during the sight line detection-prohibited mode (sight line prohibited mode) i.e., during that the sight line input mode is not set and the detecting point is determined from the information of the defocused amount at the respective detecting point and the object distance.

Firstly, it is judged if there is any detectable point among the five detecting points (#501). If the result is negative, the process returns to the main routine (#511). If the result is affirmative and the detectable point is single, one (#502), it is defined as the detecting point (#507). If there are equal to or more than two detectable points, it is judged if there is the central detecting point (#503) or the central detecting point is close (e.g. less than 20 times of the focus distance) (#504).

If the central detecting point is detectable and close, or undetectable, the process advances to the step #505. In the step #505, if the number of the close detecting points are larger than that of the remote detecting points, it is judged that the main object is significantly near the photographer's side, such that the closet detecting point is selected (#506). Further, if the number of the close detecting points is larger, it is judged that the main object is at the remote side and the closet point among the remote detecting points is selected taking account of the object field depth. (#510). In the step #504, if the central detecting point is at the remote side, the process advances to the step #508.

If the number of the remote detecting points is larger than that of the close detecting points, it is judged that the main object is at the remote side including the central detecting point to be selected (#509). If the number of the remote detecting points is less, the closest detecting point is selected as mentioned above (#506).

Thus, if there are any detectable points, any one of them is automatically selected and the process returns to the main routine (#511), and the focus detecting operation is carried out again at this detecting point (#107). In the same manner as in the case of FIG. 16A, the focus display when the detecting point is selected by use of the sight line information as mentioned above, the detecting point 201 and the focusing mark 79 are lighted when focused as mentioned in FIG. 16B, while the sight line input mark 78 is of course not lighted.

Sight Line Detection

Figure 10A:
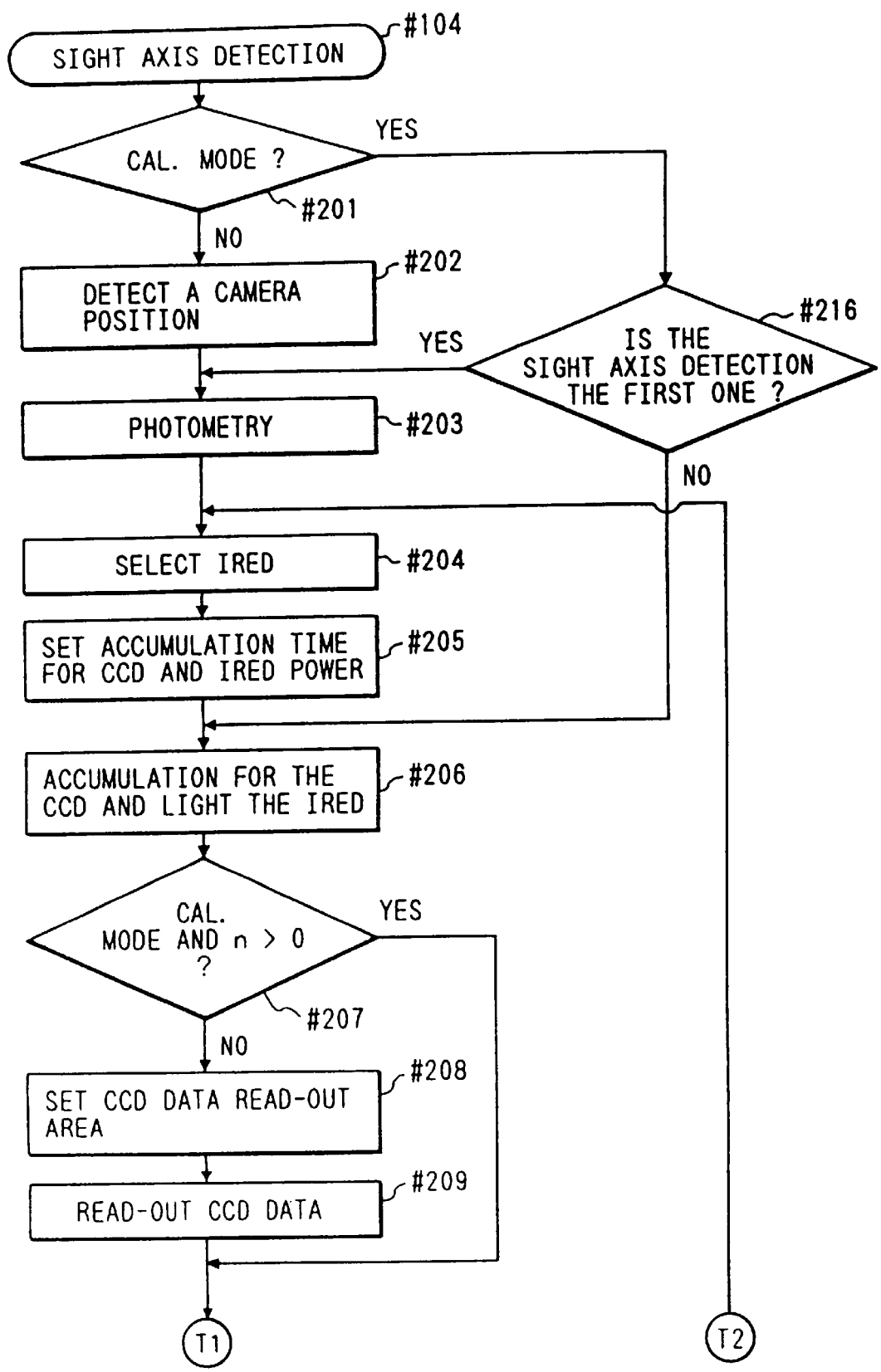
FIGS. 10A and 10B are flow diagrams for the sight line detection.
Figure 10B:
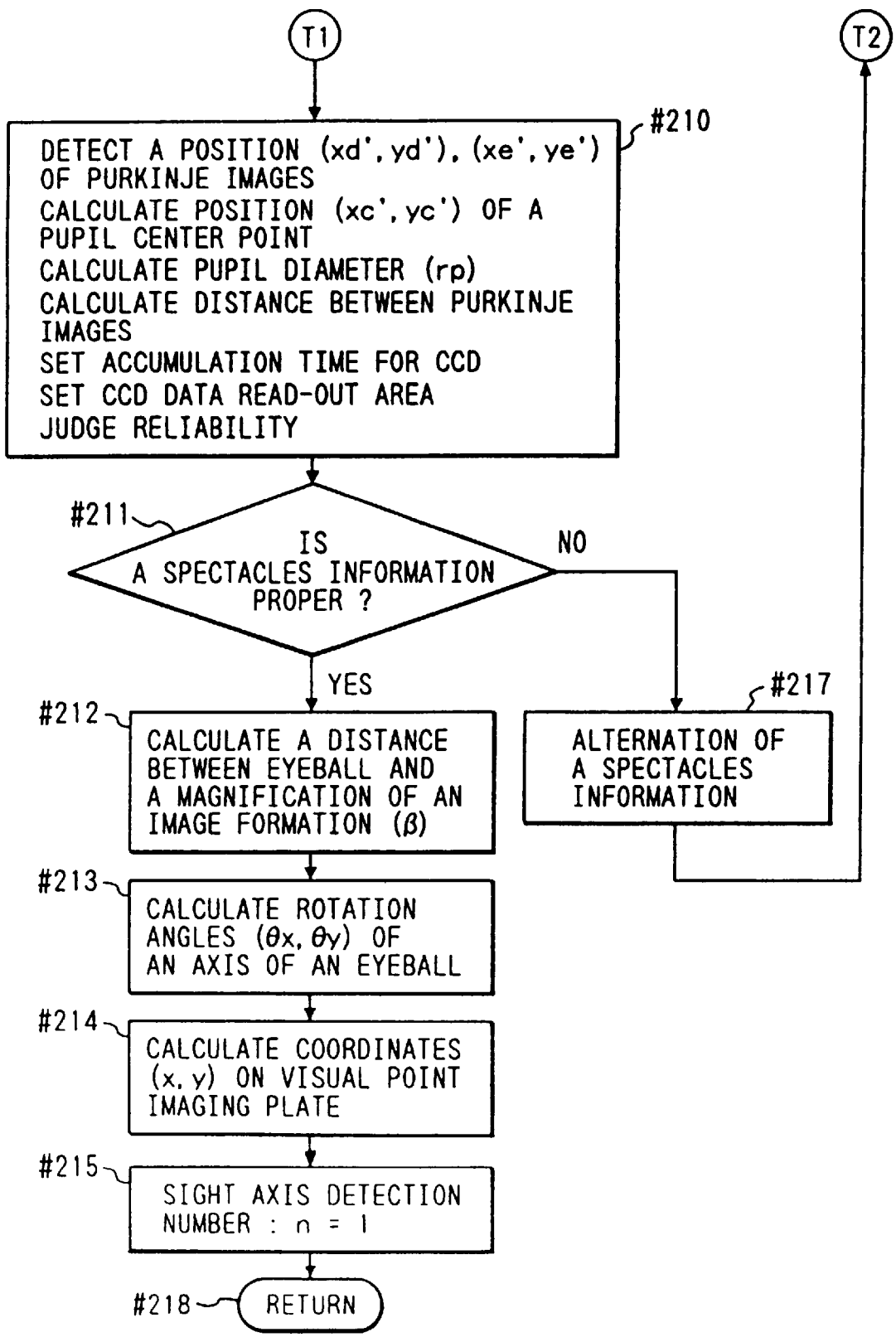

FIGS. 10A and 10B are flow diagrams for the sight line detection. As aforementioned, the sight line detecting circuit 101 executes the sight line detection in response to signals from the CPU 100 (#104). The CPU 100 judges if the sight line detection is performed in the photographing mode or in the calibration mode (#201). Simultaneously, the CPU 100 recognizes to what calibration date number the camera is set.

The CPU 100, in the case of the sight line detection in the photographing mode, firstly detects the position of the camera e.g., at the longitudinal position or the lateral position etc., on the basis of the signal supplied through the signal input circuit 104 from the position detecting means 27 (#202). Namely, the signal input circuit 104 processes the output signal from the mercury switch 27 (SW-ANG) as the position detecting means to determine whether the camera is at the longitudinal position or the lateral position, and if it is at the longitudinal position, it is judged if the release button 41 side is in the upper direction or the lower direction. Subsequently, it receives lightness information in the photographic region from the photometric circuit 102 through the CPU 100 (#203).

Then any of the infrared light-emitting diodes (IRED) 13a–13f on the basis of the photographer's spectacle information contained in the calibration data and the previously detected camera position data (#204). Namely, if the camera is at the lateral position and the photographer wears no spectacles, the pair of IRED 13a and 13b at the finder optical axis side is selected as shown in FIG. 2A. If the camera is at the lateral position and the photographer wears spectacles, the pair of IRED 13c and 13d remote from the finder optical axis is selected.

At this time, it is composed that a part of the illuminating light reflected from the spectacles of the photographer reaches at a region out of the predetermined region on the image sensor onto which the eye image is projected, such that no disturbance takes place for analyzing the eye image. Namely, the illuminating direction toward the eye is modified in accordance with the spectacle information to prevent the reflected light (noise light) from the spectacles from entering the image sensor, thereby enabling accurate sight line detection.

Also, if the camera is set at the longitudinal position, either combination of IRED 13a and 13e or IRED 13b and 13f is selected for illuminating the photographer's eye from lower part.

Next, the accumulating time of the image sensor 14 (CCD-EYE) and the illuminating power of the IRED 13 are set on the basis of the aforementioned photometric information and the photographer's spectacle information (#205). The accumulating time of the CCD-EYE 14 and the illuminating power of the IRED 13 may also be set on the basis of the values determined from the contrast of the eye image etc., having been obtained from the previous sight line detection.

Upon determination of the accumulating time of the CCD-EYE 14 and the illuminating power of the IRED 13, the CPU 100 turns the IRED 13 with a predetermined poser through the IRED driving circuit 107, while the sight line detecting circuit 101 starts accumulating the CCD-EYE 14 (#206). The CCD-EYE 14 terminates the accumulation in accordance with the previously set accumulating time of the CCD-EYE 14, and the IRED 13 is turned off in accordance therewith. If it is not in the sight line calibration mode (#207), a predetermined reading region in the CCD-EYE 14 is determined (#208).

Except in the first sight line detection after the power source of the camera body is turned on, the reading region of the CCD-EYE is set on the basis of the reading region of the CCD-EYE 14 at the previous sight line detection. But when the position of the camera is changed or when the presence or the absence of the spectacles is changed, the reading region of the CCD-EYE 14 is set again to the entire region. Upon determination of the reading region of the CCD-EYE 14, the reading operation of the CCD-EYE is carried out (#209). At this time, the regions other than the reading region are practically omitted from the reading operation.

The image output having been reading out from the CCD-EYE 14 is A/D-converted in the sight line detecting circuit 101 and is then stored in the CPU 100 where calculations for extracting the characteristic points of the eye image are executed (#210). Namely, in the CPU 100, the positions (xd', yd'), (xe', ye') of the Purkinje image (cornea reflected image) which is a virtual image of a pair of IRED 13 used for illuminating the eye are detected. As the Purkinje image appears as a high-intensity lighting point, it is also possible to set a predetermined threshold value with respect to the intensity and to determine those beyond the threshold value as a Purkinje image.

Further, the central position (xc', yc') of the pupil is calculated by detecting a plurality of border points between the pupil 19 and the iris 17 and applying the least square approximation of the circle with the border points as a basis. At this time, the pupil diameter rp is also calculated. Further, the distance of both the Purkinje images is calculated from their positions. A lightness Lp around the photographer's eye is calculated from the accumulating time of the CCD-EYE 14, the illuminating power of the IRED and the image output of the CCD-EYE 14.

CPU 100 analyzes the eye image and detects the contrast of the eye image to reset the accumulating time of the CCD-EYE 14 from the degree of the contrast. Further, the CPU 100 sets the reading region of the CCD-EYE 14 from the positions (xd', yd'), (xe', ye') of the pupil and the positions of the Purkinje image.

At this time, the reading region of the CCD-EYE 14 is set to a range including the detected pupil and in which the entire pupil can be detected even when the position of the pupil changes by a predetermined amount. The magnitude of this change is of course less than the outer diameter of the iris.

The reading region of the CCD-EYE 14 is set to be square, and the coordinates at two diagonal points of the square are stored in the EEPROM 100a as a reading region of the CCD-EYE 14. Further, the positional reliability of the Purkinje image and the pupil center are determined from the contrast of the eye image or the size of the pupil. These reliability data form a part of the sight line correcting data (calibration data).

Upon termination of the eye image analysis, the sight line detecting circuit 101 acting also as a calibration data confirming means will determine if the spectacles information being one of the calibration data is correct by the combination of the IRED 13 being turned on and the distance of the calculated Purkinje image (#211). This is to cope with photographers who sometimes do use spectacles and sometimes not.

Namely, when the photographer's spectacles information in the calibration data is set forth as using spectacles and the IRED 13c and 13d in the IRED 13 shown in FIG. 2B are lighted, if the distance between the Purkinje images is larger than a predetermined value, the photographer is judged as wearing spectacles and the spectacles information is judged as correct. In contrasts if the distance between the Purkinje images is less than the predetermined value, the photographer is judged to be not wearing spectacles or wearing contact lens and the spectacles information is judged to be incorrect.

When the spectacles information is judged to be incorrect (#211), the CPU 100 changes the spectacles information being the sight line correcting data (#217), and select another pair of the IRED 13 (#204) to detect the sight line. In changing the spectacles information, however, the spectacles information stored in the EEPROM of the CPU 100 is not changed.

When the spectacles information is judged as being correct (#212), the distance between the eye-piece 11 of the camera and the photographer's eye is calculated from the distance between the Purkinje images, and an imaging magnification of the eye image having been projected onto the CCD-EYE 14 is calculated from the distance between the eye-piece 11 and the photographer's eye 15 (#212). From the aforementioned calculated values, the rotational angle of the optical axis 15a of the eye 15 can be represented by modifying the equation (3) as follows (#213):

$$\theta x = ARC*SIN \{(xc'-(xp'+\delta x)/\beta/OC\} \quad (6)$$

$$\theta y = ARC*SIN \{(yc'-(yp'+\delta y)/\beta/OC\} \quad (7)$$

where $xp' \simeq (xd'+xe')/2$ $yp' \simeq (yd'+ye')/2$ and $\delta x$, $\delta y$ are correcting terms for correcting the central position of the two Purkinje images.

Upon determination of the rotational angles $\theta x$ and $\theta y$ of the photographer's eye, the position (x, y) on the sighting point on the focus plate 7 can be represented by modifying the equation (5) as follows (#214):

$$x = m*ax*(\theta x+bx) \quad (8)$$

$$y = m*ax*(\theta y+by) \quad (9)$$

where ax, bx and by: parameters for correcting the personal errors in the sight line, and ax being calibration data.

Further, bx equivalent to the correcting amount between the optical axis of the eye and the sighting axis in the horizontal (x) direction can be expressed as follows:

$$bx=kx*(rp-rx)+b0x$$

or $$bx=kx*(Lp-Lx)+b0x \quad (10)$$

where
rp: pupil diameter
Lp: lightness around the photographer's eye
rx, Lx: constant
b0x: calibration data Further, in the equation (10), the proportional factor kx relating to the pupil diameter rp or the lightness Lp depends on the pupil diameter or the lightness and set as:

if $rp \geq rx$ or $Lp \geq Lx$, then kx=0;

if $rp<rx$ or $Lp<Lx$, then $kx=\{1-k0*k1*(\theta x+bx')/|k0|\}*k0 \quad (11)$

Namely, the proportional factor kx would become 0 when the pupil diameter rp or the lightness Lp around the photographer's eye exceeds a predetermined value rx or lightness Lx. On the contrary, if the pupil diameter or the lightness around the photographer's eye is less than the predetermined value rx or the lightness Lx, the kx would become a function of the rotational angle $\theta x$ of the optical axis of the eye.

In addition, bx' is equivalent to the correcting amount of the sighting axis of the photographer viewing the substantial center of the finder and can be expressed as follows:

$$bx'=k0*(rp-rx)+b0x;$$

or $$bx'=k0*(Lp-Lx)+b0x$$

where
k0: calibration data standing for a rate of change of the correcting amount bx of the sighting axis with respect to the change of the pupil diameter rp or the lightness Lp
k1: a predetermined constant Further, by, a function of the lightness Lp around the photographer's eye, equivalent to the correcting amount in the vertical (y) direction can be expressed as follows:

$$by=ky*rp+b0y;$$

or $$by=ky*Lp+b0y \quad (12)$$

where ky, b0y: calibration data. The method for calculating the aforementioned sight line calibration data will be described later.

In accordance with the reliability of the sight line calibration data, the reliability basis of the sight line coordinates having been calculated by use of the equations (8)–(12) are changed. Upon determination of the sight line coordinates on the focus plate 7, a flag indicating that the sight line detection has been executed once is raised (#215) and the process returns to the main routine (#218).

Figure 11:
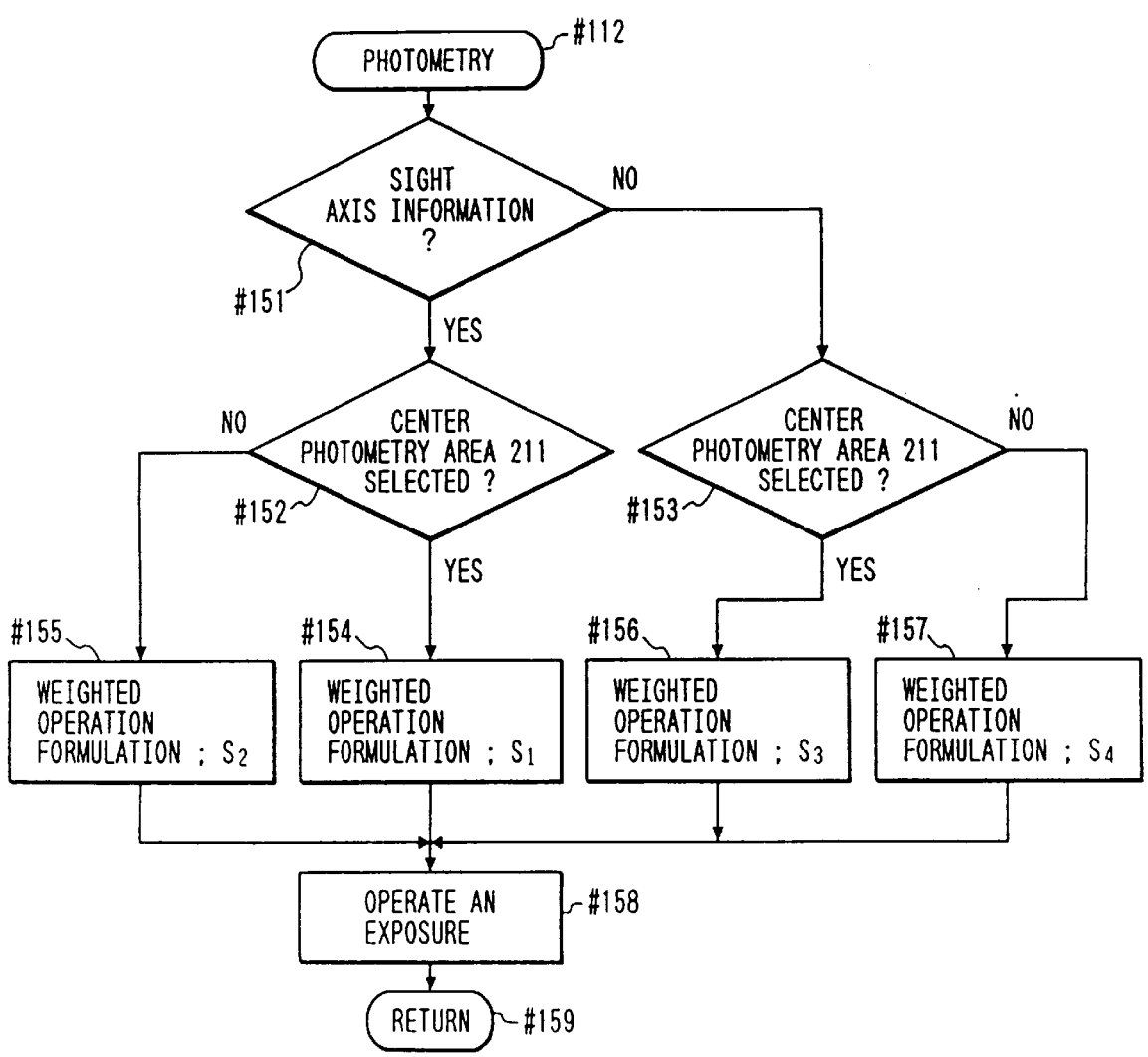
FIG. 11 is a flow diagram of a detecting region-selecting algorithm.

The flow chart of the sight line detection shown in FIGS. 10A to 11 is also effective for the sight line calibration. In the step (#201), when it is judged as the sight line detection in the calibration mode, then it is judged if the sight line detection of this time is the first sight line detection in the calibration mode (#216). If the judged result is affirmative, the environmental lightness is measured for setting the accumulating time of the CCD-EYE 14 and the illuminating power of the IRED 13 (#203). The operations to be performed thereafter are the same as mentioned above.

If it is judged that the sight line detection of this time is of a second time or more in the calibration mode (#216), the accumulating time of the CCD-EYE 14 and the illuminating power of the IRED 13 are set to the values of the previous time, and lighting of the IRED 13 and the accumulation of the CCD-EYE 14 are immediately started (#206). If it is judged as the sight line detection of this time is of a second time or more in the sight line calibration mode (#207), the same reading region of the CCD-EYE 14 as in the previous time is used such that the reading of the CCD-EYE 14 is immediately started upon the termination of the accumulating operation thereof. The operations thereafter are the same as mentioned above.

In the flow chart of the sight line detection shown in FIGS. 10A and 10B, the variable to return to the main routine is, in the case of normal sight line detection, the coordinates (x, y) of the sight line of the focus plate. But in the case of the sight line detection in the calibration mode of the sight line, it is the rotational angle ($\theta x$, $\theta y$) of the photographer's eye optical axis and the lightness Lp. The other variables, e.g. the reliability of the detected result, the accumulating time of the CCD-EYE 14, and the reading region of the CCD-EYE 14 are identical.

In this embodiment, the photometric information detected by the photometric sensor 10 of the camera is used for setting the accumulating time of the CCD-EYE 14 and the illuminating power of the IRED 13. But it is also possible to provide a means for detecting the lightness of the photographer's front eye portion near the eye-piece 11 and to use the detected value. In the same manner, the lightness detecting means may also be used for lightness Lp around the photographer's eye.

Calibration

Figure 12:
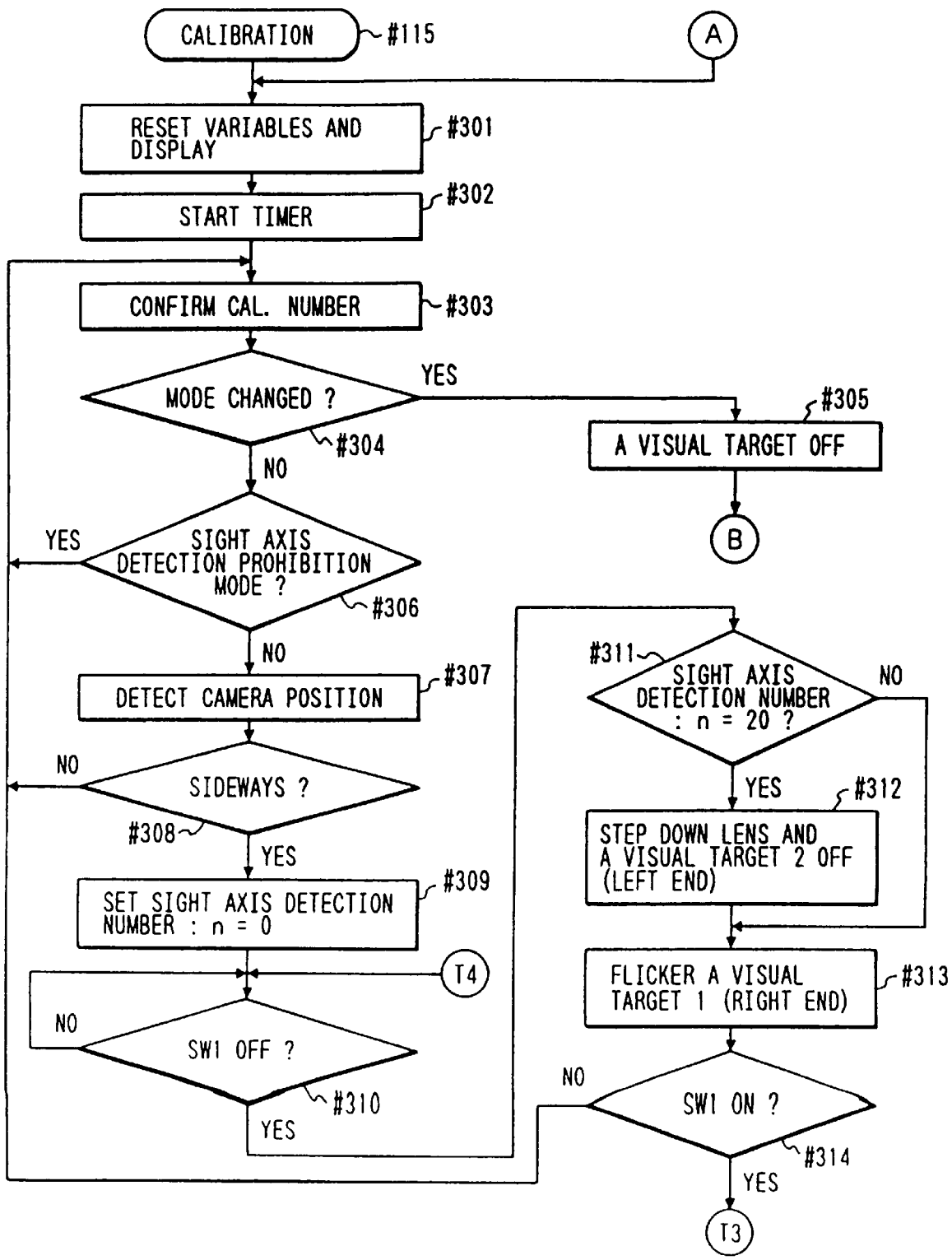
FIG. 12 is a pre-stage of a flow chart for a calibration according to the present invention.
Figure 13:
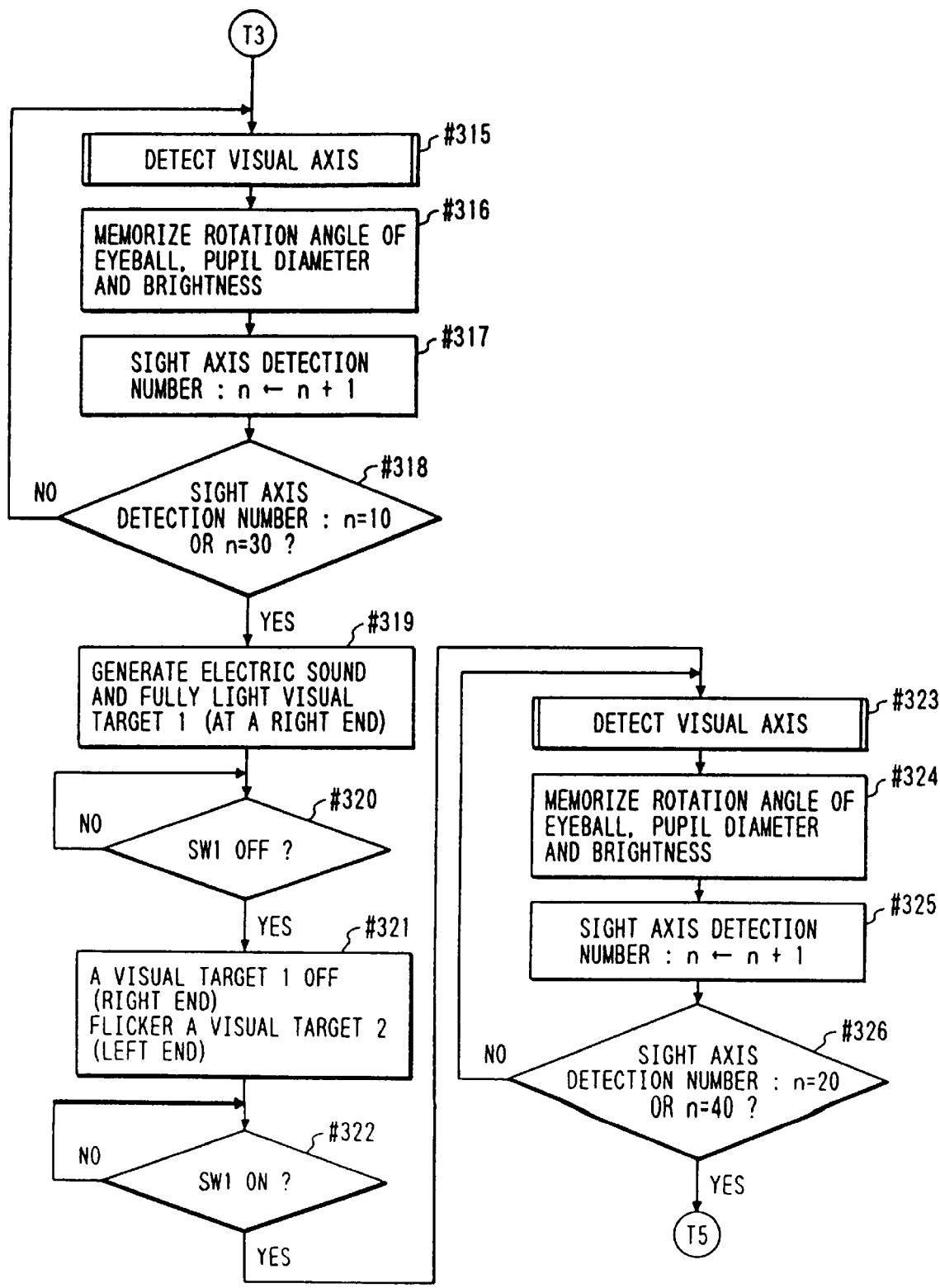
FIG. 13 is a mid-stage of a flow chart for a calibration according to the present invention.
Figure 14:
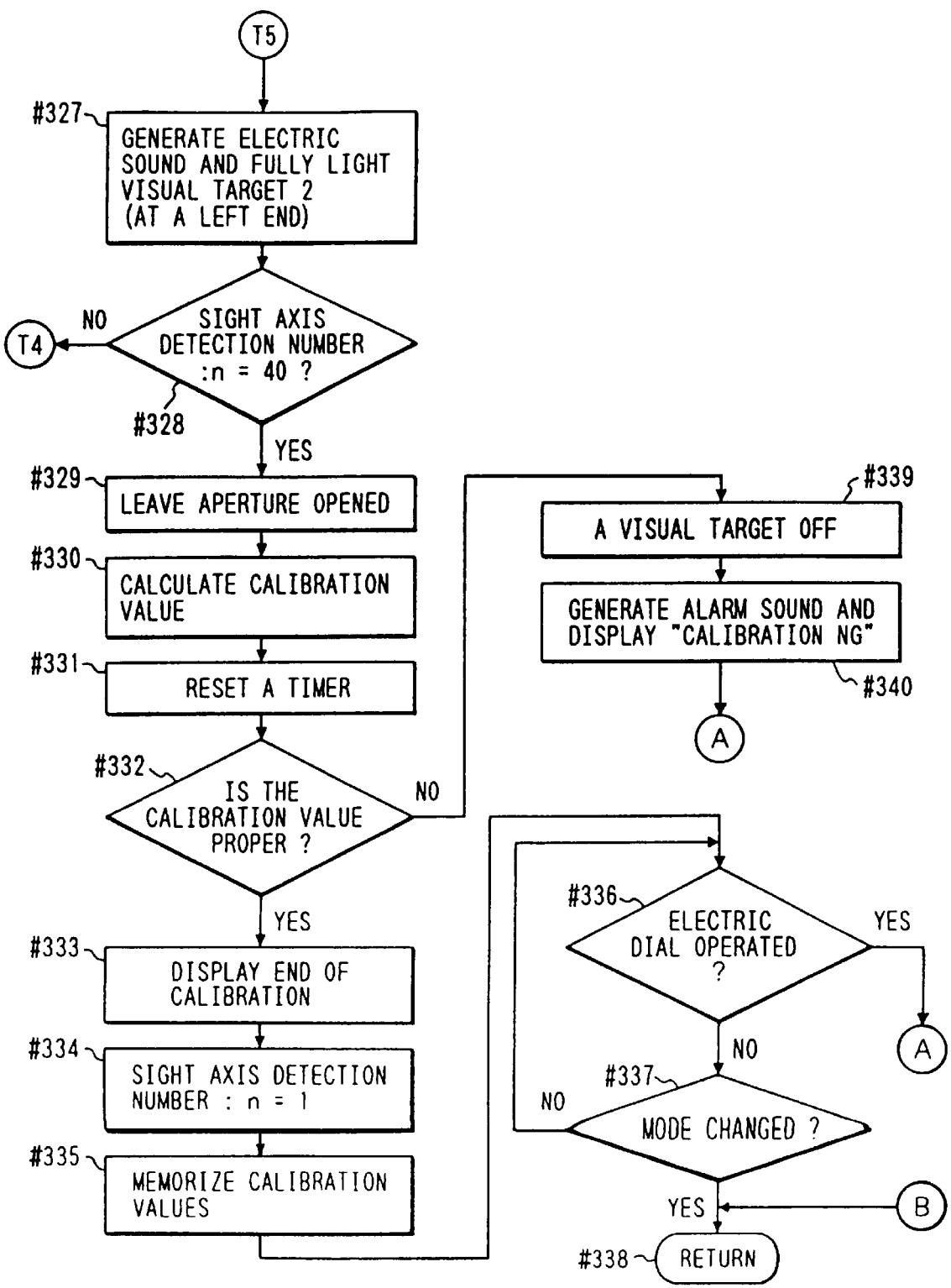
FIG. 14 is a post-stage of a flow chart for a calibration according to the present invention.

FIGS. 12, 13 and 14 show flow charts for the sight line calibration, while FIGS. 17A to 17C, 18, 19, 20A to 20D, 21A and 21B, 22A and 22B show display states of the in-finder LCD 24 and the monitoring LCD 42 during the sight line calibration.

Conventionally, the sight line calibration has been carried out by detecting the sight line of the photographer viewing more than two visual marks. Meanwhile, in this embodiment, it is executed by detecting the sight line when the photographer views twice two visual marks with different finder lightness. This will now be described with reference to the drawings.

When the photographer rotates the mode dial 44 (FIGS. 4A and 4B) and adjusts the CAL position 44d to the visual mark, the sight line calibration mode is set. The signal input circuit 104 transmits signals to the LCD driving circuit 105 through the CPU 100, and the monitoring LCD 42 indicates that the operation has been set to any of the sight line calibration modes mentioned later. The CPU 100 resets variables other than the calibration data stored in the EEPROM (#301).

Table 1 shows kinds and initial values of the calibration data to be stored in the EEPROM of the CPU 100. Those being practically stored in the EEPROM of the CPU 100 are the data surrounded by the solid line in Table 1, the currently set calibration data numbers and a plurality of calibration data administered by these calibration numbers. The calibration data number 0 is for prohibiting the sight line detection. The aforementioned sight line calibration data are stored at the addresses in the EEPROM 100a corresponding to the calibration data number 1–5 (though only five data are stored in this embodiment, it can varied freely by selecting the capacity of the EEPROM). (Table 1 is hereinafter shown on Page 92.)

The initial value of the calibration data are set to such values as the sight line is detected by the standard eye parameter. There are provided flags for indicating whether the photographer wears spectacles and indicating the degree of the reliability of the calibration data. The initial value of the flag representing the presence or absence of the spectacles is set to "1" as the presence, while the initial value of the flag representing the reliability of the calibration data is set to "0" as unreliable.

Figure 17A:
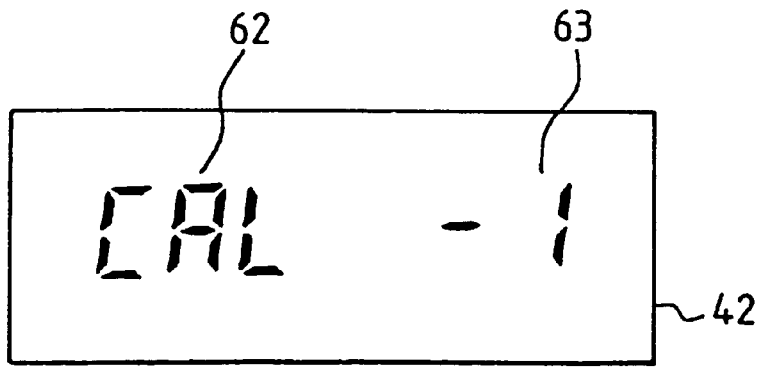
FIGS. 17A to 17C are explanatory views of a display state of a monitoring LCD shown in FIGS. 2A and 2B.
Figure 17B:
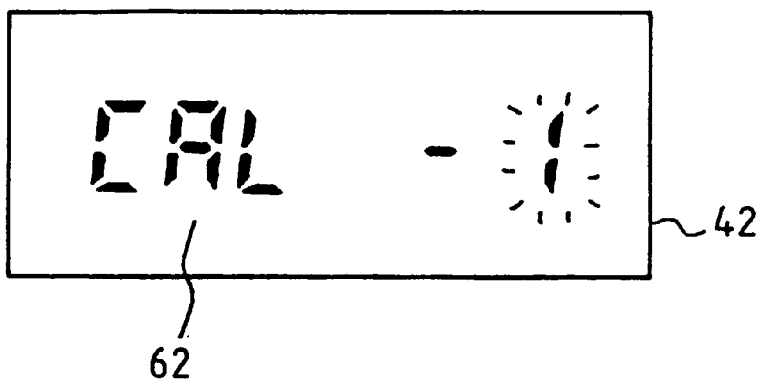
Figure 17C:
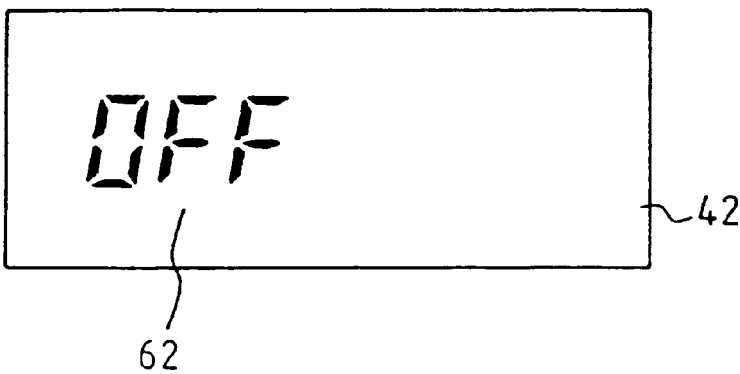

The monitoring LCD 42 displays the currently set calibration mode as shown in FIG. 17A. The calibration mode includes an "ON" mode for performing the calibration and an "OFF" mode for performing no calibration.

In the "ON" mode, calibration numbers CAL 1–CAL 5 corresponding to the calibration data numbers 1–5 are prepared, the display is made by use of the seven-segment 62 for indicating the shuttering time and the seven-segment 63 for indicating the stopping value, and the other fired segment display portion 42a are all turned off (in the shown embodiment, the state of the data number 1 is shown with only the seven-segment display section being enlarged).

At this time, when the calibration data of the set calibration number is the initial value, the calibration number displayed on the monitoring LCD 42 flickers (FIG. 17B), while the calibration mentioned later is executed for the set calibration number. If the calibration data (sight line correcting data) at the corresponding calibration date number is different from the initial value, the calibration number displayed in the monitoring LCD 42 is entirely turned on (FIG. 17A).

As a result, the photographer can confirm if the calibration data are already set at the presently set respective calibration number. The initial value of the calibration data number is set to 0 such that the information input by the sight line is not carried out unless the sight line calibration is performed.

Next, in "OFF" mode, the seven-segment 62 is displayed as "OFF" (FIG. 17C), the calibration number 0 is always selected to set the sight line prohibited mode. This can be effectively used in the following photographing situation, for example:

(1) Where the photographer's sight line cannot be detected due to an intensive light e.g., sun light illuminating the eye or due to extremely high-lightness scene e.g., snow mountains or beaches in fine weather being viewed through the finder;

(2) Where the control is made against the photographer's will or is impossible, e.g., where there is a main object other than the detecting point around the screen or where the background is observed for a while for setting the photographic composition; and (3) Where the sight line detecting position becomes incorrect to cause mis-operation due to the unfit calibration data, e.g., where the photographer is abruptly changed to another in taking a commemoration photograph.

In these cases, the photographer preferably prohibits the sight line detection and selects the photographing mode for controlling the photographic functions without using the sight line information.

Subsequently, the timer set in the CPU 100 starts calibrating the sight line (#302). If no operation is made for the camera during a predetermined time after the timer start, the CPU 100 resets the calibration data number to 0 and changes to the sight line prohibited (OFF) mode. If any visual mark etc., for the sight line calibration is illuminated in the finder, it is turned off.

Figure 18:
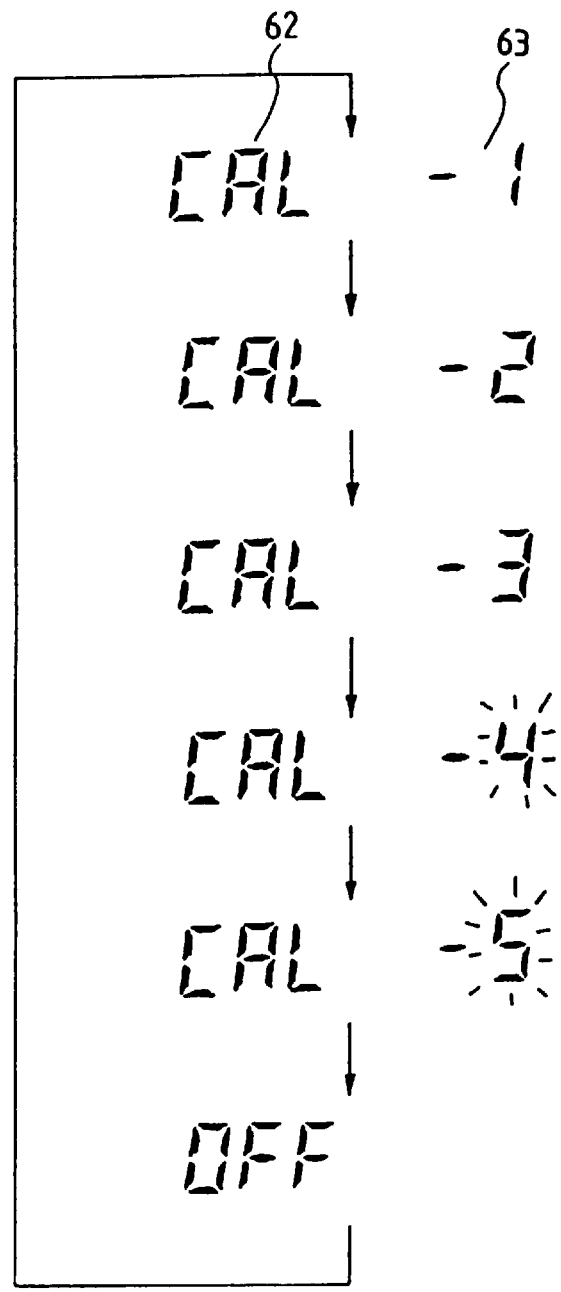
FIG. 18 is an explanatory view of a display state of the monitoring LCD shown in FIGS. 2A and 2B.

When the photographer rotates the electronic dial 45, the signal input circuit 104 having detected the rotation supplies signals to the LCD driving circuit 105 through the CPU 100. As a result, the calibration number displayed on the monitoring LCD 42 changes in synchronicity with the rotation of the electronic dial 45. These aspects are shown in FIG. 18.

As the electronic dial 45 is rotated in the clockwise direction, it is changed as "CAL-1"–"CAL-2"–"CAL-3"–"CAL-4"–"CAL-5". The photographer can store the calibration data in any desired one of the five calibration data number. In the state shown in FIG. 18, the calibration data are already stored in the "CAL-1, 2, 3", while no data in "CAL-4, 5" indicating to remain in the initial value by flickering.

As the electronic dial 45 is further rotated by one click in the clockwise direction, "OFF" display is made not to perform any calibration so as to be in sight line detection prohibited mode. Further rotation by one click would return to "CAL-1". Thus, the calibration number is cyclically displayed. If the rotation of the electronic dial is made in the counter-clockwise direction, the display would become in the reverse order of that shown in FIG. 18.

When the photographer selects desired calibration number viewing the displayed calibration numbers on the monitoring LCD 42, the sight line detecting circuit 101 confirms the corresponding calibration data number through the signal input circuit 104 (#303). The confirmed calibration data number is stored in a predetermined address of the EEPROM of the CPU 100.

If the confirmed calibration data number is not changed, however, it is not stored in the EEPROM.

Subsequently, the sight line detecting circuit 101 confirms the photographing mode through the signal input circuit 104 (#304). When it is confirmed that the photographer has changed to a photographing mode other than the sight line calibration mode by rotating the mode dial 44 (#304), the visual mark for calibrating the sight line, if flickering, in the finder is turned off (#305) and the operation returns to the photographing operation of the camera being the main routine (#338).

Figure 19:
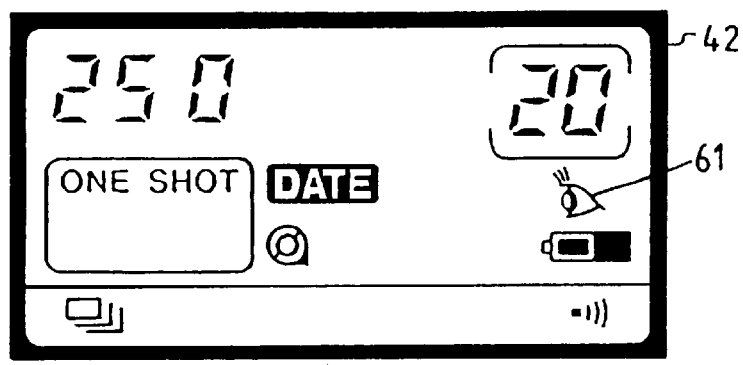
FIG. 19 is an explanatory view of a display state of the monitoring LCD shown in FIGS. 2A and 2B.

Meanwhile, if the mode dial 44 is operated to change to the other photographic mode (shutter preferential AE) while the calibration numbers "CAL1–5" being displayed, the sight line is detected by use of the data of that calibration number to perform the photographing operation using the aforementioned sight line information. The state of the monitoring LCD 42 at this time is shown in FIG. 19 in which the sight line input mode display (EYE mark) 61 is lighted in addition to the normal photographing mode display to inform the photographer of the sight line input mode controlling the photographing operation on the basis of the sight line information.

When the mode dial 44 is rotated again to adjust the visual mark to the CAL position 44, the calibration number used for the aforementioned sight line detection is displayed to start the calibrating operation. But if the photographer makes no operation during a predetermined time or if the identical calibration data are sampled, the calibration data in the EEPROM is not changed.

If it is confirmed that the operation remains to be set to the sight line calibration mode (#304), the calibration number having been set by the electronic dial 45 is confirmed again (#306). At this time, if the calibration data number 0 and the sight line prohibited mode are selected, the calibration data number is stored again in the EEPROM of the CPU 100 (#303). In the calibration mode, if the sight line prohibition is selected, the camera remains in stand-by state until the mode is changed to a photographic mode other than the sight line calibration mode through the mode dial 44.

Namely, when the mode dial 44 is switched while "OFF" is being displayed, the photographing operation is performed without detecting the sight line, during which the sight line input mode display 61 in the monitoring LCD 42 is turned off.

If the calibration data number is set to any value other than 0 (#306), the CPU 100 continues detecting the position of the camera by the position detecting means through the signal input circuit 104 (#307). The signal input circuit 104 processes the output signal from the mercury switch 27 to determine whether the camera is in the longitudinal position or in the lateral position, and if it is in the longitudinal position, whether the release button 41 side is in the upward direction or in the downward direction, for example.

As a camera is usually used in the lateral position, the hardware structure for calibrating the sight line is also designed to enable the calibration when the camera is in the lateral position. Therefore, when the sight line detecting circuit 101 does not calibrate the sight line when informed that the camera position is not in the lateral position by the CPU 100, i.e., prohibits the detection of the sight line correcting data.

Figure 21A:
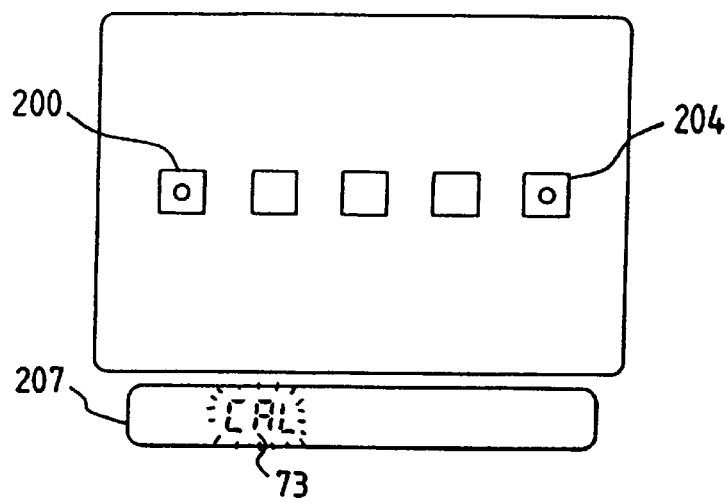
FIGS. 21A and 21B are explanatory views for a display state of the field of view of the finder shown in FIG. 1.

The CPU 100 further flickers the "CAL" display on the in-finder LCD 24 as a component of the warning means provided in the finder of the camera as shown in FIG. 21A, in order to warn the photographer of the sight line calibration being unable due to the longitudinal position of the camera. At this time, it is possible to produce a warning sound by a sounding body as a warning means not shown.

On the other hand, when the position of the camera is detected as being in the lateral position (#308), the CPU 100 sets the number n of sight line detecting times to 0 (#309). If n is 20, however, this number is held unchanged. At this time, if the "CAL" display is flickering in the in-finder LCD 24, this flickering is stopped. The sight line calibration is set to start upon turning on of the switch SW1. For preventing the calibration from starting at the camera side before the photographer's preparation for the calibration is completed, the CPU 100 confirms the state of the switch SW1 and remains in stand-by state until the switch SW1 turns off if the switch SW1 is depressed by the release button 41 to be turned on (#310).

Figure 20A:
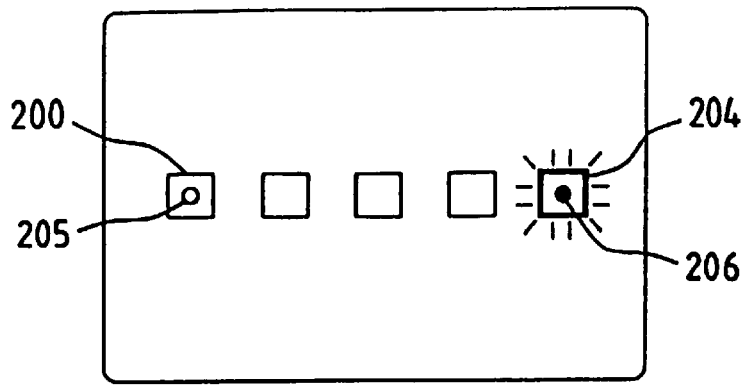
FIGS. 20A to 20D are explanatory views for a display state of the field of view of the finder shown in FIG. 1.

When the CPU 100 confirms that the switch SW1 is turned off through the signal input circuit 104 (#310), it confirms again the number n of the sight line detection times (#311). If the number n is not 20 (#311), the CPU 100 supplies signals to the LED driving circuit 106 to flicker the visual mark for the calibration (#313). The visual mark for the sight line calibration is partly used as the detecting point mark for conducting the calibration described below to the superimposing display for smooth operation of the photographer. Firstly, the detecting point mark 204 and the dot mark 206 at the right end flicker (FIG. 20A).

Unless there is any On signal input of the switch SW1 as a trigger signal for starting the sight line calibration, the camera remains in stand-by state (#314). When the photographer turns his eyes at the visual mark having started flickering and depresses the release button 41 to turn on the switch SW1 (#314), the sight line detection is carried out (#315). The sight line detecting operation is as explained in the flow diagram shown in FIG. 9.

Dot marks 206, 205 are formed in the right-end detecting mark 204 and the left-end detecting mark 200 to indicate that the calibration is performed at these two positions. Both marks are illuminated by the superimposing LED 21 to light, flicker, and non-light. The detecting point marks 200–204 represent the regions for detecting the focus, display equivalent to those regions are necessary.

For the accurate calibration, the photographer should turn his eyes only at one point as far as possible. For facilitating this, the dot marks 205, 206 are sized smaller than the detecting point marks 200–204. The CPU 100 stores the rotational angle θx, θy of the eye. The pupil diameter rp or the lightness Lp around the eye, and the reliability of the respective data, which are variables from the sight line detecting sub-routine, are memorized (#316). Further, the number n of the sight line detecting times is counted up (#317).

As the sight line of the photographer is somewhat dispersed, it is effective to perform a plurality of times of sight line detection for a single visual mark and to use their averaged value for enhancing the accuracy of the calibration data. In this embodiment, the number n for a single visual mark is set to 10. Unless the number n is 10 or 30 (#318). the sight line detection continues (#315).

In this embodiment, the sight line calibration is performed twice with different lightness of the finder. Therefore, the number n when the second sight line calibration is performed starts from 20. If the number n is 10 or 30, the sight line detection for the visual mark 1 (detecting point mark 204, dot mark 206) is finished (#318).

Figure 20B:
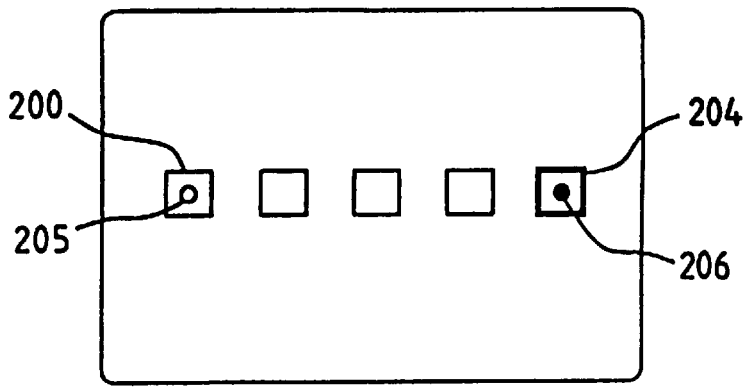

For informing the photographer of the end of the sight line detection for the visual mark 1, the CPU produces an electronic voice several times using a sounding body not shown. At the same time, the CPU 100 lightens the visual mark 1 entirely for a predetermined time (#319) (FIG. 20B).

Figure 20C:
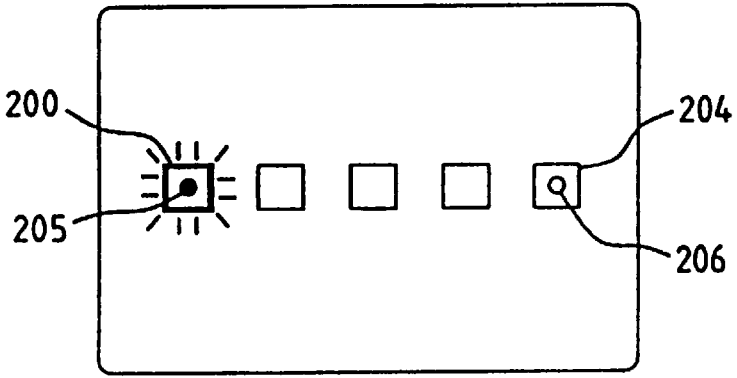

Subsequently, the CPU 100 confirms if the switch SW1 is turned off through the signal input circuit 104 (#320). If the switch SW1 is turned on, the CPU 100 remains in stand-by state until it is turned off, and if the switch SW1 is turned off, the visual mark 1 is turned off and the left-end visual mark 2 (detecting point mark 200, dot mark 205) starts flickering (#321)(FIG. 20C).

The CPU 100 confirms again if the switch SW1 is turned on through the signal input circuit 104 (#322). If the switch SW1 is turned off, the CPU 100 remains in stand-by state until it is turned on and starts the sight line detection upon turning on the switch SW1 (#323). The CPU 100 stores the rotational angle θx, θy of the eye, the pupil diameter rp or the lightness Lp around the eye, and the reliability of the respective data, which are variables of the sight line detecting sub-routine (#324). Further, the number n of the sight line detecting times is counted up (#325). Unless the number n of the sight line detecting times is 20 or 40 (#326), the sight line detection is continued (#323). If the number n is 20 or 40, the sight line detection for the visual mark 2 is terminated (#326).

Figure 20D:
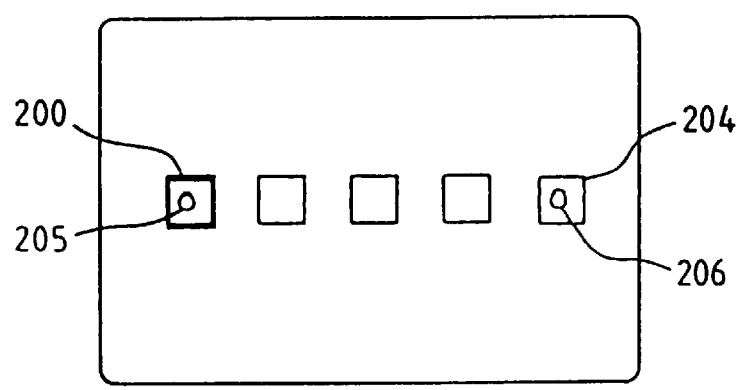

For informing the photographer of the termination of the sight line detection for the visual mark 2, the CPU 100 produces an electronic voice several times using a sounding body as a warning means not shown. At the same time, the CPU 100 entirely lightens the visual mark 2 through the LED driving circuit 106 (#327) (FIG. 20D).

If the sight line detection for the visual marks 1 and 2 are completed and the number n is 20 (#328), the second sight line detection for the visual marks with different lightness of the finder will be carried out. The CPU 100 confirms the state of the switch SW1 through the signal input circuit 104 (#310). If the switch SW1 is turned on, the CPU 100 remains in stand-by state until it is turned off, and if the switch SW1 is turned off, the CPU 100 confirms again the number n (#311).

If the number n is 20 (#311), the CPU 100 supplies signals to the stopping driving circuit 111 to set the stopping 31 of the photographic lens 1 to a minimum so as to enlarge the pupil of the photographer. At the same time, the CPU 100 turns the visual mark 2 off (#312). For starting the second sight line detection, the right-end visual mark 1 starts flickering (#313). The operations thereafter #314–#327 are the same as aforementioned.

When the sight line detections for the visual marks 1 and 2 with different lightness of the finder have been completed, the number n would become 40 (#328) so as to terminate the sight line detection for obtaining the sight line calibration. The CPU 100 supplies signals to the stopping drive circuit 111 to reset the stopping 31 of the photographic lens 1 to the open state (#329). Further, the sight line calibration data are calculated from the rotational angle (θx, θy) of the eye stored in the CPU 100, the pupil diameter rp or the lightness Lp around the eye (#330). The manner for calculating the sight line calibration data is as mentioned below.

Method for Calculating Calibration Data

The coordinates of the visual marks 1 and 2 on the focus plate 7 are designated by (x1, 0) and (x2, 0) respectively, the average values of the rotational angles (θx, θy) of the eye turning at the visual marks stored in the CPU 100 are designated by (θx1, θy1), (θx2, θy2), (θx3, θy3), (θx4, θy4), and the average value of the pupil diameter is designated by r1, r2, r3 and r4. Further, the average values of the lightness around the eye are designated by L1, L2, L3 and L4. In this case, (θx1, θy1), (θx3, θy3) stand for average values of the rotational angle of the eye detected when the photographer is turning his eyes at the visual mark 1, while (θx2, θy2), (θx4, θy4) stand for average values of the rotational angle of the eye detected when the photographer is turning his eyes at the visual mark 2.

In the same manner, r1, r3 stand for average values of the pupil diameter detected when the photographer is turning his eyes at the visual mark 1, while r2, r4 stand for average values of the pupil diameter detected when the photographer is turning his eyes at the visual mark 2. The suffixes 1 and 2 of the average values of each data represents that the data represent that the data have been obtained by sight detection with the finder of the camera in high-lightness state, while the suffixes 3 and 4 represent the same with the finder in dark state.

The equations for calculating the calibration data of the sight line in the horizontal direction (x direction) differ depending on the pupil diameter at the time of sampling data, as follows:

If $(r3+r4)/2 > rx > (r1+r2)/2$, then  (1)

$k0 = -\{(\theta x3+\theta x4)-(\theta x1+\theta x2)\}/\{2 \cdot rx-(r1+r2)\}$ $ax = (x3-x4)/m/(\theta x3-\theta x4)$ $b0x = -(\theta x3+\theta x4)/2$ If $rx \geq (r3+r4)/2 > (r1+r2)/2$, then  (2)

$k0 = -\{(\theta x3+\theta x4)-(\theta x1+\theta x2)\}/\{(r3+r4)-(r1+r2)\}$ $ax = (x3-x4)/m/\{\theta x3-\theta x4+k0 \cdot (r3-r4)\}$ $b0x = -k0 \cdot \{(r3+r4)/2-rx\}-(\theta 3+\theta 4)/2$ Further, the calibration data of the sight line in the vertical direction (y direction) can be calculated by the following equations:

$$ky=-\{(\theta y3+\theta y4)-(\theta y1+\theta y2)\}/\{(r3+r4)-(r1+r2)\}$$

$$b0y=\{(\theta y1+\theta y2)*(r3+r4)-(\theta y3+\theta y4)*(r1+r2)\}/2/\{(r1+r2)-(r3+r4)\}$$

After the calibration data of the sight line have been calculated, or after the sight line detection, the timer is reset (#331).

By the way, L1 and L3 are average values of lightness around the eye detected when the photographer is turning his eyes at the visual mark 1, while L2 and L4 are average values of lightness around the eye detected when the photographer is turning his eyes at the visual mark 2. The suffixes 1 and 2 attached to the average value of the data represent that the data were obtained when the sight line was detected with the finder being in high-lightness state, while the suffixes 3 and 4 represent that the data were obtained when the sight line was detected with the finder being dark.

The equations for calculating the calibration data of the sight line in the horizontal direction (x direction) varies depending on the lightness around the eye when the data are sampled as follows:

If $(L3+L4)/2>Lx>(L1+L2)/2$, then (1-1)

$$k0=-\{(\theta x3+\theta x4)-(\theta x1+\theta x2)\}/\{2*Lx-(L1+L2)\}$$

$$ax=(x3-x4)/m/(L3+L4)$$

$$b0x=-(\theta x3+\theta x4)/2$$

If $Lx \geq (L3+L4)/2 > (L1+L2)/2$, then (1-2)

$$k0=-\{(\theta x3+\theta x4)-(74\ x1+\theta x2)\}/\{(L3+L4)-(L1+L2)\}$$

$$ax=(x3-x4)/m/\{\theta x3-\theta x4+k0*(L3-L4)\}$$

$$b0x=-k0*\{(L3+L4)/2-Lx\}-(\theta 3+\theta 4)/2$$

Further, the calibration data of the sight line in the vertical direction (y direction) can be calculated by the following equations:

$$ky=-\{(\theta y3+\theta y4)-(\theta y1+\theta y2)\}/\{(L3+L4)-(L1+L2)\}$$

$$b0y=\{(\theta y1+\theta y2)*(L3+L4)-(\theta y3+\theta y4)*(L1+L2)\}/2/\{(L1+L2)-(L3+L4)\}$$

After the calibration data are calculated or the sight line detection is completed, the timer is reset (#331).

Further, the CPU 100 also used as a means for judging the reliability of the calibration judges whether the calibration data of the sight line are correct or not (#332). This judgment is carried out by use of the reliability in the rotational angle of the eye, the pupil diameter or the lightness around the eye, and the calculated calibration data themselves of the sight line which are variables of the sight line detecting sub-routine. Namely, if the rotational angle of the eye, pupil diameter or the lightness around the eye which are detected by the sight line detecting sub-routine are unreliable, the calculated calibration data of the sight line is also judged to be unreliable.

If the rotational angle of the eye, the pupil diameter or the lightness around the eye which are detected by the sight line detecting sub-routine are reliable, the calculated calibration data of the sight line are judged to be reliable or correct in case of in a range of typical personal error. If the calculated calibration data of the sight line are largely departed from the typical personal error range, the data are judged to be unreliable, incorrect. The CPU not only judges the correctness of the calculated calibration data of the sight line, but also determines the degree of the reliability of that data.

The degree of reliability depends on the reliability of the rotational angle of the eye, the pupil diameter or the lightness around the eye which are detected by the sight line detecting sub-routine. The reliability of the calibration data of the sight line is converted into a numerical value in two bits depending on the degree and stored in the EEPROM of the CPU 100 as mentioned later.

Figure 22A:
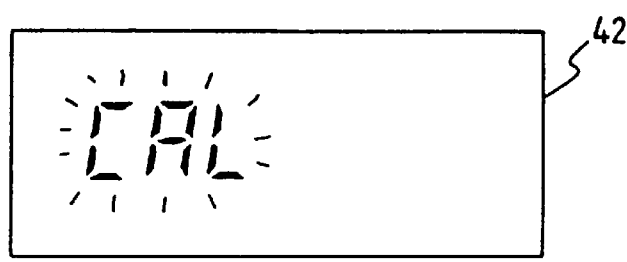
FIGS. 22A and 22B are explanatory views for a display state of the monitoring LCD shown in FIGS. 2A and 2B.

If the calculated calibration data of the sight line are judged to be unreliable (#332), the LED driving circuit 106 stops energizing the superimposing LED 21 to put out the visual marks 1 and 2 (#339). Further, the CPU 100 produces electronic sounds by using a sounding body not shown for a predetermined time to warn the user of the incorrect sight line calibration. At the same time, CPU supplies signals to the LCD driving circuit 105 to flicker the "CAL" display on the infinder LCD and the monitoring LCD 42 for warning (#340) (FIGS. 21A and 22A).

After the warning sound and the warning display are produced by the sounding body and the LCD 24, 42 respectively for a predetermined time, the process returns to the initial step (#301) of the calibration routine to be ready for the next sight line calibration.

Figure 21B:
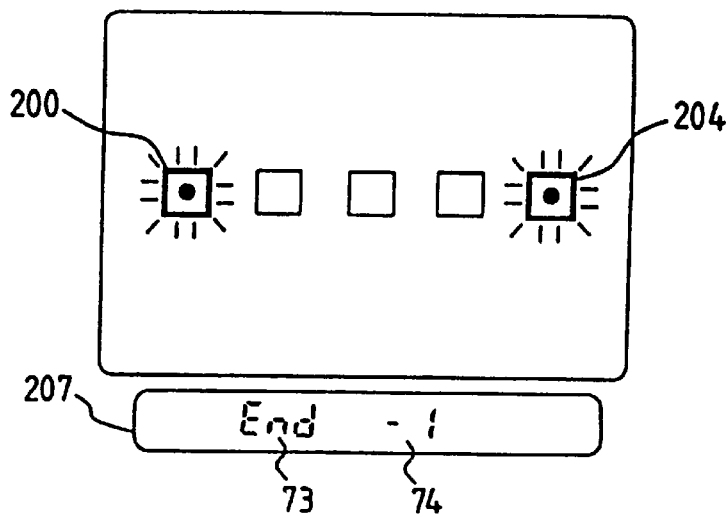
Figure 22B:
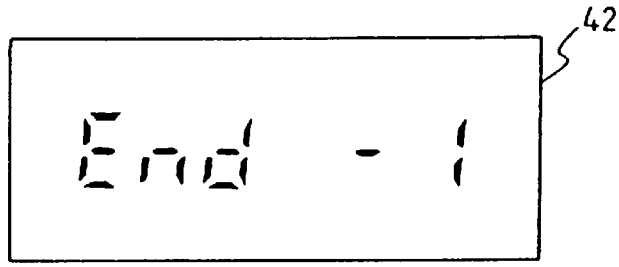

If the calculated calibration data of the sight line is correct (#332), the CPU 100 indicates the termination of the sight line calibration through the LCD driving circuit 105 and LED driving circuit 106 (#333). The LED driving circuit 106 energizes the superimposing LED 21 to flicker the visual marks 1 and 2 several times, while the LCD driving circuit 105 supplies signals to the LCD 24 and the LCD 42 to indicate "End-Calibration No" for a predetermined time (FIGS. 21B and 22B).

The CPU 100 sets the number n of the sight line detections to 1 (#334), and stores the calculated calibration data of the sight line, the spectacle information of the photographer and the reliability of the calculated calibration data of the sight line at the address of the EEPROM 100a corresponding to the calibration data number (#335). At this time, if the calibration data of the sight line are already stored at that address, the calibration data are renewed.

After a series of the sight line calibrating operation are completed, the camera remains in a stand-by state until the photographer operates the electronic dial 45 or the mode dial 44. When the photographer rotates the electronic dial 45 to select other calibration number, the CPU 100 detects this change of calibration number through the signal input circuit 104 (#336), and returns the process to the initial step (#301) of the calibration routine. Further, if the photographer rotates the mode dial 44 to select another photographic mode, the CPU 100 detects the change of the photographic mode through the signal input circuit 104 (#337) and returns the process to the main routine (#338).

On returning to the main routine, if there are no input calibration data for the calibration number set through the electronic dial 45 but only the initial value, the CPU 100 resets the corresponding calibration data number to 0 and compulsorily sets to the sight line prohibited mode. In practice, the CPU 100 resets the currently set calibration data number which is stored in the EEPROM to 0 (sight line prohibited mode).

In this embodiment, as an example, the sight line calibration has been carried out with the number of sight line detecting times when the photographer turning his eyes at a single visual mark set to 10, but any other number more than 10 may also be used.

Also, in this embodiment the calibration has been performed with different lightness state of the finder by adjusting the stopping 31 of the photographic lens 1. Alternatively, it is also possible to execute that by varying the light-emitting lightness of the superimposing LED 21 with the photographic lens being covered by the photographer.

FIG. 11 shows another embodiment of the present invention in which the photographic mode for controlling the photographic function of the camera is varied depending whether the sight line information is used or not.

In this embodiment, a flow of the photometric region selecting operation is shown in "#112" (photometric operation) in the flow diagram shown in FIGS. 8A and 8B.

Firstly, it is determined if the photometric region was selected on the basis of the sight line information, namely, if the sight line information was used (#151). If the result is affirmative, it is determined if the central photometric region 211 was selected (#152). Then the photometric value is calculated by use of a weighting formula S1 if the central photometric region 211 was selected, and by use of a weighting formula S2 if the left and right photometric regions 210, 212 were selected. In step #151, if the result is negative representing that no sight line information was used, i.e., the sight line detection prohibited mode was set or the photometric region was not selected on the basis of the sight line information due to impossibility of the sight detection, then it is determined if the central photometric region 211 was selected (#153).

Then, the photometric value is calculated by use of a weighting formula S3 if the central photometric region 211 was selected, and by use of a weighting formula S4 if the left and right photometric regions 210 and 212 respectively were selected. The weighting formulas S1–S4 are noted below where A–C stand for photometric values of: A=central photometric region, B=left sight photometric region, C=right side photometric region, D=peripheral region, respectively.

$$S1=(A*4+B*1.5+C*1.5+D*0.5)/6.5$$

$$S2=\{(B \text{ or } C)*4+A*1.5+(C \text{ or } B)*1+D*0.5\}/7$$

$$S3=(A*3+B*1.5+C*1.5+D*1)/7$$

$$S4=\{(B \text{ or } C)*3+A*1.5+(C \text{ or } B)*1+D*1\}/6.5$$

In each of the formulas S2 and S4, both cases of selecting the left and right photometric regions are described together. For example, if the left side photometric region is selected, B is selected in the first term, and C in the second term, for weighting the selected photometric region.

The characteristic feature of this embodiment is that the photometric region selected by use of the sight line information is highly weighted because of high possibility of containing main object compared to the case of not using the sight line information and its periphery being less weighted, thereby providing spot-type photometric value with the main object as center. In the case of not using the sight line information, the photometric value is calculated by rather averaging manner, though also weighting the selected photometric region.

Subsequently, in #158, exposure calculations are executed based on the photometric value calculated by the weighting formulas, the stopping values and the shuttering time at that photometric values and the film sensitivity are calculated, and then the process is returned to the flow chart (FIGS. 8A and 8B) of the camera operation.

As mentioned above, according to the embodiments of the present invention, there are provided both the photographic mode for controlling the photographic functions of the camera by use of the photographer's sight line information and the sight line prohibited photographic mode for controlling the photographic functions of the camera without using the sight line information which can be freely selected by the photographer. Accordingly, it is possible to perform the desired operations without undesirably affecting the photographic functions of the camera even when the sight line detection is impossible. Further, it is also possible to assure at least the same operational properties and photographic functions as the conventional camera even if the photographer is abruptly changed to another when a commemorative photo is taken, for example.

The present invention comprises a display means for indicating that the photographic functions of the optical apparatus (camera) are controlled by the sight line information of the photographer. For example, if the camera has an automatic focus detecting means, the photographer could know whether the photographic functions of the camera are being controlled by the sight line information by indicating in the finder that any one of the detecting point in the photographic screen has been selected by use of the sight line information. In such a case as the use of the sight line information would cause undesirable action of the photographer, it is possible to instruct the photographer to turn his eyes at the main object or to stop the sight line detection, so as to make effective use of the sight line information.

The present invention comprises a sight line correcting means for correcting personal errors in detecting sight line, a memory means for storing a plurality of correcting data having been calculated by the sight line correcting data, and a selecting means for selecting either a mode for selecting any one of the correcting data or a mode for prohibiting the sight line detecting operation. As a result, even when the photographer is changed to another, it is possible to immediately adjust the correcting data to the new photographer and to quickly prohibit the sight line detecting operation. In consequence, the sight line detecting function is not disturbed due to use of erroneous correcting data.

There is provided a sight line correction setting mode (calibration mode), including "ON" state for turning on the sight line correcting means and "OFF" state for turning off that which can be switched by the selecting means. When "ON" state is selected, the sight line detection is automatically carried out with the selected correcting data to perform the photographing operation using the photographer's sight line information, while when "OFF" state is selected, the sight line detection is prohibited. In this manner, the calibrating operation and the "ON" "OFF" states of the sight line detecting operation are interlocked.

Therefore, it is possible to simplify the photographer's operation, and to perform the sight line detection with the photographer and the correcting data being mutually corresponding one by one. Further, there is slight need of providing both the calibrating operational member and the sight line detecting operational member so as to reduce the number of operational members and increase the operational property.

In particular, if the sight line correction setting mode (calibration mode) is incorporated into a position of the photographic mode selecting member for selecting the photographic mode (e.g. exposure control mode) of the camera, it is possible to add sight line detecting functions including the calibration function without substantially increasing the number of the operating members.

If at least two visual marks capable of indicating three states, lighting, flickering and lighting-out to change the indicating state of the visual marks for the correcting data sampling time (calibration starting time) or the correcting data sampling completed time (calibration completed time), it is possible to clearly inform the photographer of the progressing state of the calibrating operation. Further, if the visual marks are disposed near the detecting frame indicating the region subject to the focus detection, it is possible to simultaneously illuminate both the visual mark and the detecting frame so as to provide excellent visibility and good calibrating operation with high accuracy due to the visual mark being sized smaller than the detecting frame.

In addition, the illuminating member for indicating the lighting and lighting-out state can be commonly used for both the visual mark and the detecting frame so as to reduce the number of components.

By providing at least two visual marks capable of indicating lighting and lighting-out states at different positions in the finder visual field, and by displaying a series of calibrating operations for obtaining correcting data for correcting personal errors in detecting the sight line by use of variable numerical value display indicating the shutter time and the stopping value, it is possible to continuously perform the calibrating operations such that the photographer can readily recognize it.

By lighting out the photographic information display while lighting the visual mark during sampling the correcting data, the photographer can concentrate on the visual mark without looking away so as to obtain accurate correcting data.

The photographer can readily understand the complicated calibrating operations and can quickly search correcting (calibration date).

By varying the display means corresponding to the correcting data depending on having input correcting data or not, it is possible to recognise the input state of the correcting data so as to effectively and accurately administrate the correcting data.

Further, by use of the display means and the operational means for setting the photographic information of the camera as those for searching the correcting data, it is not necessary to provide new components. As a result, even in a small-sized camera, the calibrating operation can be easily carried out and the operational characteristics can be enhanced.

Figure 23:
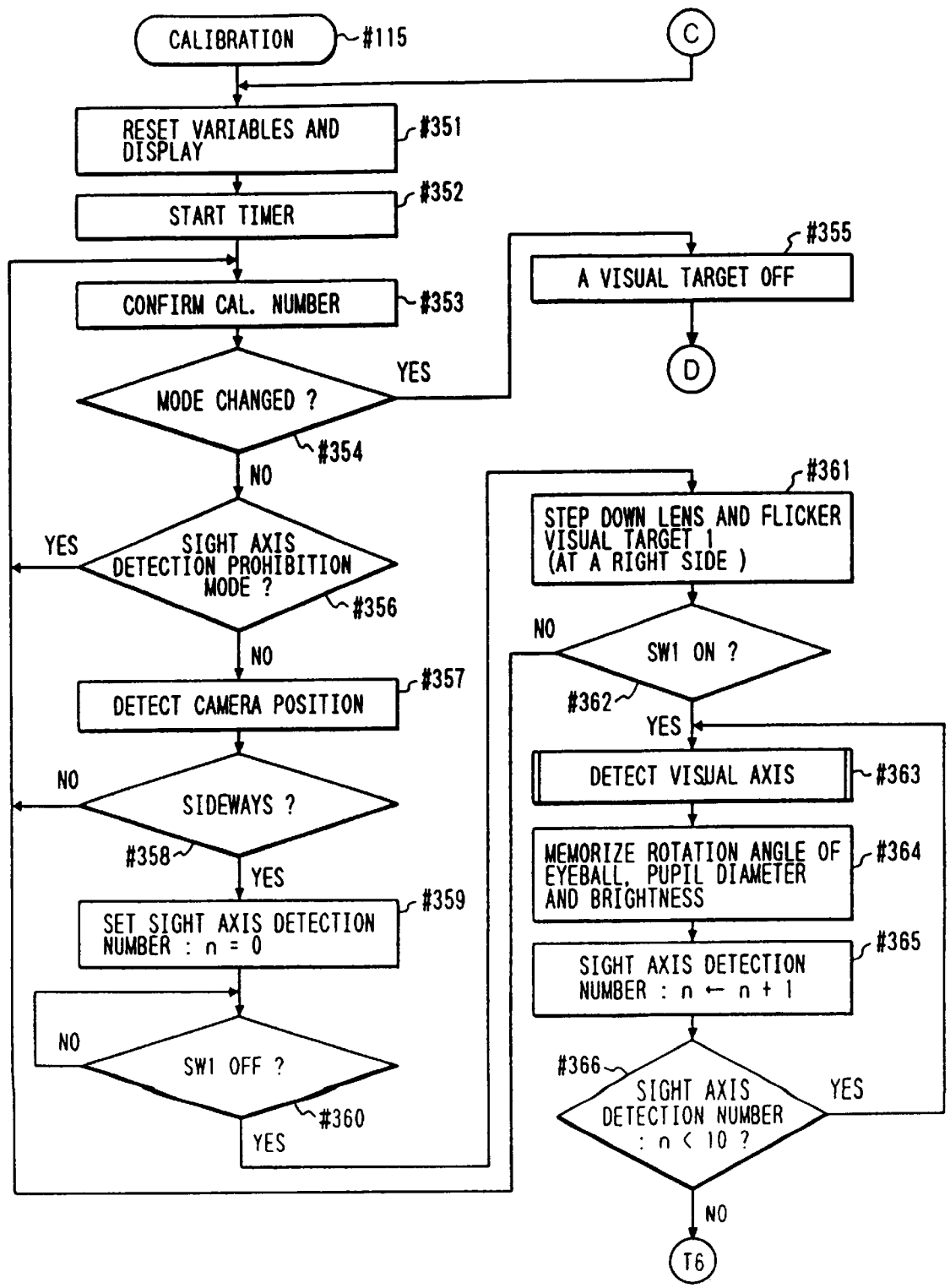
FIG. 23 is a pre-stage of a flow chart for a calibration of a sight line according to a second embodiment of the present invention.
Figure 24:
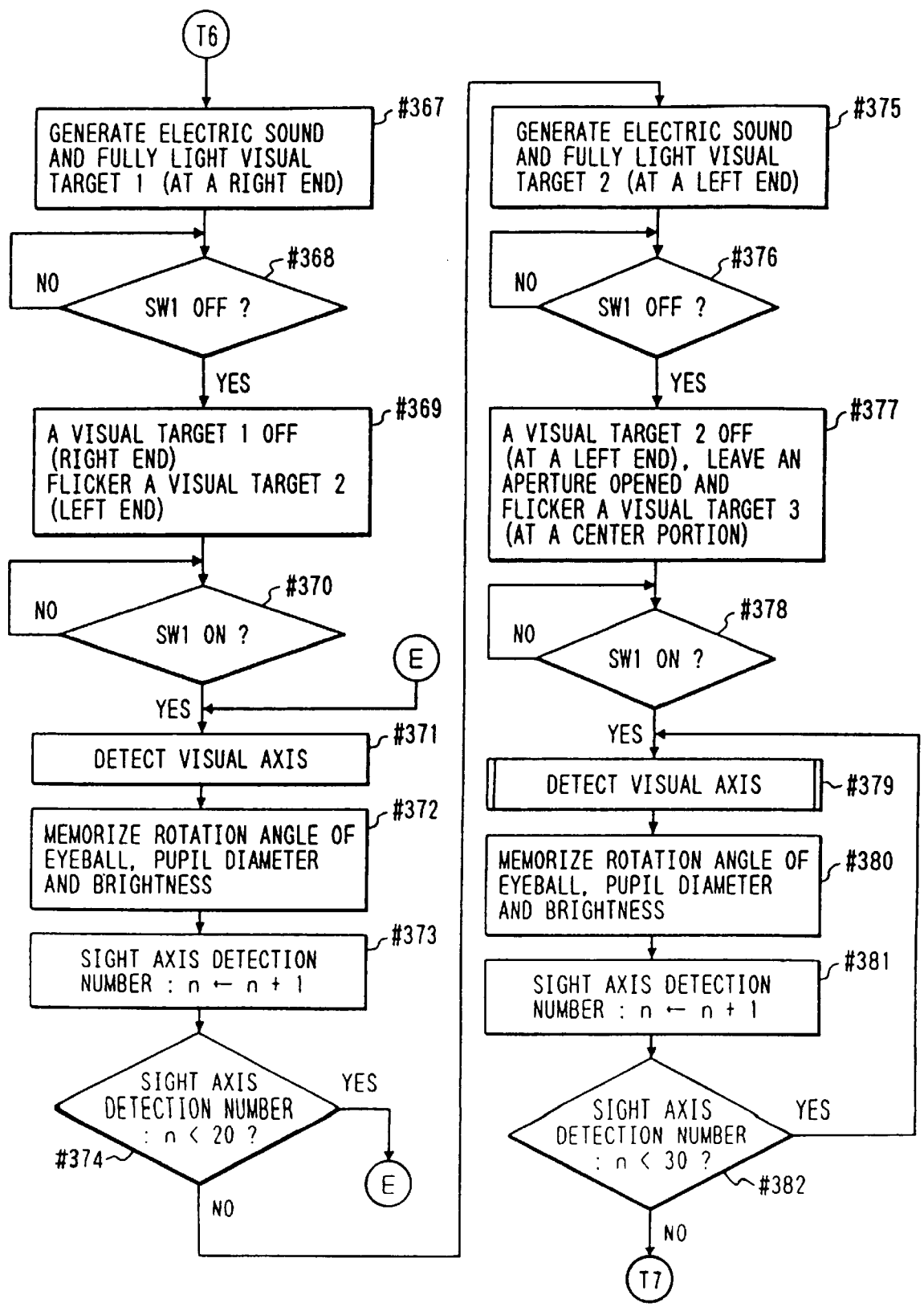
FIG. 24 is a mid-stage of a flow chart for a calibration of a sight line according to a second embodiment of the present invention.
Figure 25:
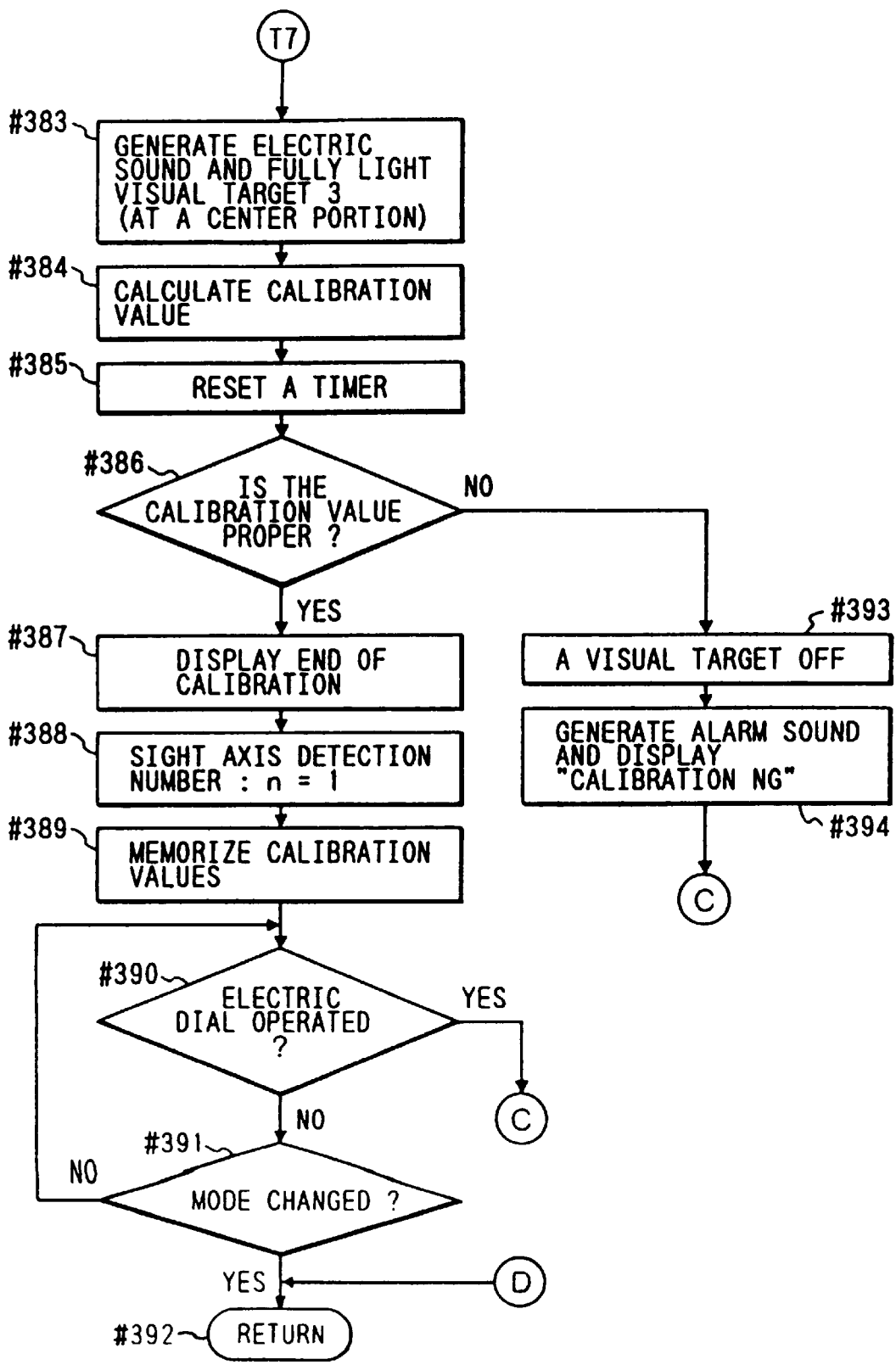
FIG. 25 is a post-stage of a flow chart for a calibration of a sight line according to a second embodiment of the present invention.
Figure 29A:
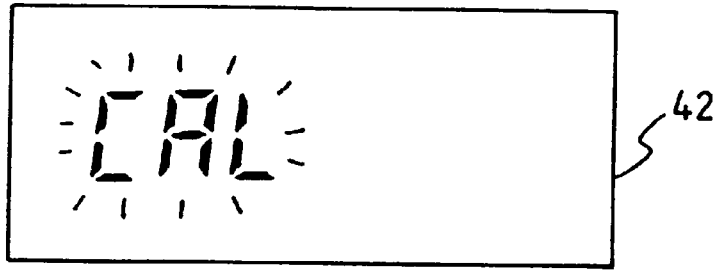
FIGS. 29A to 29C are explanatory views for a display state of the monitoring LCD shown in FIGS. 2A and 2B.
Figure 29B:
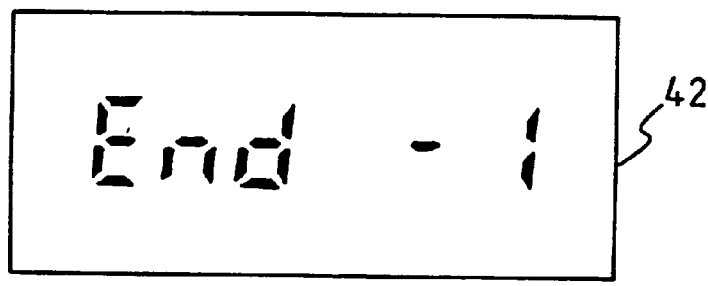
Figure 29C:
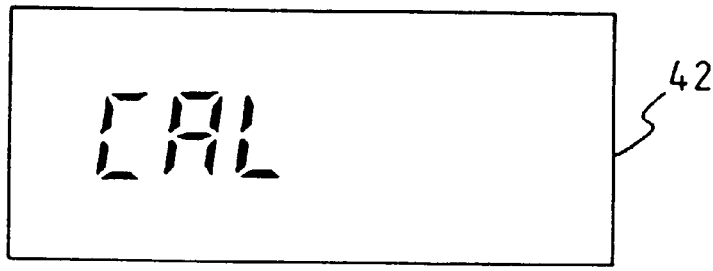
Figure 30:
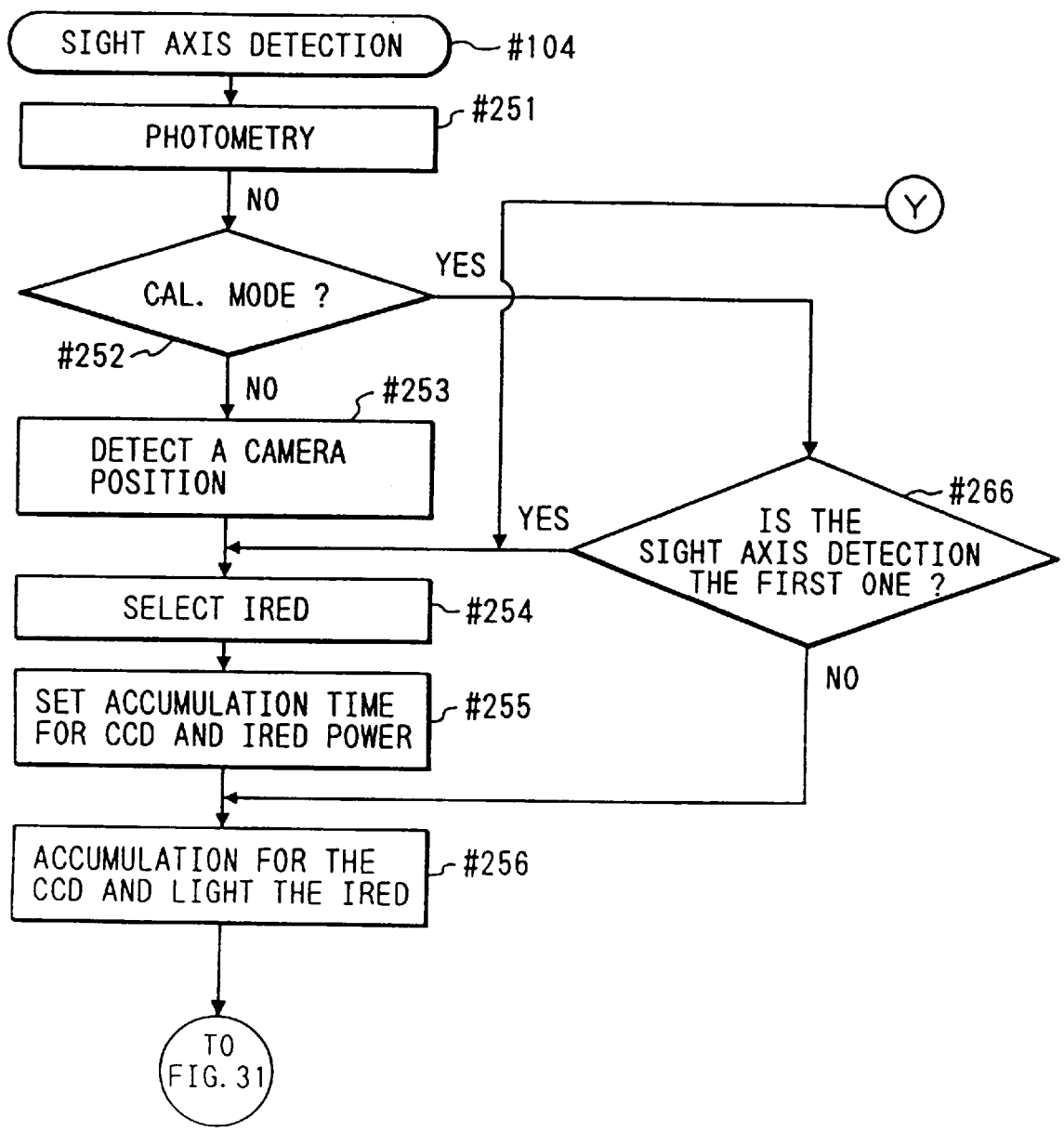
FIG. 30 is a pre-stage of a flow chart for a sight line detection according to a second embodiment of the present invention.
Figure 31:
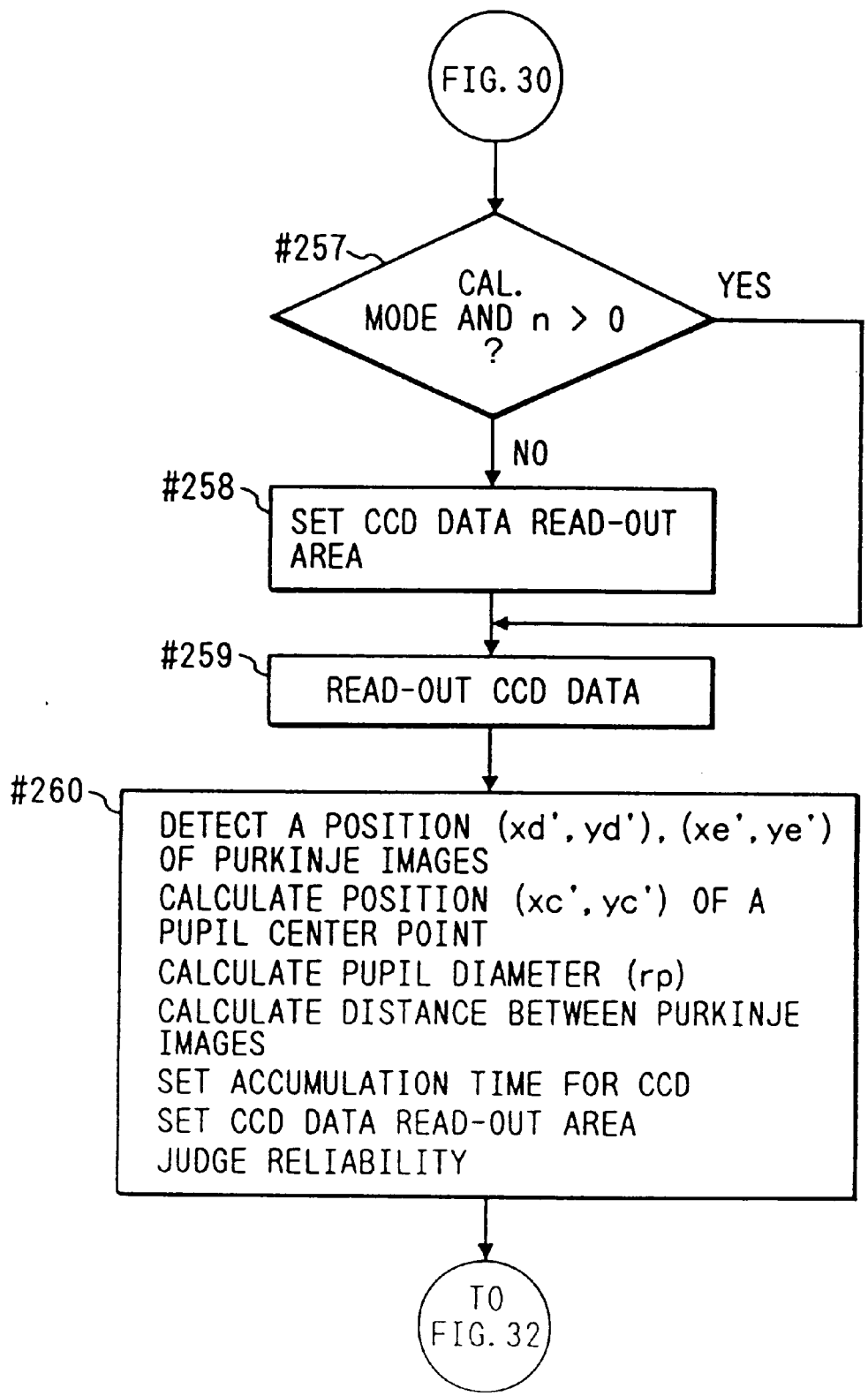
FIG. 31 is a mid-stage of a flow chart for a sight line detection according to a second embodiment of the present invention.
Figure 32:
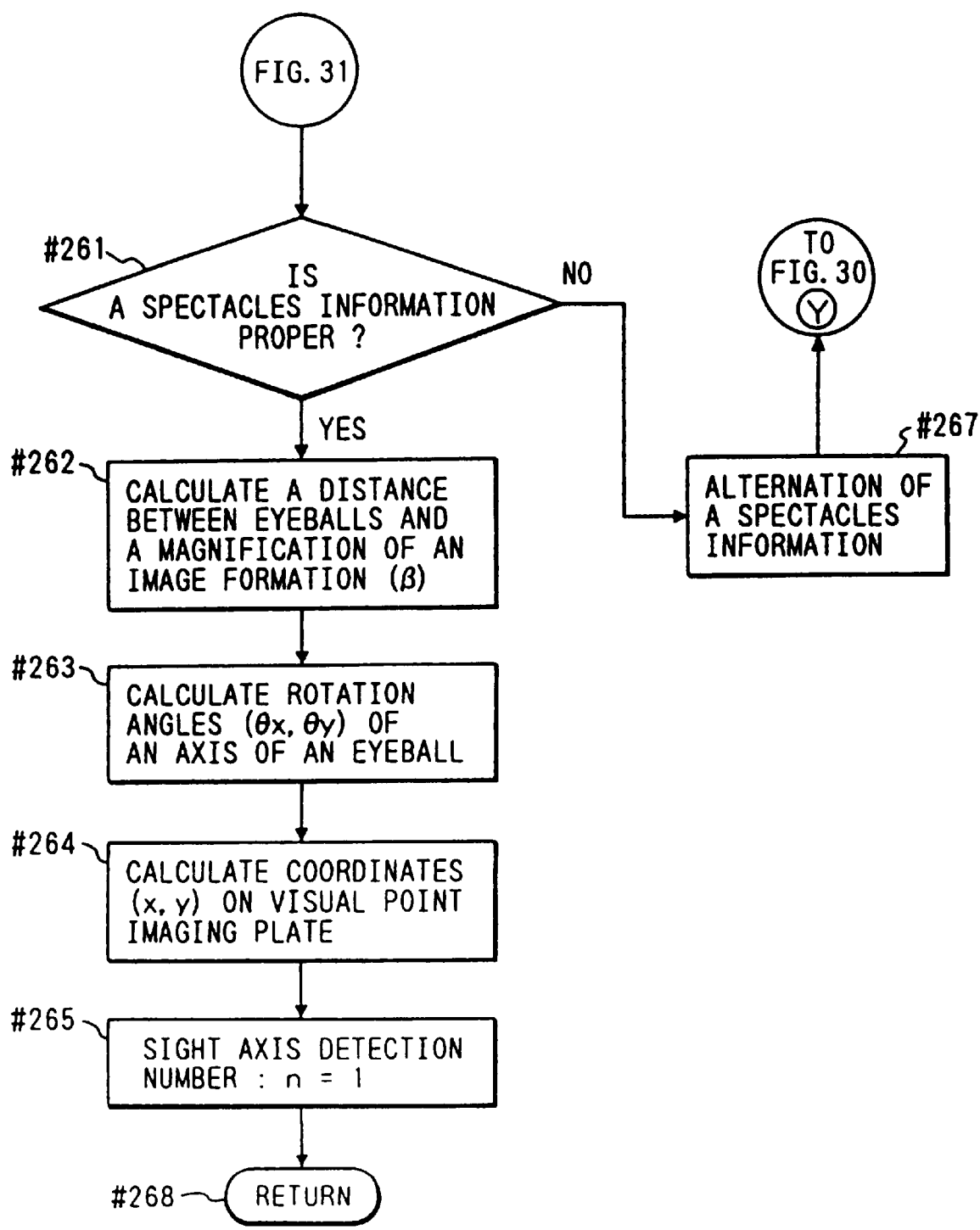
FIG. 32 is a post-stage of a flow chart for a sight line detection according to a second embodiment of the present invention.
Figure 33A:
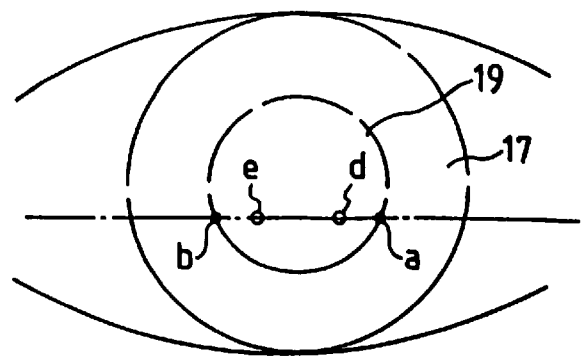
FIGS. 33A and 33B are diagrams showing a front eye portion and output signals respectively.
Figure 33B:
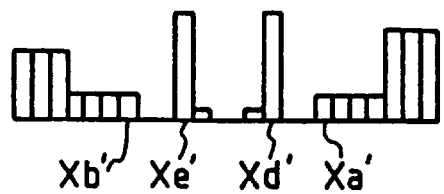
Figure 34:
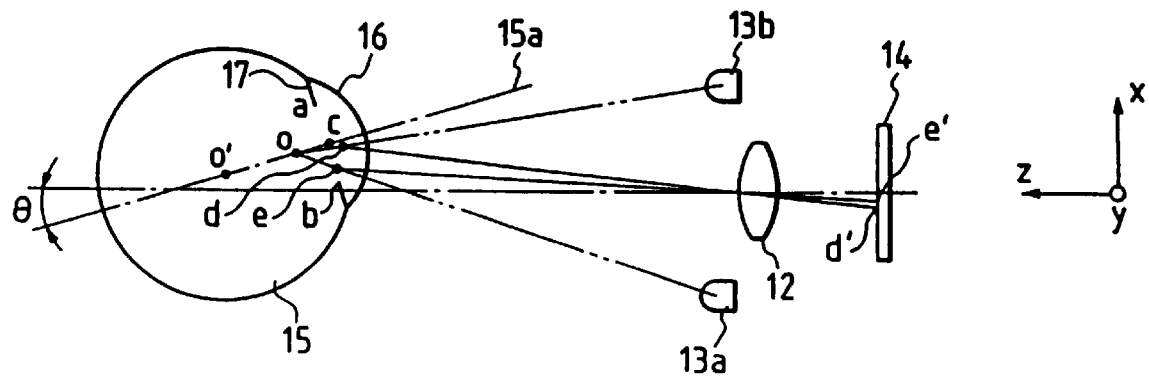
FIG. 34 is an essential schematic view of a conventional sight line detecting device.
Figure 35:
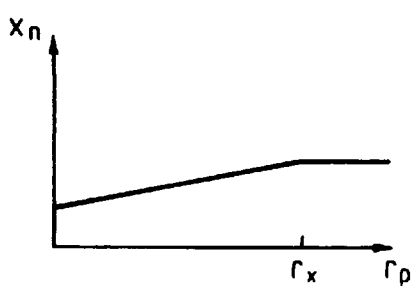
FIG. 35 is an explanatory view showing a relationship between a sight line and a pupil diameter.

FIGS. 23 to 32 are explanatory views for a second embodiment of the present invention. In this embodiment, the method for calibrating the sight line is different from the first embodiment. FIGS. 23 to 25 are flow diagrams for the sight line calibration, FIGS. 26A to 29C are diagrams showing display states of the in-finder LCD 24 and the monitoring LCD 42 at the time of sight line calibration. FIGS. 30 to 32 are flow diagrams for the sight line detection.

In this embodiment, the sight line calibration is carried out by detecting the sight line when the photographer turns his eyes at three visual marks with the different lightness of the finder (observing surface). The composition of the single-lens reflex camera used in this embodiment, the flow diagram of the camera operation etc. are the same as in the first embodiment so as to be omitted from explanation.

With reference to FIGS. 30, 31 and 32, the flow of the sight line detection will firstly be described. The sight line detecting circuit 101 executes the sight line detection in response to the signals supplied from the CPU 100 (#104). The CPU firstly receives information as to the lightness of the photographing area from the photometric circuit 102 (#251). This lightness information is also used as the lightness Lp around the photographer's eye. The CPU 100 then judges whether it is the sight line detection in the photographic mode or in the sight line calibration mode (#252), and simultaneously confirms to which calibration data number the camera (optical apparatus) is set.

In the sight line detection in normal photographic mode (#252), the CPU 100 detects the position of the camera through the signal input circuit 104 (#253). The signal input circuit 104 processes the output signals from the mercury switch 27 (SW-ANG) to determine whether the camera is at the lateral position or longitudinal position, and if it is at the longitudinal position it determines whether the release button 41 side is in the upward direction or in the downward direction (#253).

Thereafter, any of the infrared light-emitting diode (hereinafter referred to as IRED) 13a–13f is selected on the basis of the photographer's spectacle information contained in the calibration data later mentioned and the positional information of the camera previously detected (#254). Namely, if the camera is laterally positioned and the photographer wears no spectacles, a pair of IRED 13a and 13b at the finder optical axis side is selected as shown in FIG. 2B. If the camera is laterally positioned and the photographer wears spectacles, a pair of IRED 13c and 13d remote from the finder optical axis is selected.

At this time, a part of the illuminating light having been reflected from the spectacles of the photographer reaches region other than the predetermined region on the image sensor 14 onto which the eye image is projected, so no problem would arise in analyzing the eye image. Further, if the camera is longitudinally positioned, IRED combination of either 13a, 13e or 13b, 13f for illuminating the eye of the photographer from lower side is selected.

Subsequently, the accumulating time of the image sensor 14 (CCD-EYE) and the illuminating power of the IRED are set on the basis of the photometric information and the photographer's spectacle information etc. (#255). These may also be set based on the values judged from the contrast of the eye image etc., obtained in the previous sight line detecting time.

Upon determination of the accumulating time of the CCD-EYE and the illuminating power of the IRED, the CPU 100 turns on the IRED at a predetermined poser through the IRED driving circuit 107, while the sight line detecting circuit 101 starts accumulating the CCD-EYE (#256). The accumulation of the CCD-EYE is terminated when the previously set accumulating time is expired, and at the same time the IRED is lighted off. If it is not the sight line calibration mode (#257), the reading region of the CCD-EYE is set (#258).

The reading region of the CCD-EYE is determined based on that of the previous sight line detecting time except in the case of the first sight line detection immediately after the power of the camera body is turned on. But when the camera position is changed or when the presence/absence of the spectacle is changed, the reading region of the CCD-EYE is set as the whole region. Upon determination of the reading region, the reading operation of the CCD-EYE starts (#259). The regions other than this reading region are empty-read i.e., practically ignored from reading. The image output from the CCD-EYE is A/D-converted in the sight line detecting circuit 101 and stored in the CPU 100 where calculations for extracting the characteristic points of the eye image are executed (#260).

Namely, in the CPU 100, positions (xd', yd'), (xe', ye') of the Purkinje image being virtual image of a pair of IRED having been used for illuminating the eye are detected. Since the Purkinje image appears as lighting point with high light intensity, it can be detected by setting a predetermined threshold value for the light intensity and determining those having light intensity higher than the threshold value as Purkinje image.

The central position (xc', yc') of the pupil can be calculated by detecting a plurality of border points between the pupil 19 and the iris 17 and applying minimum square approximation of circle with the border points as basis. At this time, the pupil diameter rp is also calculated. The distance between the Purkinje image can also be calculated from their positions.

The CPU 100 analyzes the eye image and resets the accumulating time of the CCD-EYE based on the degree of detected contrast of the eye image, and further sets the reading region of the CCD-EYE from the positions of the pupil and the Purkinje image. The reading region of the CCD-EYE is set to include the detected pupil and to enable the detection of the whole pupil even if the pupil position is shifted by a predetermined amount. Of course, its size is smaller than that of the iris. The reading region of the CCD-EYE is set to be square and the coordinates at its diagonal two points are stored in the EEPROM 100a as the reading region of the CCD-EYE. In addition, the reliability of the positions of the calculated Purkinje image and the pupil center are determined from the contrast of the eye image or the size of the pupil etc.

When the analysis of the eye image is completed, the CPU acting also as a means for confirming the calibration data would judge whether the spectacle information contained in the calibration data is correct from the combination of the calculated distance of the Purkinje images and the lighted IRED (#261). This is for the photographers who sometimes uses spectacles and sometimes not. Namely, if the spectacle information of the photographer contained in the calibration data is set to represent that the photographer wears spectacles and the IRED 13c and 13d in FIG. 2B are lighted, and the distance between the Purkinje images is larger than the predetermined value, it is judged that the photographer wears spectacles and that the spectacle information is correct.

In contrast, if the distance between the Purkinje images is less than the predetermined value, it is judged that the photographer wears no spectacles or contact lens and that the spectacle information is erroneous. When the spectacle information is judged to be erroneous (#261), the CPU 100 changes the spectacle information (#267) and selects again the IRED (#254) for performing the sight line detection. At the time of changing the spectacle information, however, the spectacle information stored in the EEPROM of the CPU 100 is not changed.

If the spectacle information is judged to be correct, the distance between the eye-piece 11 of the camera and the eye 15 of the photographer is calculated from the distance between the Purkinje, and the imaging magnification β of the eye image having been projected onto the CCD-EYE is calculated from the distance between the eye-piece 11 and the eye 15 of the photographer (#262). From aforementioned calculated values, the rotational angle θ of the optical axis of the eye 15 can be calculated by the equations (6) and (7) previously noted.

Upon the rotational angles θx, θy of the photographer's eye are obtained, the positions (x, y) of the sight line on the focus plate 7 can be calculated by the equations (8) and (9).

The reliability of the coordinates of the calculated sight line is modified in accordance with the reliability of the sight line calibration data mentioned later. When the coordinates of the sight line on the focus plate 7 are determined, a flag indicating that the sight line detection has been carried out once is raised (#265) and the process returns to the main routine (#268).

The flow diagrams for the sight line detection shown in FIGS. 30, 31 and 32 are also useful for the sight line calibration mode. If it is judged as the sight line detection in the calibration mode in step (#252), then it is judged whether the sight line detection of the present time is the first sight line detection during the calibration mode (#266). If the judged result is affirmative, any of the IRED 13a–13f is selected from the spectacle information of the photographer contained in the calibration data (#254).

If it is judged as the sight line calibration mode and as the second or more time of the sight line detection (#257), the reading region of the CCD-EYE would be the same as that of the previous time. Therefore, the reading operation for the CCD-EYE would start immediately after the accumulation of the CCD-EYE is completed (#259). The subsequent operations are the same as mentioned above.

In the flow diagrams shown in FIGS. 30, 31 and 32, the variable at returning to the main routine is normally the coordinates (x, y) of the sight line on the focus plate, but in the case of the sight line detection in the sight line calibration mode, it is the rotational angle (θx, θy) of the eye optical axis of the photographer and the lightness Lp. The other variables, the reliability of the detected result the accumulating time of the CCD-EYE, and the reading region of the CCD-EYE etc., are common.

Calibration FIGS. 23, 24 and 25

When the photographer rotates the mode dial 44 shown in FIGS. 2A and 4A to adjust the mark to the CAL position 44d, the sight line calibration mode is set. Then the signal input circuit 104 shown in FIG. 6 supplies signals to the LCD driving circuit 105 through the CPU 100 while the monitoring LCD indicates that the operation is set to any of the sight line calibration modes. The in-finder LCD 24 shown in FIG. 1 indicates at the region out of the finder visual field 207 the "CAL" showing that the operation is in the calibration mode by use of the seven-segment 73. The CPU 100 resets the variables other than the calibration data stored in the EEPROM (#351).

The kind and the initial value of the calibration data to be stored in the EEPROM of the CPU 100 are shown in Table 1. The data practically stored in the EEPROM of the CPU 100 are those shown by thick line in Table 1 which are a plurality of calibration data being administered with the currently set calibration data number and the calibration data number.

TABLE 1

| CALIBRATION DATA NO. | ax | k0 | b0x | ky | b0y | spectacles | reliability |
|---|---|---|---|---|---|---|---|
| 0 | — | — | — | — | — | — | — |
| 1 | 1 | 0 | 0 | 0 | 0 | 1 | 0 |
| . | . | . | . | . | . | . | . |
| . | . | . | . | . | . | . | . |
| . | . | . | . | . | . | . | . |
| L | 1 | 0 | 0 | 0 | 0 | 1 | 0 |

The calibration data number 0 represents a mode for prohibiting the sight line detection. The aforementioned calibration data are stored at the addresses of the EEPROM corresponding to the calibration data numbers 1–5. The initial value of the calibration data is set to such a value as the sight line is calculated with the standard eyeball parameter. Further, there are provided flags representing whether the photographer wears spectacles and the degree of the reliability of the calibration data. The initial value of the flag representing the presence or absence of the spectacles is set to "1", the presence, while the initial value of the flag for the reliability of the calibration data is set to "0" representing unreliability.

The monitoring LCD indicates the presently set calibration mode as shown in FIG. 17A. The calibration mode includes "ON" state for performing the calibration and "OFF" state for not performing that.

In the "ON" state, the calibration numbers CAL 1–CAL 5 are provided to correspond to the calibration data numbers 1–5, and the display is made by use of the seven-segment 62 for indicating the shuttering time and the seven-segment 63 for indicating the stopping value. All the other fixed segments display sections 42a are lighted off (in the shown embodiment, the state of the calibration date number 1 is shown, with the seven-segment display section being enlarged).

At this time, if the calibration data of the set calibration number has the initial value, the calibration number displayed on the monitoring LCD 42 flickers (FIG. 17B) while the calibration is executed at the set calibration number. If there are calibration data different from the initial value at the address of the EEPROM corresponding to the calibration number, the calibration number displayed on the monitoring LCD 42 is fully lighted (FIG. 17A).

As a result, the photographer can recognize whether the calibration data are already input at the presently set calibration number. The initial value of the calibration data number is set to 0 such that the sight line information is not input unless the sight line calibration is carried out.

Subsequently, in the "OFF" state, the seven-segment 62 is displayed as "OFF" (FIG. 17C) in which the calibration data number 0 is always selected and the sight line detection prohibited mode is set.

Then the timer set in the CPU starts for the sight line calibration (#352). During a predetermined time after the timer started, if any operation is taken for the camera, the sight line detecting circuit 101 resets the calibration data number to 0 for changing to the sight line detection prohibited (OFF) mode. If the visual mark for calibration is lighted in the finder, it is lighted off.

When the photographer rotates the electronic dial 45, the signal input circuit having detected the rotation by the pulse signal as mentioned earlier supplies signals to the LCD driving circuit 105 through the CPU 100. As a result, the calibration number displayed on the monitoring LCD 42 in synchronicity with the rotation of the electronic dial 45 is changed. This operational state is shown in FIG. 18.

In this manner, viewing the calibration number displayed on the monitoring LCD 42, the photographer selects a desired calibration number. In response to this, the CPU 100 confirms the calibration data number through the signal input circuit 104 (#353). The confirmed calibration data number is stored in the predetermined address of the EEPROM of the CPU 100.

If the confirmed calibration data number is not changed, the calibration data number is not stored in the EEPROM.

Subsequently, the CPU 100 confirms the photographing mode through the signal input circuit 104 (#354). When it is confirmed that the photographer is rotating the mode dial 44 to change the photographing mode to that other than the sight line calibration mode (#354), the "CAL" display by the in-finder LCD 24 is lighted off and further if the visual mark for the sight line calibration is lighted, it is lighted off (#355), and then the process returns to the camera photographing operation as the main routine (#392).

When the mode dial 44 is switched to other photographing mode (shutter preferential AE) with the calibration data numbers "CAL 1–5" being displayed, the sight line detection is carried out by use of the data of that calibration number and the photographing operation using the aforementioned sight line information can be performed. The state of the monitoring LCD at this time is shown in FIG. 19. In addition to the normal photographing mode display, the sight line input mode display 61 is lighted to inform the photographer of the sight line input mode for controlling the photographing operation based on the sight line information.

When it is confirmed that the sight line calibration mode is still set (#354), the calibration number set by the electronic dial 45 is confirmed again (#356). At this time, if the calibration data number 0 is selected and the sight line prohibited mode is set, the calibration data number is stored again in the EEPROM of the CPU 100 (#353).

If the sight line detection is prohibited during the calibration mode, the camera remains in stand-by state until the mode is changed to a photographing mode other than the sight line calibration mode through the mode dial 44. Namely, if the mode dial 44 is operated to change while "OFF" is displayed, the photographing operation is carried out without sight line detection, and the sight line input mode display 61 in the monitoring LCD 42 is lighted off.

If the calibration data number is set to a value other than 0 (#356), the CPU subsequently detects the position of the camera through the signal input circuit 104 (#357). The signal input circuit 104 processes the output signal from the mercury switch 27 to determine whether the camera is at the lateral position or the longitudinal position, and if it is at the longitudinal position, it determines whether the release button 41 side is in the upward direction or the downward direction.

Figure 28A:
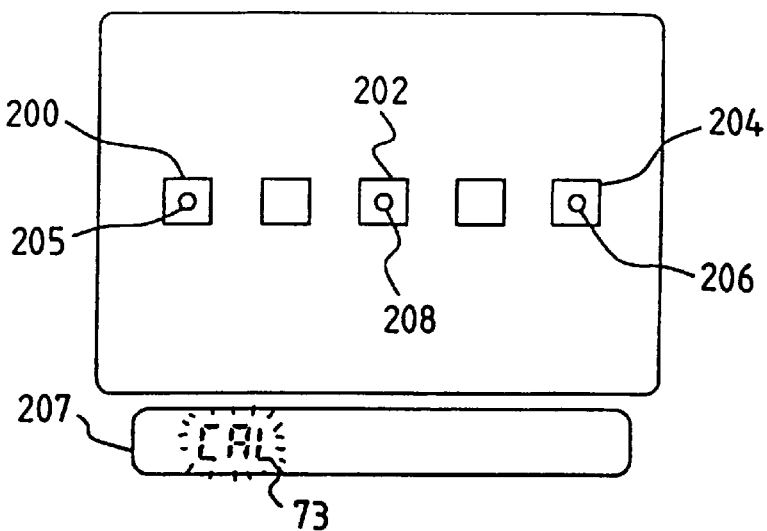
FIGS. 28A to 28C are explanatory views for a display state in the field of view of the finder shown in FIG. 1.

Since the camera is generally used at the lateral position, the hardware of the camera for calibrating the sight line is also composed to enable the calibration with the lateral position of the camera. Therefore, the sight line detecting circuit 101 does not perform the sight line calibration when being informed of the camera position not being lateral by the CPU 100 (#358). For warning the photographer that the sight line calibration cannot be performed since the camera is not laterally positioned, the CPU 100 flickers "CAL" display on the seven-segment 73 of the in-finder LCD 24 provided in the finder of the camera as shown in FIG. 28A. It may also be possible to produce a warning sound by a sounding body not shown.

Meanwhile, if the camera position is detected to be lateral (#358), the CPU 100 sets the sight line detection number n to 0 (#359). At this time, if the "CAL" display is flickering on the in-finder LCD 24, it is turned off. The sight line calibration is set to start by turning on the switch SW1. For preventing the calibration from starting at the camera side before the photographer's preparations for the sight line calibration is ready, the sight line detecting circuit 101 confirms the state of the switch SW1, and if the switch SW1 is depressed by the release button 41 to be ON state, it remains in stand-by state until the switch SW1 is turned off (#360).

Figure 26A:
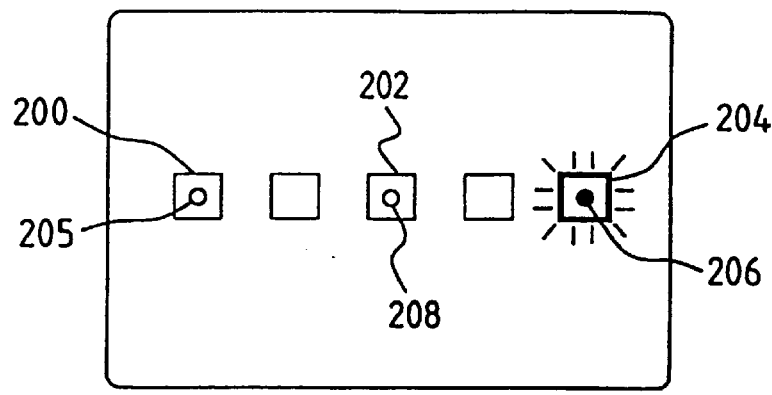
FIGS. 26A to 26C are explanatory views for a display state in the field of view of the finder shown in FIG. 1.

When the CPU 100 confirms through the signal input circuit 104 that the switch SW1 is turned off (#380), the sight line detecting circuit 101 supplies signals to the stopping control circuit 111 to set the stopping 31 of the photographic lens to minimum. At this time, the photographer would sense the reduction of lightness in the finder and his pupil expands. The CPU 100 supplies signals to the LED driving circuit 106 to flicker the visual mark for the sight line calibration (#361). The visual mark for the sight line calibration is commonly used also as a detecting point mark such that the photographer can smoothly perform the calibrating operation by the guide of the superimposed display. Firstly, the right-end detecting point mark 204 and the dot mark 206 flicker (FIG. 26A).

If the OM signal of the switch SW1 being a trigger for starting the sight line calibration is not input, the camera remains in stand-by state (#362). When the photographer turns his eyes at the visual mark starting flickering and depresses the release button 41 to turn on the switch SW1 (#362), the sight line detection is carried out (#363). The operations of the sight line detection are as mentioned with reference to the flow diagram of FIG. 9.

Dot marks 206, 205 and 208 are formed in the right-end detecting point mark 204, left-end detecting point mark 200 and the central detecting point mark 202. At these three points, the calibration is carried out. These dot marks can be lighted, lighted-off and flickered. Since the detecting point mark stands for the region for focus detection, the corresponding region should be indicated.

For accurate calibration, however, the photographer should turn his eyes at only one point, as far as possible. These dot marks 205, 206 and 208 are sized to be smaller than the detecting point mark such that the photographer can easily concentrate on the single point.

The CPU 100 stores the rotational angle θx, θy of the eyeballs, lightness Lp around the eyeballs (or pupil diameter rp) and the reliability of the data which are variables from the sub-routine of the sight line detection (#364) Further, the sight line detection number n is counted up (#365). Since the sight line of the photographer tends to be dispersed, it would be effective for obtaining accurate sight line calibration to perform several times of sight line detection for a single visual mark to use the averaged value of the detected results.

In this embodiment, the number of sight line detection times is set to 10. If the number of sight line detection times is set to a value less than 10 (#366), the sight line detection is continued (#363). If the number n is 10, the sight line detection for the visual mark 1 (detecting mark 204, dot mark 206) is finished (#366).

Figure 26B:
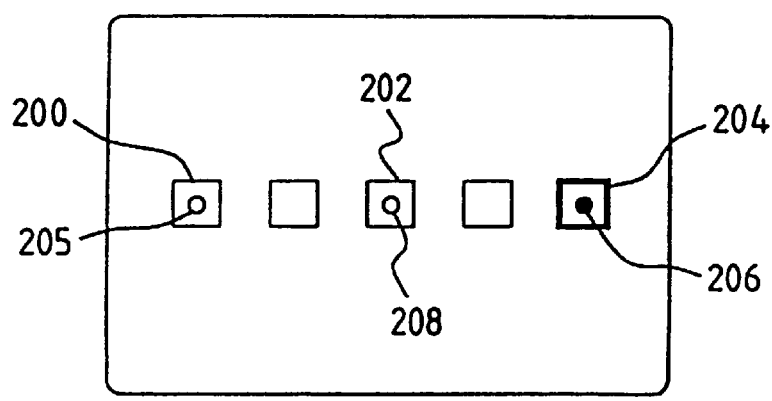

For informing the photographer of the completion of the sight line detection for the visual mark 1, the CPU 100 produces a electronic sound several times by a sounding body not shown. At the same time, the CPU 100 fully lights the visual mark 1 through the LED driving circuit 106 (#367) (FIG. 26B).

Figure 26C:
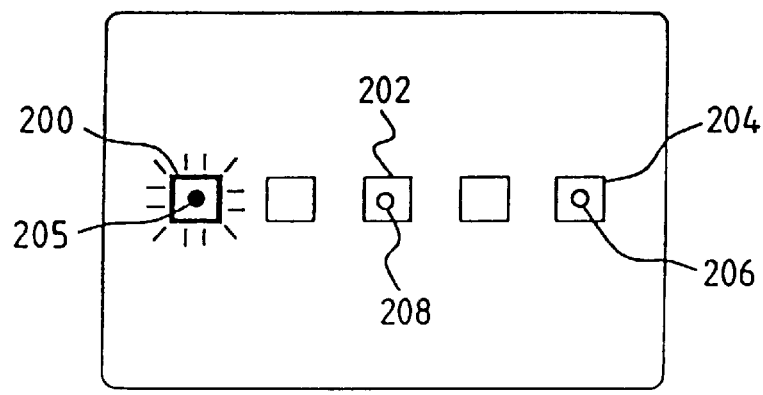

Subsequently, the CPU 100 confirms through the signal input circuit 104 if the switch SW1 is turned off (#368). If it is in the ON state, the CPU 100 remains in stand-by state until it turns off while if the switch SW1 is turned off the visual mark 1 is turned off and at the same time the left-end visual mark 2 (detecting point mark 200, dot mark 205) start flickering (#369) (FIG. 26C).

The CPU 100 confirms again, through the signal input circuit 104 if the switch SW1 is turned on (#370). If the switch SW1 is turned off, the CPU 100 remains in stand-by state until it is turned on, and perform the sight line detection upon turning on of the switch SW1 (#371). The CPU 100 stores the rotational angle θ of the eyeballs θx, θy, the lightness Lp (or the pupil diameter) and the reliability of the data which are variables from the sight line detection sub-routine (#372). Further, the CPU 100 counts up the number n of the sight line detection (#375). Meanwhile, if the number n of the sight line detection is less than 20 (#374)D the sight line detection is continued (#371). If the number n of the sight line detection is 20, the sight line detection for the visual mark 2 is finished (#374).

Figure 27A:
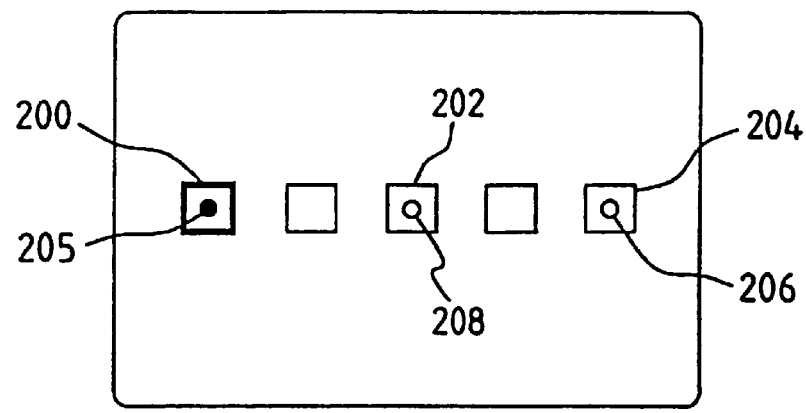
FIGS. 27A to 27C are explanatory views for a display state in the field of view of the finder shown in FIG. 1.

For informing the photographer of the termination of the sight line detection for the visual mark 2, the CPU 100 produces electronic sound several times using a sounding body not shown. At the same time, the CPU 100 fully lights the visual mark 2 through the LED driving circuit 108 (#375) (FIG. 27A).

Figure 27B:
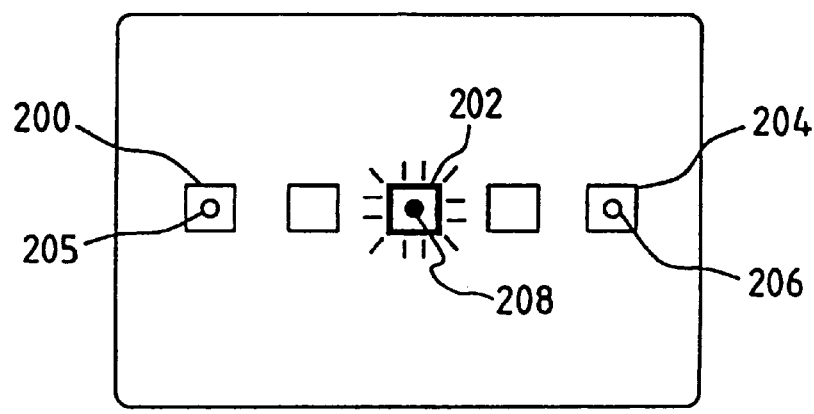

When the sight line detection for the visual marks 1 and 2 are finished, the sight line detection with the different lightness of the finder (observing surface) is continued. The CPU 100 confirms the state of the switch SW1 through the signal input circuit 104 (#376). If the switch 1 is turned on, the CPU 100 remains in stand-by state until it is turned off, and if the switch SW1 is turned off, the CPU 100 lights off the visual mark 2 (#377). At the same time, the CPU 100 supplies signals to the stopping drive circuit III to set the stopping 31 of the photographic lens 1 opened. At this time, the pupil of the photographer contracts. Then, the central visual mark 3 (detecting point mark 202, dot mark 208) starts flickering for providing the third sight line calibration data (#377) (FIG. 27B).

The CPU 100 confirms again through the signal input circuit 104 if the switch SW1 is turned on (#378). If the switch SW1 is turned off, the CPU remains in stand-by state until the switch SW1 is turned on, and if the switch SW1 is turned on, the CPU 100 performs the sight line detection (#379).

The CPU 100 stores the rotational angle θx, θy, the lightness Lp (or the pupil diameter rp) and the reliability of the data which are variables from the sight line detection sub-routine (#380). The number n of the sight line detection is counted up (#381). If the number n of the sight line detection is less than 30 (#382), the sight line detection is continued (#379). If n is 309 the sight line detection for the visual mark 3 is finished (#382).

Figure 27C:
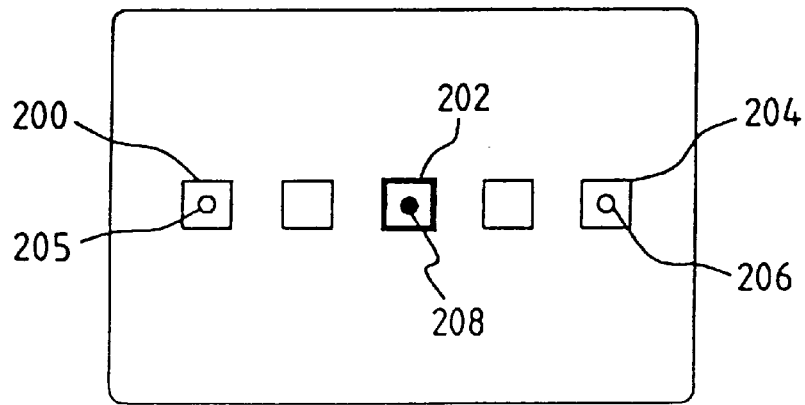

For informing the photographer of the termination of the sight line detection for the visual mark 3, the CPU 100 produces electronic sound several times using a sounding body not shown. At the same times the CPU fully lights the visual mark 3 through the LED driving circuit w106 (#383) (FIG. 27C).

Subsequently, the sight line calibration data are calculated from the rotational angle θx, θy and the lightness Lp which are stored in the CPU 100 (#384). The manner for calculating the sight line calibration data will now be mentioned.

The coordinates of the visual marks 1, 2 and 3 on the focus plate 7 are designated by (x1, 0), (x2, 0) and (0, 0), the average value of the rotational angle (θx, θy) of the eye balls when the photographer turns his eyes at the visual marks stored in the CPU 100 are designated by (θx1, θy1) (θx2, θy2), and (θx3, θy3) respectively, and the average values are designated by L1, L2D and L3, respectively. In the case of pupil diameter being used instead of the lightness, L1, L2, and L3 are replaced with r1, r2, and r3 respectively.

(θx1, θy1), (θx2, θy2), and (θx3, θy3) represent average values of rotational angle of the eyeballs detected when the photographer turns his eyes at the visual marks 1, 2, and 3 respectively. In the same manner, L1, L2 and L3 are average values of the lightness detected when the photographer turns his eyes at the visual marks 1, 2 and 3 respectively. The suffixes attached to the average values of the data represent that the data have been obtained by the sight line detection with dark state of the finder, while the suffix 3 represents that the data have been obtained by the sight line detection with the light state of the finder.

The calibration data of the sight line in the horizontal direction are calculated by different equations depending on the lightness of that time as follows:

If $$(L1+L2)/2 > Lx > L3, \quad (2\text{-}1)$$

then $$k0 = -\{(\theta x1 + \theta x2)/2 - \theta x3\}/\{Lx - L3\}$$

$$ax = (x1 - x2)/m/(\theta x1 - \theta x2)$$

$$b0x = -(\theta x1 - \theta x2)/2$$

If $$Lx \geq (L1+L2)/2 > L3, \quad (2\text{-}2)$$

then $$k0 = -\{(\theta x1 + \theta x2) - 2*\theta x3\}/\{(L1+L2) - 2*L3\}$$

$$ax = (x1 - x2)/m/\{\theta x1 - \theta x2 + k0*(L1-L2)\}$$

$$b0x = -k0*\{(L1+L2)/2 - Lx\} - (\theta 1 + \theta 2)/2$$

Further, the sight line calibration data in the vertical direction (y direction) are calculated by the following equation:

$$ky = -\{(\theta y1 + \theta y2) - 2*\theta y3\}/\{(L1+L2) - 2*L3\}$$

$$b0y = -ky*(L1+L2)/2 - (\theta y1 + \theta y2)/2$$

After the sight line calibration data have been calculated, or after the termination of the sight line detection, the timer is reset (#385).

The CPU 100, acting also as a means for judging the reliability of the calibration data, judges whether the calculated sight line calibration data are correct (#386).

The judgment is carried out on the basis of the reliability of the rotational angle of the eyeballs and the lightness (or the pupil diameter), and the calculated sight line calibration data themselves. If the rotational angle of the eyeballs and the lightness (or the pupil diameter) detected by the sight line detecting sub-routine are unreliable, the sight line calibration data are also Judged to be unreliable. If the rotational angle of the eyeballs and the lightness (or the pupil diameter) detected by the sight line detecting sub-routine are reliable, the sight line calibration data are judged to be reliable in the case of being within a general range of personal errors, while the data are judged to be unreliable in the case of being out of that range.

The CPU 100 judges not only the correctness but also the reliability of the calculated sight line calibration data.

The degree of the reliability of the calibration data depends of course on the reliability of the rotational angle of the eyeballs and the lightness (or the pupil diameter) detected by the sight line detection sub-routine. The sight line calibration data are converted into two-bits numerical values depending on the degree and stored in the EEPROM of the CPU 100.

If the calculated sight line calibration data are judged to be unreliable (#386) the LED driving circuit 106 stops energizing the superimposing LED 21 to turn off the visual mark (#393). Furthers the CPU 100 produces electronic sound for a predetermined time by using a sounding body not shown to warn the photographer of the failed sight line calibration. At the same time, CPU 100 supplies signals to the LCD driving circuit 105 to flicker "CAL" display on the in-finder LCD 24 and the monitoring LCD 42 for warning (#394) (FIGS. 28A and 29A).

After completion of the warning by the sound generated by the sounding body and by the display on the LCDS 24, 42 for a predetermined time, the process returns to the initial step (#351) of the calibration routine to be ready for the next sight line calibration.

Figure 28B:
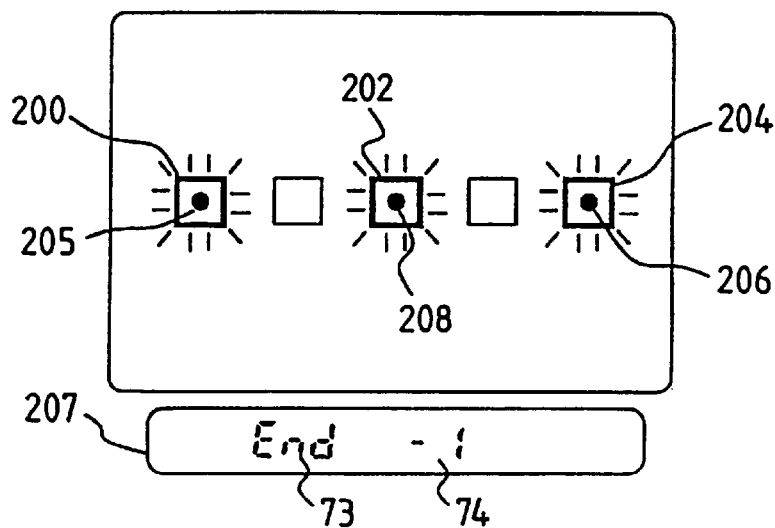
Figure 28C:
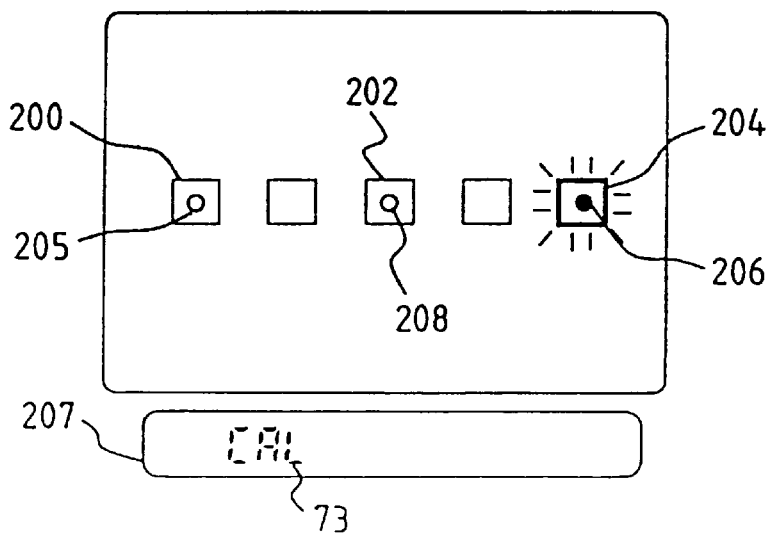

If the calculated calibration data are correct (#386), the CPU 100 indicates the termination of the sight line calibration through the LCD driving circuit 105 and the LED driving circuit 106 (#387). The LED driving circuit 106 energizes the superimposing LED 21 to flicker the visual marks 1, 2 and 3 several times, while the LCD driving circuit 105 supplies signals to the LCDS 24, 42 for performing display of "End-Calibration No" for a predetermined time period (FIGS. 28B and 29B).

The CPU 100 sets the number n of the sight line detecting times to 1 (#388), and stores the calculated sight line calibration data, the spectacles information of the photographer and the reliability of the calculated sight line calibration data at the addresses of the EEPROM corresponding to the currently set calibration number (#389). At this time, if there are already sight line calibration data at that addresses of the EEPROM, the calibration data are updated.

After a series of sight line calibrating operations, the camera remains in the stand-by state until the photographer rotates the electronic dial 45 or the mode dial 44. When the photographer rotates the electronic dial 45 to select another calibration number, the CPU detects the change of the calibration number through the signal input circuit 104 (#390) and shifts the process to the initial step (#351) of the sight line calibration routine. If the photographer rotates the mode dial 44 to select another photographic mode, the CPU 100 detects the change of the photographic mode through the signal input circuit 104 (#391) to return the process to the main routine (#392). At this time, the initial value for the reading region of the CCD-EYE is set at the EEPROM 100a.

At the calibration number set by the electronic dial 45 when the process is returned to the main routine, if the calibration data are not input remaining with the initial value, the CPU 100 resets the calibration data number to 0 so as to compulsorily set the sight line detection prohibited mode. In practice, the calibration data number currently set in the EEPROM of the CPU is reset to 0 (sight line detection prohibited mode).

A third embodiment of the present invention will now be described.

Figure 36:
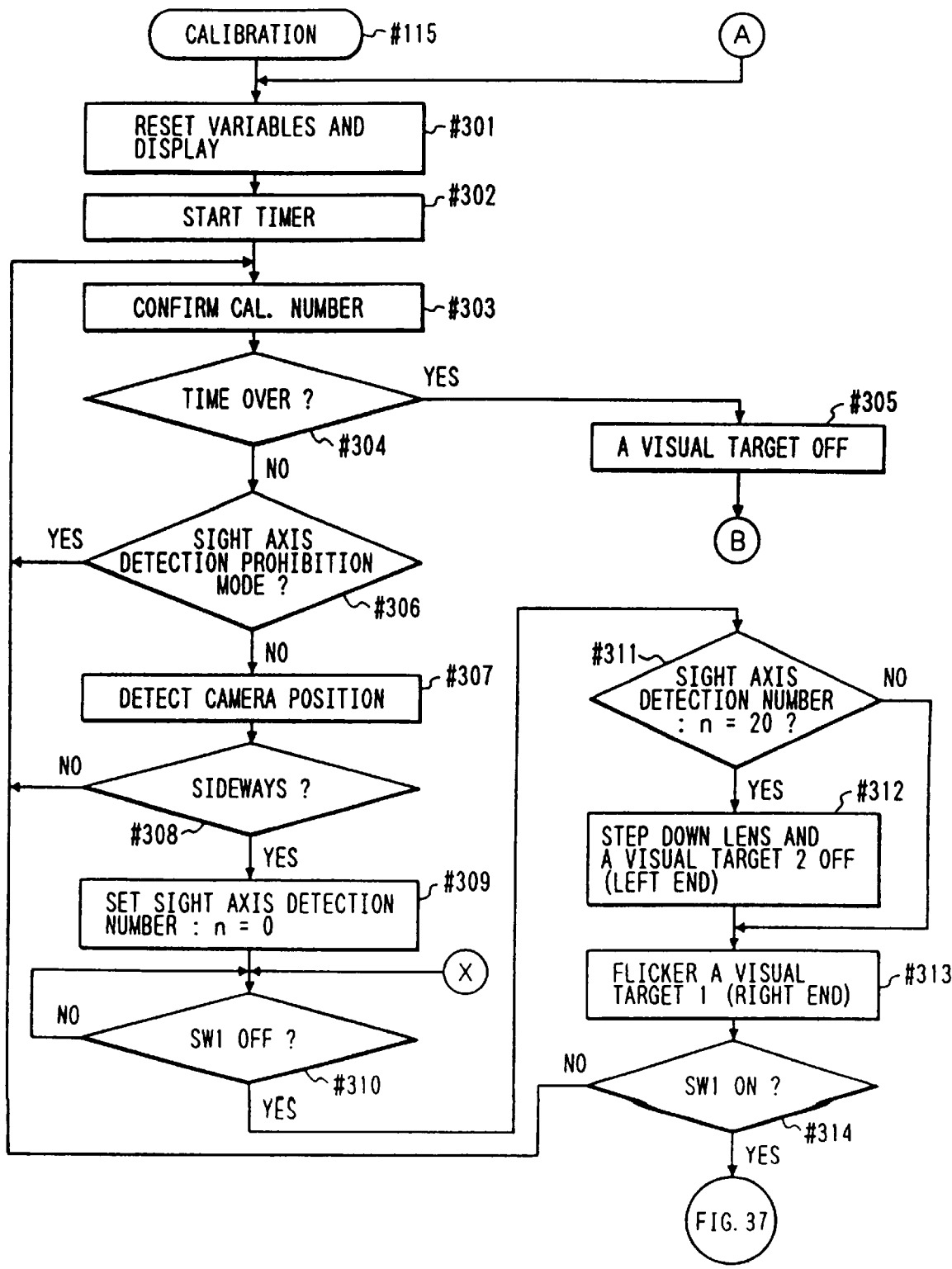
FIG. 36 is a pre-stage of a flow chart for a calibration according to a third embodiment of the present invention.
Figure 37:
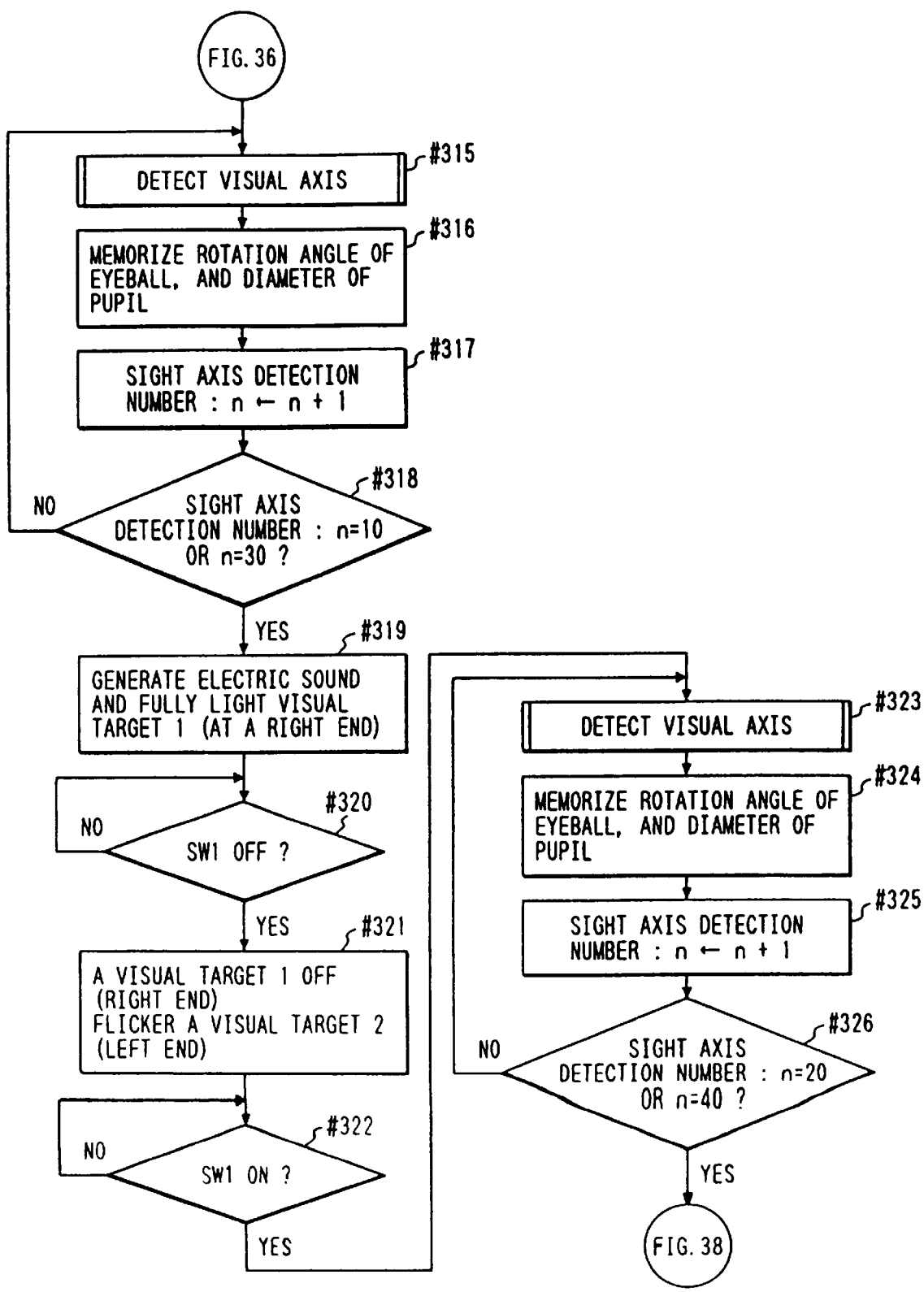
FIG. 37 is a mid-stage of a flow chart for a calibration according to the third embodiment.
Figure 38:
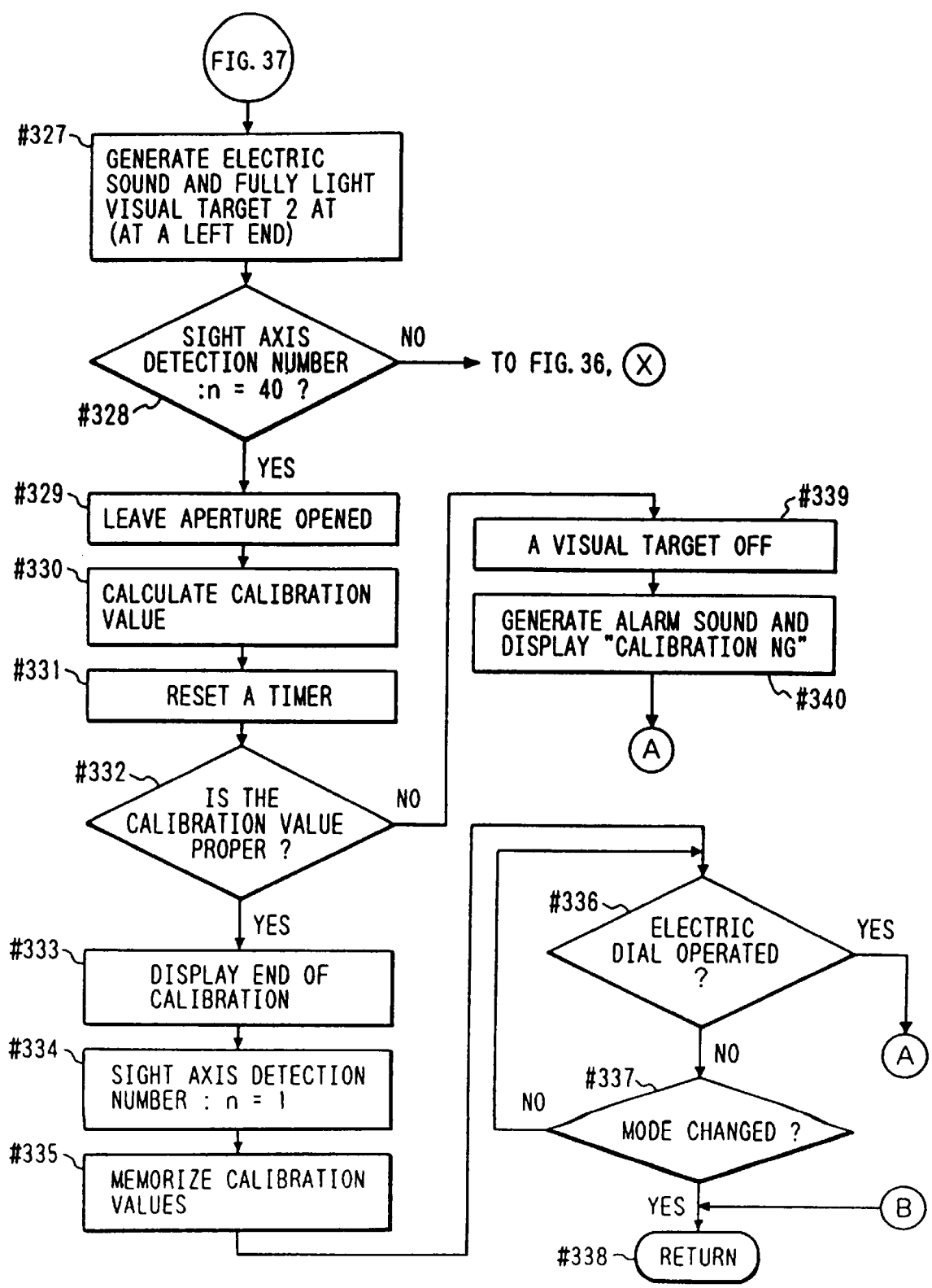
FIG. 38 is a post-stage of a flow chart for a calibration according to the third embodiment.

The third embodiment is distinguished from the first embodiment in:

using partly different flow diagram for obtaining the sight line correcting data (calibration data) for correcting the personal errors in the sight line detection (FIGS. 36 to 38);

using pupil diameter rp of eyeballs instead of the lightness Lp around the eyeballs of the photographer for obtaining the sight line correcting data by the sight line detecting device; and measuring the passing time by the time counting means during the sight line correcting mode and enabling the display function of the optical apparatus (camera) to be controlled after the expiration of the predetermined time period. There are no differences in other compositions.

FIGS. 36 to 38 are flow diagrams for the calibration of this embodiment.

The previously referred FIGS. 1 to 11, 15A to 22B, and Table 1 in the first embodiment are also directly referred used in this embodiment.

The characteristic features of this embodiment will be described with reference to the flow diagrams of FIGS. 36 to 38 different from those in the first embodiment.

In the first embodiment, the lightness Lp around the eyeballs of the photographer having been used for the calibration is proportional to the size of the pupil diameter rp of the eyeballs. Therefore, in this embodiment, pupil diameter rp is used instead of the lightness Lp.

Namely, in the third embodiment, the lightness Lp in the equations used in the first embodiment is replaced with the pupil diameter rp. Specifically, in the equations following and including the equation (10) aforementioned, the bx equivalent to the correcting amount of between the optical axis of the eyeballs and the sight axis in the horizontal direction (x direction) can be expressed as function of the pupil diameter rp as follows:

$$bx = kx*(rp-rx)+b0x \qquad (10)'$$

where rx and b0x represent a constant and calibration data respectively.

In the equation (10)', the proportional factor kx relating to the pupil diameter rp depends on the value of the pupil diameter as follows:

If $rp \geq rx$, then $kx=0$;

and if $rp < rx$, then $kx=\{(1-k0*k1(\theta x+bx')/|k0|\}*k0 \qquad (11)'$

Namely, if the pupil diameter rp is equal to or larger than a predetermined pupil diameter rx, the proportional factor kx would be 0, while if rp is less than rx, then the kx would be function of the rotational angle θx of the optical axis of the eyeball.

bx' is equivalent to the correcting amount of the sight axis when the photographer Is turning his eyes at the substantial center of the finder and can be expressed:

$$bx' = k0*(rp-rx)+b0x$$

k0 is calibration data, representing a varying rate of the correcting amount bx of the sight axis with respect to the change of the pupil diameter rp when the photographer is turning his eyes at the substantial center of the finder. k1 is a predetermined constant. Further, by corresponding to a correcting amount in the vertical direction (y direction) can be expressed, as function of the pupil diameter rp, as follows:

$$by = ky*rp+b0y \qquad (12)'$$

The calibration in this embodiment will now be described.

FIGS. 36, 37 and 38 are flow diagrams of the sight line calibration according to the third embodiment, FIGS. 17A to 22B show display state of the in-finder LCD 24 and the monitoring LCD 42 during the sight line calibration in this embodiment likewise as in the first embodiment.

Conventionally, the sight line calibration has been carried out by detecting a sight line when the photographer turns his eyes at more than two visual marks, but in this embodiment it is carried out by detecting a sight line when the photographer turns his eyes at two visual marks at mutually different lightness. Thus, the sight line calibration corresponding to the pupil diameter can be calculated. This operation will now be described in relation to the aforementioned FIGS. in more detail.

When the photographer rotates the mode dial 44 to adjust the mark to the CAL position 44, the sight line calibration mode is set. The signal input circuit 104 supplies signals to the LCD driving circuit 105 through the CPU 100, while the monitoring LCD 42 indicates that any of the sight line calibration modes has been started operating. The CPU 100 also resets the variables other than the calibration data stored in the EEPROM (#301).

Table 1 the kinds of the calibration data and their initial values which are stored in the EEPROM of the CPU 100. The data surrounded by the thick line are actually stored in the EEPROM of the CPU 100 and are a plurality of calibration data being administered by the currently set calibration data number and the calibration data number. The calibration data number 0 in this case stands for a mode for prohibiting the sight line detection.

The aforementioned sight line calibration data are stored at the addresses on the EEPROM corresponding to the calibration data numbers 1–5 (it is composed in this case to store five kinds of data for explanation, but any other composition may be used depending on the capacity of the EEPROM).

The initial value of the calibration data is set to such a value as that the sight line can be detected by standard eyeball parameters. Further, flags representing whether the photographer wears spectacles and the degree of the reliability of the calibration data are contained therein. The initial value of the flag representing the presence/absence of the spectacles is set to "1", while the initial value of the flag as to the reliability of the calibration data is set to "0", unreliable.

The currently set calibration mode is displayed on the monitoring LCD 42 as shown in FIG. 17A. The calibration mode includes an "ON" state for performing the calibration and an "OFF" state for not performing that.

In the "ON" state, there are prepared calibration numbers CAL 1–CAL 5 corresponding to the calibration data numbers 1–5, the display is made by use of the seven-segment 62 indicating the shuttering time and the seven-segment 63 indicating the stopping value while all the other fixed segment display section 42a are lighted off (in the shown embodiment, the state of the data number 1 is shown with the seven-segment display section being enlarged).

At this time, If the calibration data at the set calibration number has the initial value, the calibration number displayed on the monitoring LCD 42 flickers (FIG. 17B), while the calibration is already performed at the set calibration number. If any calibration data (sight line correcting data) different from the initial value are stored at the address of the EEPROM 100a as a memory means corresponding to the calibration number, the calibration number displayed on the monitoring LCD 42 is fully lighted (FIG. 17A).

As a result, the photographer can recognize whether the calibration data are stored at the currently set respective calibration number. The initial value of the calibration data number is set to 0 such that any sight line information is input unless the sight line calibration is carried out.

Next, in the "OFF" state, the seven-segment 82 is indicated as "OFF" (FIG. 17C), and the calibration data number 0 is always selected to set the sight line detection prohibited mode. This mode is useful in such a case that the photographer is abruptly changed in taking a picture in a commemorative photographing where the sight line detecting position tends to be erroneously set to cause mis-operation, such that the sight line information is prohibited from being input.

Subsequently, the timer, being a time counting means set in the CPU 100 starts, for the sight line calibration (#302).

When the photographer rotates the electronic dial 45, the signal input circuit, having detected the rotation by the pulse signals as mentioned earlier, supplies signals to the LCD driving circuit 105 through the CPU 100. As a result, the calibration number displayed on the monitoring LCD 42 changes in synchronicity with the rotation of the electronic dial 45. This state is shown in FIG. 18.

When the electronic dial 45 is rotated in the clockwise direction, its mode goes shifting as "CAL1"-"CAL2"-"CAL3"-"CAL4"-"CAL5" such that the photographer can store the calibration data at any desired any one of the five calibration numbers by a calibrating operation mentioned later. In the state shown in FIG. 18, the calibration data are already stored at "CAL-1, 2, 3" while no data are stored at "CAL-4, 5" with the initial value.

When the dial is further rotated by one click in the clockwise direction, it is set to an "OFF" state in which calibration is not carried out and the sight line detection prohibited mode is set. Further rotation by one click returns it to "CAL-1". Thus, the calibration number is cyclically displayed. If the dial is rotated in the counter-clockwise direction, the displaying manner would become Just opposed to that in the case of FIG. 18.

Viewing the calibration number being displayed on the monitoring LCD 42, the photographer would select a desired calibration number. In response thereto, the CPU 100 confirms the calibration data number corresponding to the selected calibration number through the signal input circuit 104 (#303). The confirmed calibration date number is stored at a predetermined address of the EEPROM.

If the confirmed calibration data number is not changed, it is not stored in the EEPROM.

Subsequently, the CPU 100 confirms the photographic mode through the signal input circuit 104 (#304). When it is confirmed that the photographer rotates the mode dial 44 to change to another photographic mode other than the sight line calibration mode (#304), If the visual mark for the sight line calibration is flickering in the finder, it is lighted off (#305) and the process is returned to the photographic operation of the camera being the main routine (#338).

With the calibration numbers "CAL 1–5" being displayed, when the mode dial 44 is operated to change the mode to another photographic mode (shuttering preferential AE), the sight line detection is carried out using the data of the calibration number to perform the aforementioned photographic operation using the sight line information. The state of the monitoring LCD 42 is shown in FIG. 19 in which it is shown that in addition to the normal photographic mode display, the sight line mode display 61 is lighted to inform the photographer of the sight line input mode for controlling the photographic operations on the basis of the sight line information.

Then, the CPU 100 counts the time from the start of the calibration mode (#304). If the counted time exceeds a predetermined time (e.g. 4 minutes), the CPU 100 lights off the visual mark for the sight line calibration being lighted in the finder (#305), and resets the calibration number being set to zero after turning off the various indications of the camera so as to change to the sight line prohibited (OFF) mode. Thus, the calibration mode is finished. Meanwhile, if the counted time is not reaching the predetermined time, the calibration is continued (#304).

The timer in the CPU 100 is reset when the photographer's operation of the operational member of the camera is detected.

If it is confirmed that the sight line calibration mode remaining to be set (#304), the CPU 100 confirms again the calibration number having been set by the electronic dial 45 (#306). At this time, if the calibration number 0 is selected and the sight line detection prohibited mode is set, the calibration number is stored again in the EEPROM of the CPU 100 (#303). If the sight line detection is prohibited during the calibration mode, the camera remains in stand-by state until the mode is changed to a photographic mode other than the sight line calibration mode by the mode dial.

Namely, when the mode dial 44 is switched while "OFF" is being displayed, the photographic operation is carried out without performing the sight line detection and the sight line input mode display 61 in the monitoring LCD 42 is lighted off.

If the calibration data number is set to a value other than 0 (#306), the CPU 100 subsequently detects the position of the camera through the signal input circuit 104 (#307). The signal input circuit 104 processes the output signal from the mercury switch 27 to determine whether the camera is laterally or longitudinally positioned, and if it is longitudinally positioned, the circuit 104 determines whether the release button 41 is upwardly or downwardly directed.

Since the camera is generally used in the lateral position, the hardware for the sight line calibration is also composed to enable the calibration with the lateral position of the camera. Therefore, when the sight line detecting circuit 101 is informed of a non-lateral position of the camera by the CPU 100, it does not perform the sight line calibration (#308). Namely, the detection for the sight line correcting data is prohibited.

For informing the photographer of the impossibility of the sight line calibration due to the lateral position of the camera, the CPU 100 flickers a "CAL" indication on the in-finder LCD 24 being a component of the warning means provided in the finder of the camera as shown in FIG. 21A. At this time, it is also possible to produce warning sound by a sounding body not shown.

On the other hand, when it is detected that the camera is laterally positioned (#308), the CPU 100 sets the number n of the sight line detection times to 0 (#309). But, if n is 20, the CPU maintains this number. At this time, if the "CAL" indication is flickering in the in-finder LCD 24, it is turned off. The sight line calibration is set to start upon turning on of the switch SW1. To prevent the calibration from starting at the camera side before the photographer is ready to perform the sight line calibration, the CPU 100 confirms the state of the switch SW1, and if the switch SW1 is depressed by the release button 41 to be in ON state, it remains in stand-by state until the switch SW1 turns off (#310).

When the CPU 100 confirms that the switch SW1 is turned off through the signal input circuit 104 (#310), it confirms again the number n of the sight line detection times (#311). If n is not 20 (#311), the CPU 100 supplies signals to the LED driving circuit 106 to flicker the visual mark for the sight line calibration (#313). The visual mark for the sight line calibration is partly used as a detecting point mark such that the photographer can smoothly perform the calibration guided by the superimposed indication. Firstly, the right-end detecting point mark 204 and the dot mark 206 flicker (FIG. 20A).

Unless the ON signal of the switch SW1 being the trigger for the calibration start is input, the camera remains in stand-by state (#314). When the photographer, viewing the visual mark having started flickering, depresses the release button 41 to turn on the switch SW1 (#314), the sight line detection is carried out (#315). The operations of the sight line detection are the same as the earlier explanation with reference to the flow diagram shown in FIG. 9.

Dot marks 206 and 205 are formed in the right-end detecting point mark 204 and the left-end detecting point mark 200 respectively, indicating that the calibration is performed in these two positions. Both are illuminated by the superimposing LED 21 to indicate the states of lighting, flickering and lighting-off. Since the detecting point marks 200–204 represent the focus detection regions, these regions should be indicated.

For more accurate calibration, the photographer should preferably turn his eyes at only one point as far as possible. The dot marks 205 and 206 are sized to be smaller than the detecting point marks 200–204 for photographer's easy concentration on the single point. The CPU 100 stores the rotational angle θx, θy, the pupil diameter rp and the reliability of the data which are variables from the sight line detection sub-routine (#316). Further, the n of the sight line detection number is counted up (#317).

Due to a certain dispersion of the photographer's sight line, it would be effective for obtaining accurate sight line calibration data, to perform several times of the sight line detection and to average the detected result. In this embodiment, the number n for the sight line detection times for one visual mark is set to 10. Unless n is 10 or 30 (#318), the sight-line detection is continued (#315).

In this embodiment, the sight line calibration is carried out twice with different lightness of the finder, i.e. different pupil diameters. Therefore, the second sight line calibration would start with n being 20. When n is 10 or 30, the sight line detection for the visual mark 1 (detecting point mark 204, dot mark 208) is terminated (#318).

For informing the photographer of the termination of the sight line detection for the visual mark 1, the CPU 100 produces electronic sound several times by a sounding body not shown. At the same time, the CPU 100 fully lights the visual marks for a predetermined time through the LED driving circuit 106 (#319) (FIG. 20B).

Subsequently, the CPU 100 confirms through the signal input circuit 104 whether the switch SW1 is turned off (#320). If the switch SW1 is turned on, it remains in stand-by state until the switch SW1 is turned off, and if the switch SW1 is turned off, it lights off the visual mark 1 and flickers the left-end visual mark 2 (detecting point mark 200, dot mark 205) at the same time (#321) (FIG. 20C).

The CPU 100 confirms again through the signal input circuit 104 whether the switch SW1 is turned on or off (#322). If the switch SW1 is turned off, the CPU 100 remains in stand-by state until it is turned on, and starts the sight line detection upon turning on of the switch SW1 (#323). The CPU 100 stores the rotational angle θx, θy of the eyeballs, pupil diameter rp and the reliability of the data which are variable s from the sight line detection sub-routine (#324). Further, it counts up the number n of the sight line detection time (#325). Further, unless n is 20 or 40 (#326), the sight line detection is continued (#323). When n is 20 or 40, the sight line detection for the visual mark 2 is terminated (#326).

For informing the photographer of the termination of the sight line detection for the visual mark 2, the CPU 100 produces several times electronic sound by a sounding body not shown as warning means. At the same time, the CPU 100 fully lights the visual mark 2 by driving the LED driving circuit 106 (#327) (FIG. 20D).

The sight line detection has been performed once for each of the visual mark 1 and 2 respectively and n is 20 (#328), the second sight line detection is carried out with different lightness of the finder for each visual mark. The CPU 100 confirms the state of the switch SW1 through the signal input circuit 104 (#310). If the switch SW1 is turned on, the CPU remains until it is turned off, while if the switch SW1 is turned off, the CPU 100 confirms n again (#311).

When n is 20 (#311), the CPU 100 supplies signals to the stopping driving circuit 111 to set the stopping 31 of the photographic lens 1 minimum. At this time, the photographer senses the darkened finder to expand his pupil. At the same time, the CPU 100 lights off the visual mark 2 (#312). For performing the second sight line detection, the right-end visual mark 1 starts flickering (#313). The following operations #314–#327 are the same as earlier description.

When the sight line detection for the visual marks 1 and 2 with different lightness of the finder (different pupil diameter) has been completed, n becomes 40 (#328), thereby terminating the sight line detection for obtaining the sight line calibration data. The CPU 100 supplies signals to the stopping drive circuit 111 to set the stopping 31 of the photographic lens 1 to opened state (#329). Further, the sight line calibration data are calculated from the rotational angle θx, θy of the eyeballs and the pupil diameter rp which are stored in the CPU 100 (#330). The sight line calibration data are calculated by the manner mentioned hereinafter.

The coordinates of the visual marks 1 and 2 on the focus plate 7 are represented by (x1, 0), (x2, 0) respectively, the averaged values of the rotational angle (θx, θy) of the eyeballs when the photographer turns his eyes at the visual marks stored in the sight line detecting circuit 101 are represented by (θx1, θy1), (θx2, θy2), (θx3, θy3), (θx4, θy4), and the averaged values of the pupil diameter are represented by r1, r2, r3, r4.

(θx1, θy1), (θx3, θy3) and (θx2, θy2), (θx4, θy4) are averaged values of the rotational angle of eyeballs detected when the photographer turns his eyes at the visual mark 1 and 2 respectively.

In the same manner, r1, r3 and r2, r4 represent the averaged values of the pupil diameter when the photographer turns his eyes at visual marks 1 and 2 respectively. Further, the suffixes 1, 2 attached to the averaged value of the data stand for being data obtained when the sight line detection is performed with light state of the finder of the camera, while the suffixes 3, 4 represent that with the dark state.

The sight line calibration data in the horizontal direction (x direction) are calculated by different equations depending on the pupil diameter at the time of data sampling as follows:

If $$(r3+r4)/2 > rx > (r1+r2)/2, \qquad (1\text{-}1)'$$

then $$k0 = -\{(\theta x3+\theta x4)-(\theta x1+\theta x2)\}/\{2^*rx-(r1+r2)\}$$

$$ax = (x3-x4)/m/(\theta x3-\theta x4)$$

$$b0x = -(\theta x3+\theta x4)/2$$

If $$rx \geq (r3+r4)/2 > (r1+r2)/2, \quad (1\text{-}2)'$$

then $$k0 = -\{(\theta x3+\theta x4)-(\theta x1+\theta x2)\}/\{(r3+r4)-(r1+r2)\}$$

$$ax = (x3-x4)/m/\{\theta x3-\theta x4+k0*(r3-r4)\}$$

$$b0x = -k0*\{(r3+r4)/2-rx\}-(\theta 3+\theta 4)/2$$

Further, the sight line alibration data in the vertical direction (y direction) can be calculated as follows:

$$ky = -\{(\theta y3+\theta y4)-(\theta y1+\theta y2)\}/\{(r3+r4)-(r1+r2)\}$$

$$b0y = \{(\theta y1+\theta y2)*(r3+r4)-(\theta y3+\theta y4)*(r1+r2)\}/2/\{(r1+r2)-(r3+r4)\}$$

After the sight line calibration data are calculated, or after the sight line detection is terminated, the timer is reset (#331).

The sight line detection circuit 101, acting also as a judging means for the reliability of the calibration data, judges whether the calculated sight line calibration data are correct (#332). The Judgment is carried out based on the reliability of the rotational angle of the eyeballs and the pupil diameter being variables from the sight line detection sub-routine and the calculated sight line calibration data themselves. Namely, if the rotational angle of the eyeballs and the pupil diameter detected by the sight line detection sub-routine are unreliable, the calculated sight line calibration data are also judged unreliable.

In the case of the rotational angle and the pupil diameter being reliable, if the calculated sight line calibration data are within a general personal error ranges they are judged to be reliable, while if they are out of the range, they are judged to be unreliable. The CPU 100 judges not only whether the data are reliable or unreliable, but also the degree of the reliability of the calculated sight line calibration data.

The degree of the reliability depends-on the rotational angle of the eyeballs and the pupil diameter detected by the sight line detection sub-routine. The reliability of the sight line calibration data is converted into a two-bits numerical value depending on the degree and is stored in the EEPROM of the CPU 100 as mentioned later.

When the calculated sight line calibration data are judged to be unreliable (#332), the LED driving circuit 106 stops energizing the superimposing LED 21 to turn off the visual marks 1, 2 (#339). Further, the CPU 100 produces electronic sound for a predetermined time by using a sounding body not shown to inform the photographer of the failing of the sight line calibration. At the same time, the CPU 100 supplies signals to the LCD driving circuit 105 to flicker "CAL" indication on the in-finder LCD 24 and the monitoring LCD 42 for warning (#340) (FIGS. 21A and 22A).

After the warning by sound produced by the sounding body and by display on the LCD 24 and 42 has been performed for a predetermined time, the process shifts to the initial step (#301) of the calibration routine to be ready for performing again the sight line calibration.

If the calculated calibration data are reliable (#332), the CPU 100 displays the termination of the calibration through the LCD driving circuit 105 and the LED driving circuit 106 (#33). The LED driving circuit 108 energizes the superimposing LED 21 to flicker the visual marks 1 and 2 several times, while the LCD driving circuit 105 supplies signals to the LCD 24 and 42 to display an "End-calibration No." indication for a predetermined time period (FIGS. 21B and 22B).

The CPU 100 sets n to 1 (#334), and stores the calculated sight line calibration data, the spectacle information of the photographer and the reliability of the calculated sight line calibration data at addresses on the EEPROM 100a corresponding to the currently set calibration data number (#335). At this time, if there are already stored sight line calibration data at the target address on the EEPROM, the calibration data are updated.

After a series of sight line calibrating operations are terminated, the camera remains in stand-by state until the electronic dial 45 or the mode dial 44 is operated by the photographer. When the photographer rotates the electronic dial 45 to select other calibration numbers the CPU 100 detects the change of the calibration number through the signal input circuit 104 (#336), and returns the process to the initial step (#301) of the sight line calibration routine. Furthers when the photographer rotates the mode dial 44 to select other photographic modes the CPU 100 detects the change of the photographic mode through the signal input circuit 104 to return the process to the main routine (#338).

At this times if the calibration data at the calibration number set by the electronic dial 45 is not input and the initial value remains, the CPU 100 resets the corresponding calibration data number to 0 and compulsorily sets to the sight line detection prohibited mode. Actually, the calibration data number currently set in the EEPROM of the CPU 100 is reset to 0 (sight line detection prohibited mode)

In this embodiment, the number n of the sight line detection times when the photographer turns his eyes at a single visual mark has been set to 10 for the sight line calibration, but n may be of any number larger than 10.

Although the calibration has been carried out with the different lightness of the finder, i.e. different diameters of the pupil, by controlling the stopping 31 of the photographic lens 1 in this embodiment, it is also possible to perform it by changing the light-emitting lightness of the superimposing LED 21 by covering the photographic lens by the photographer.

In this embodiment, the confirmation of the passing time by the timer is shown only in the flow diagrams of FIGS. 36 to 38 (#304), and is carried out at the time of confirming the state of the switch SW1 just before starting the sight line detection for the calibration (#314) (#322).

Figure 39:
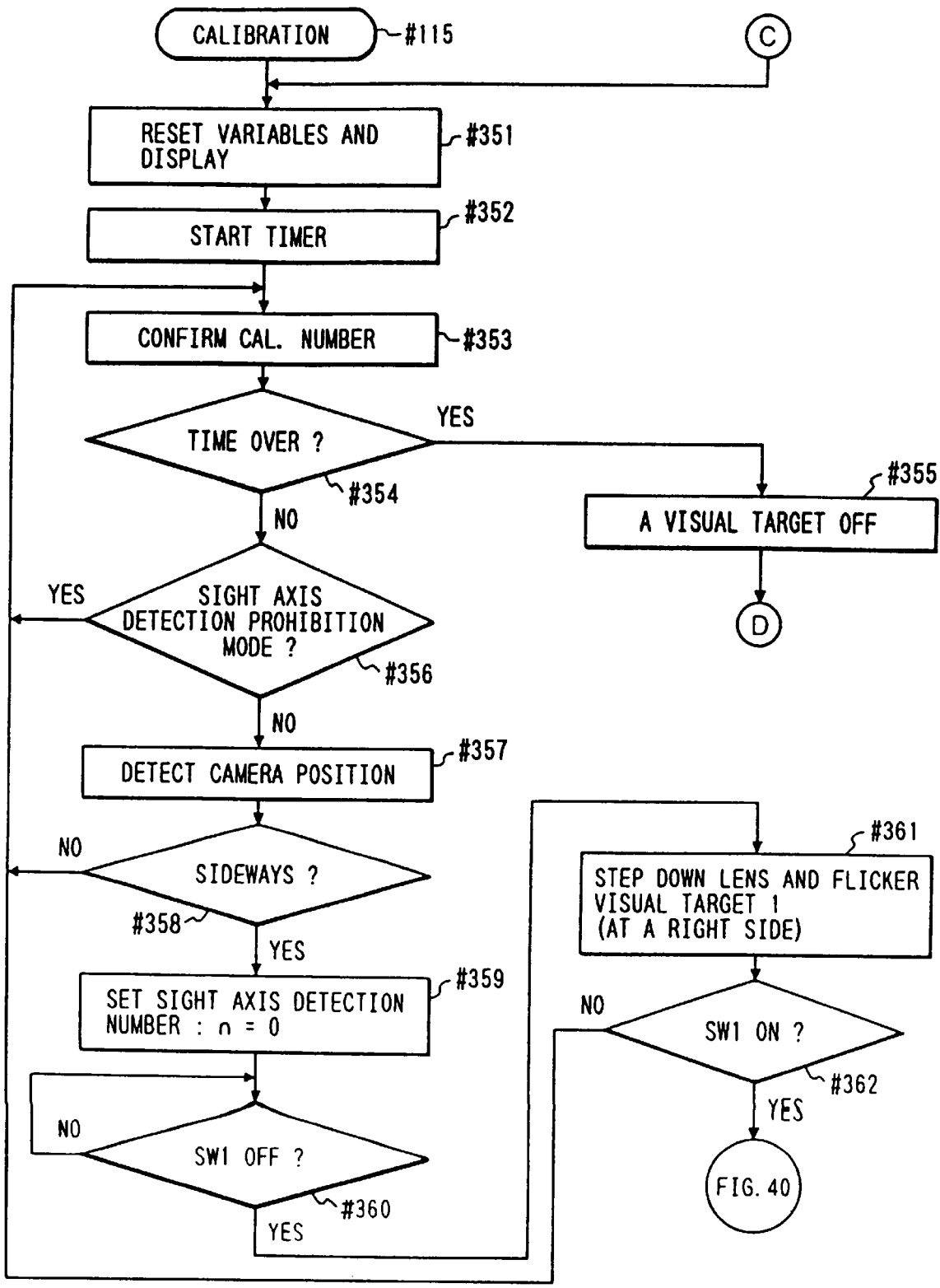
FIG. 39 is a pre-stage of a flow chart for a calibration according to a fourth embodiment.
Figure 40:
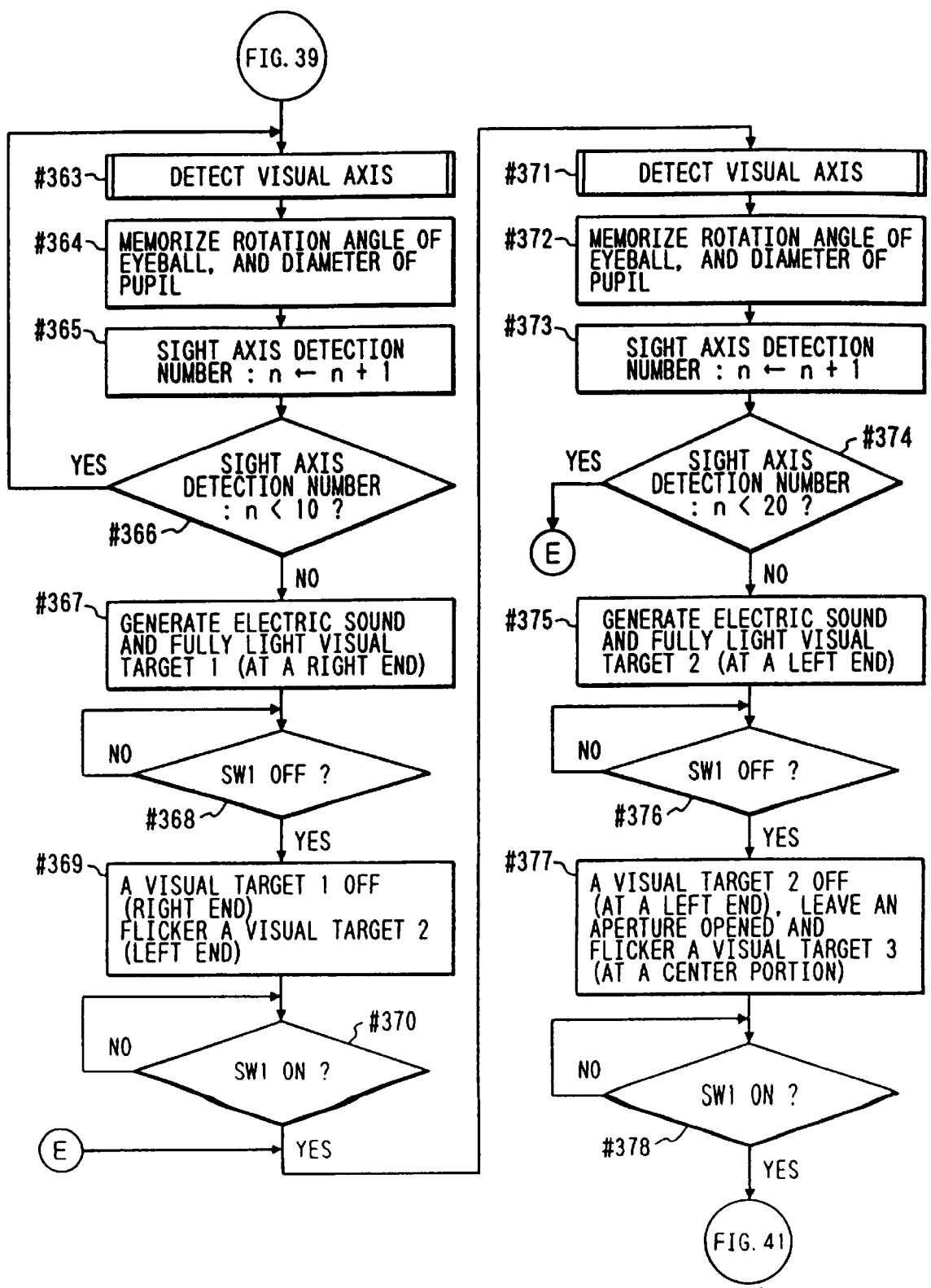
FIG. 40 is a mid-stage of a flow chart for a calibration according to the fourth embodiment.
Figure 41:
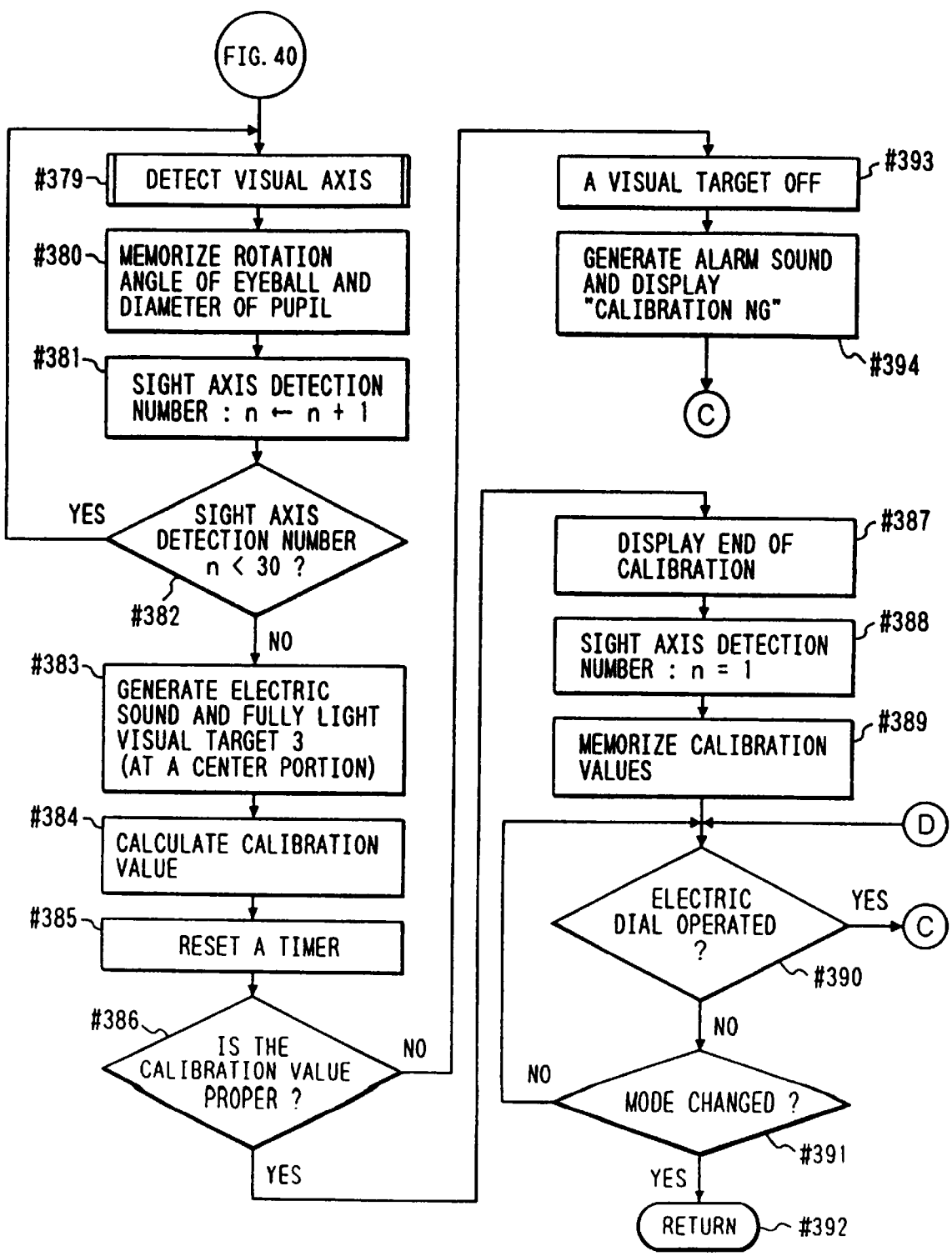
FIG. 41 is a post-stage of a flow chart for a calibration according to the fourth embodiment.

FIGS. 39 to 41 are flow diagrams for the calibration according to a fourth embodiment of the present invention. FIGS. 26A to 29C previously mentioned in the second embodiment are directly applied to this embodiment.

The present embodiment is different from the third embodiment in the sight line calibration method. FIGS. 39 to 41 are flow diagrams for the sight line calibration, FIGS. 26A to 29C show display state of the in-finder LCD 24 and the monitoring LCD 42 during the sight line calibration.

In this embodiment, the sight line calibration is carried out by detecting the sight line when the photographer turns his eyes at three visual marks with different lightness of the finder (observing surface). Thus, the calibration data corresponding to the pupil diameter of the photographer are calculated. The composition of the single-lens reflex camera, the flow diagrams of the camera operation and the sight line detection used in this embodiment are the same as those in the third embodiment so as to be omitted from explanation.

When the photographer rotates the mode dial 44 shown in FIGS. 2A and 4A to adjust the mark to the CAL position 44d, the sight line calibration mode is set. Then the signal input circuit 104 supplies signals to the LCD driving circuit 105 through the CPU 100, while the monitoring LCD 42 displays to indicate that any of the sight line calibration modes is started. The in-finder LCD 24 shown in FIG. 1 displays the "CAL" indication showing that the sight line calibration mode is started by use of seven-segment 73 at a region 207 out of the visual field of the finder. The CPU 100 resets the variables other than the calibration data stored in the EEPROM (#351). The kinds and the initial values of the calibration data stored in the EEPROM of the CPU 100 are as shown in Table 1.

The monitoring LCD 42 indicates the currently set calibration mode as shown in FIG. 17A. The calibration mode includes an "ON" state for performing the calibrating operation and an "OFF" state for not performing that.

In the "ON" state, there are prepared calibration numbers CAL1–CAL5 corresponding to the calibration data numbers 1–5, and the display is made by use of seven-segment 63 for indicating the stopping value and the seven-segment 62 for indicating the shuttering time. All the other fixed segment display portions 42a are turned off (in this embodiment, the state of the calibration data number 1 is shown with only the seven-segment display section being enlarged).

At this time, if the calibration data of the set calibration number has the initial value, the calibration number displayed on the monitoring LCD 42 flickers (FIG. 17B), while the calibration is already performed at the set calibration number. If there are already calibration data different from the initial value at the address on the EEPROM corresponding to the calibration number, the calibration number displayed on the monitoring LCD is fully lighted (FIG. 17A).

As a results the photographer can confirm whether the calibration data are already input at the currently set calibration number. The initial value of the calibration data number is set to 0. such that no sight line information is input unless the sight line calibration is carried out.

In the "OFF" state, meanwhile, the seven-segment 62 indicates "OFF" (FIG. 17C), and the calibration data number 0 is always selected to set the sight line detection prohibited mode.

Subsequently, the time provided in the CPU 100 starts thereby starting the sight line calibration (#352).

When the photographer rotates the electronic dial 45, the signal input circuit 104, having detected the rotation by the pulse signals as mentioned earlier, supplies signals to the LCD driving circuit 105 through the CPU 100. As a result, the calibration number displayed on the monitoring LCD 42 changes in synchronicity with the rotation of the electronic dial 45. This aspect is shown in FIG. 18.

Thus, when the photographer selects a desired calibration number from those displayed on the monitoring LCD 42, the CPU 100 confirms the corresponding calibration data number through the signal input circuit 104 (#353). The confirmed calibration data number is stored at a predetermined address on the EEPROM of the CPU 100.

Unless the confirmed calibration data number is changed, it is not stored in the EEPROM.

Subsequently, the CPU 100 confirms the photographic mode through the signal input circuit 104 (#354). When it is confirmed that the photographer rotates the mode dial 44 to change a photographic mode other than the sight line calibration mode (#354) the "CAL" indication on the in-finder LCD 24 is turned off and, if any, the flickering visual mark for the sight line calibration is lighted off (#355). and the process returns to the photographic operation of the cameras being the main routine (#392).

With the calibration data number "CAL1–5" being displayed, when the mode dial 44 is changed to other photographic mode (shutter preferential AE), the sight line detection is carried out by use of the data corresponding to that calibration number so as to perform the photographic operations based on the aforementioned sight line information. The state of the monitoring LCD 42 at this time is shown in FIG. 19, in which the sight line input mode display 61 in addition to the normal photographic mode is lighted to inform the photographer of the current sight line input mode for controlling the photographic operation on the basis of the sight line information.

Next, the CPU 100 counts the time having been passed from the start of the calibration mode (#354). If the counted time exceeds a predetermined time (e.g. four minutes), the visual mark for the sight line calibration in the finder is, if being lighted, turned off (#355), and the CPU 100 remains in stand-by state until the camera is newly operated by the photographer (#390). Meanwhile, if the counted time is within the predetermined time, the calibration is continued (#354). The timer incorporated into the CPU 100 is reset upon detection of the photographer's operation of the camera operational member.

When it is confirmed that the sight line calibration mode is remained to be set (#354), the calibration data number set by the electronic dial 45 is confirmed again (#356). At this time, if the calibration data number 0 is selected and the sight line detection prohibited mode is set, the calibration data number is stored again in the EEPROM of the CPU 100 (#353).

When the sight line detection is prohibited in the calibration mode, the camera remains in stand-by state until the mode is changed to a photographic mode other than the sight line calibration mode by the mode dial 44. Namely, if the mode dial 44 is switched with the "OFF" indication being displayed, the photographic operation is performed without detecting the sight line, and the sight line input mode display 61 on the monitoring LCD 42 is lighted off.

If the calibration data number is set to a value other than 0 (#356), the CPU 100 subsequently detects the position of the camera through the signal input circuit (#357). The signal input circuit 104 processes the output signals from the mercury switch 27 to determine whether the camera is laterally or longitudinally positioned, and if it is longitudinally positioned, whether the release button 41 for example is directed upwardly or downwardly.

Since the camera is generally used in lateral position, the hardware for the sight line calibration is also designed to enable the calibration when the camera is laterally positioned. Therefore, the sight line detecting circuit 101 does not perform the sight line calibration when informed of the camera position being not lateral by the CPU 100 (#358). For informing the photographer of the impossibility of performing the sight line calibration due to the non-lateral position of the camera, the CPU 100 flickers the "CAL" indication using the seven-segment in the in-finder LCD 24 provided in the finder of the camera. At this time, it may also be possible to produce warning sound by a sounding body not shown.

On the other hand, if it is detected that the camera is laterally positioned (#358), the CPU 100 sets n to 0 (#359). At this time if the "CAL" indication is flickering on the in-finder LCD 24, it is stopped. The sight line calibration is set to start upon turning on of the switch SW1. For preventing the calibration from starting at the camera side before the photographer is ready to perform the calibration, the CPU 100 confirms the state of the switch SW1 and remains in stand-by state until the switch SW1 is turned off when the switch SW1 is depressed by the release button 41 to be in ON state (#360).

When the CPU 100 confirms through the signal input circuit 104 that the SW1 is in OFF state (#360), the CPU 100 sets the stopping 31 of the photographic lens 1 to minimum. At this time, the photographer senses the darkened finder which expands his pupils. The CPU 100 supplies signals to the LED driving circuit 106 to flicker the visual mark for the sight line calibration (#361). The visual mark for the sight line calibration is partly used also as the detecting point mark such that the photographer can smoothly perform the calibration viewing the superimposed indication. Firstly the right-end detecting point mark 204 and the dot mark 206 flicker (FIG. 26A).

If ON signal of the switch SW1 as the trigger signal for starting the sight line calibration is not input yet, the camera remains in stand-by state (#362). When the photographer viewing the visual mark starting flickering depresses the release button 41 to turn on the switch SW1 (#362), the sight line detection is carried out (#363). The sight line detection is performed in the same manner as described with reference to the flow diagram shown in FIG. 9.

Dot marks 206, 205 and 207 are formed in the right-end detecting point mark 204, the left-end detecting point mark 200 and the central detecting point mark 202, representing that the calibration is performed at these three points. Each mark is illuminated by the superimposing LED 21 to make display by lighting, flickering, and lighting-off. Since the detecting point mark stands for the focus detecting region, this region should be displayed.

For more accurate calibration, the photographer preferably turns his eyes at only one point. The dot marks 205, 206 and 207 are designed to be smaller than the detecting point mark so that the photographer can easily concentrate on the single point.

The sight line detecting circuit 101 stores the rotational angle θx, θy, the pupil diameter rp and the reliability of the data which are variables from the sight line detection sub-routine (#364), and further counts up the number n of the sight line detection times (#365). Since the sight line of the photographer tends to be dispersed to a certain extent, it is preferable to perform several times of the sight line detection for one visual mark and to use the averaged value thereof. In this embodiment, n for one visual mark is set to 10. If n is less than 10 (#366), the sight line detection is continued (#363). If n is 10, the sight line detection for the visual mark 1 (detecting point mark 204, dot mark 206) is terminated (#366).

For informing the photographer of the termination of the sight line detection for the visual mark 1, the sight line detecting circuit 101 produces electronic sound several times by using a sounding body not shown through the CPU 100. At the same time, the sight line detecting circuit 101 fully lights the visual mark 1 through the LED driving circuit 106 (#367) (FIG. 26B).

Subsequently, the sight line detecting circuit 101 confirms whether the switch SW1 is turned off or on through the signal input circuit 104 (#368). If the switch SW1 is turned on, the circuit 101 remains in stand-by state until it is turned off, and if the switch SW1 is turned off, the visual mark 1 is lighted-off and at the same time the left-end visual mark 2 (detecting point mark 200, dot mark 205) starts flickering (#369) (FIG. 26C).

The CPU 100 confirms again through the signal input circuit 104 if the SW1 is turned on (#370). If the switch SW1 is turned off, the CPU 100 remains in stand-by state until it is turned on, and starts the sight line detection upon turning on of the switch SW1 (#371). The CPU 100 stores the rotational angle θx, θy of the eyeball, the pupil diameter rp and the reliability of the data which are variables from the sight line detection subroutine (#372). Further, the CPU 100 counts up the number n of the sight line detection times (#375). If n is less than 20 (#374), the sight line detection is continued (#371). If n is 20, the sight line detection for the visual mark 2 is terminated (#374).

For informing the photographer of the termination of the sight detection for the visual mark 20 the CPU 100 produces electronic sound several times using a sounding body not shown. At the same time, the CPU 100 fully lights the visual mark 2 through the LED driving circuit 108 (FIG. 27A).

Upon termination of the sight line detection for the visual marks 1 and 29 the sight line detection is further performed with different lightness of the finder (observing surface). The CPU 100 confirms the state of the switch SW1 through the signal input circuit 104 (#378). If the switch SW1 is turned on, the CPU 100 remains in stand-by state until it is turned off, while if the switch SW1 is turned off, the CPU 100 lights off the visual mark 2 (#377). At the same time, the CPU 100 supplies signals to the stopping driving circuit 111 for setting the stopping 31 of the photographic lens 1 to the opened state. At this time the photographer senses the increased lightness of the finder so as to reduce his pupil. Then the central visual mark 3 (detecting point mark 202, dot mark 207) starts flickering for obtaining the third sight line calibration data (#377) (FIG. 27B).

The CPU 100 confirms again through the signal input circuit 104 if the switch I is turned on (#378). If the switch SW1 is turned off, the CPU 100 remains in stand-by state until the switch SW1 is turned on, and starts performing the sight line detection upon turning on of the switch SW1 (#379).

The CPU 100 stores the rotational angle θx, θy of the eyeball, the pupil diameter rp and the reliability of the data which are variables from the sight line detection sub-routine (#380), and further counts up the number n of the sight line detection times (#381). If n is less than 30 (#382), the sight line detection is continued (#379). If n is 30, the sight line detection for the visual mark 3 is terminated (#382).

For informing the photographer of the termination of the sight line detection for the visual mark 2, the CPU 100 produces electronic sound several times by using a sounding body not shown. At the same time, the CPU 100 fully lights the visual mark 3 through the LED driving circuit 106 (#383) (FIG. 27C).

Subsequently, the sight line calibration data are calculated from the rotational angle θx, θy of the eyeball and the pupil diameter rp in the following manner (#384):

The coordinates of the visual marks 1, 2, and 3 on the focus plate 7 are represented by (x1, 0), (x2, 0), and (0, 0) respectively, the averaged values of the rotational angle (θx, θy) of the eyeball when the photographer turns his eyes at the visual marks stored in the sight line detecting circuit 101 are represented by (θx1, θy1), (θx2, θy2), and (θx3, θy3) respectively, and the averaged values of the light conducting diameter are represented by r1, r2, and r3 respectively.

(θx1, θy1), (θx2, θy2), and (θx3, θy3) represent averaged values of the rotational angle of eyeball detected when the photographer turns his eyes at the visual marks 1, 2, and 3, respectively. In the same manner, r1, r2, and r3 represent averaged values of the pupil diameter detected when the photographer turns his eyes at the visual marks 1, 2, and 3 respectively. The suffixes 1, 2 attached to the averaged value of the data represent that the data were obtained when the sight line was detected with dark state of the finder of the camera, while the suffix 3 represents that the data were obtained when the sight line was detected with light state of that.

The equations for calculating the sight line calibration data in the horizontal direction (x direction) vary depending on the pupil diameter at the-time of sampling the data as follows:

If $$(r1+r2)/2 > rx > r3, \quad (2\text{-}1)'$$

then $$k0 = -\{(\theta x1 + \theta x2)/2 - \theta x3\}/\{rx - r3\}$$

$$ax = (x1 - x2)/m/(\theta x1 - \theta x2)$$

$$b0x = -(\theta x1 - \theta x2)/2$$

If $$rx \geq (r1+r2)/2 > r3, \quad (2\text{-}2)'$$

then $$k0 = -\{(\theta x1 - \theta x2) - 2*\theta x3\}/\{(r1+r2) - 2*r3\}$$

$$ax = (x1 - x2)/m/\{\theta x1 - \theta x2 + k0*(r1 - r2)\}$$

$$b0x = -k0 * \{(r1+r2)/2 - rx\} - (\theta 1 + \theta 2)/2$$

The sight line calibration data in the vertical direction (y direction) are calculated as follows:

$$ky = -\{(\theta y1 + \theta y2) - 2*\theta y3\}/\{(r1+r2) - 2*r3\}$$

$$b0y = -ky*(r1+r2)/2 - (\theta y1 + \theta y2)/2$$

After-the sight line calibration data are calculated, or after the sight line detection is terminated, the time is reset (#385).

The sight line detecting circuit 101 also acting as a means for judging the reliability of the calibration data judges whether the calibration data are reliable (#386).

This judgment is made based on the reliability of rotational angle of the eyeball and the pupil diameter and the calculated sight line calibration data themselves which are variables from the sight line detection sub-routine. Namely, if the rotational angle of the eyeball and the pupil diameter having been detected by the sight line detection sub-routine are unreliable, the sight line calibration data are also judged as being unreliable. If the rotational angle of the eyeball and the pupil diameter detected by the sight line detecting sub-routine are reliable, the calculated sight line calibration data are judged to be reliable when being within a general range of personal errors while judge to be unreliable when being departed thereof. The CPU 100 judges not only whether the calculated sight line calibration data are reliable or unreliable, but also the degree of the reliability.

The degree of the reliability depends, of course, on the reliability of the rotational angle of the eyeball and the pupil diameter detected by the sight line detection sub-routine, etc. The reliability of the sight line calibration data are converted into two-bit numerical values depending on their degree and then stored in the EEPROM of the CPU 100.

When the calculated sight line calibration data are judged to be unreliable (#386) the LED driving circuit 106 stops energizing the superimposing LED 21 to turn off the visual mark 1 (#393). Further, the CPU 100 produces electronic sound for a predetermined time using a sounding body not shown for informing the photographer of the failing of the sight line calibration. At the same time, the CPU 100 supplies signals to the LCD driving circuit 105 to flicker "CAL" indication on the in-finder LCD 24 and the monitoring LCD-42 for warning (#394) (FIGS. 28A and 29A).

After warning by sound produced by the sounding body and by display on the LCD 24, 42 are performed for a predetermined time, the process is returned to the initial step (#351) of the calibration routine to be ready for the next sight line calibration.

If the calculated sight line calibration data are reliable (#386) the CPU 100 indicates the termination of the sight line calibration through the LCD driving circuit 105 and the LED driving circuit 106 (#387). The LCD driving circuit 106 energizes the superimposing LED 21 to flicker the visual marks 1, 2 and 3 several times, while the LCD driving circuit 105 supplies signals to the LCD 24 and the LCD 42 for displaying "End-Calibration No" for a predetermined time (FIGS. 28B and 29B).

The CPU 100 sets the number n of the sight line detection times to 1 (#388), and stores the calculated sight line calibration data, photographer's spectacle information and the reliability of the calculated sight line calibration data at the addresses on the EEPROM corresponding to the currently set calibration number (#389). If there are already sight line calibration data on those addresses on the EEPROM, the calibration data are updated.

After a series of aforementioned sight line calibration operation have been terminated, the camera remains in stand-by state until the electronic dial 45 or the mode dial 44 is operated by the photographer. When the photographer rotates the electronic dial 45 to select other calibration number, the CPU 100 detects the change of the calibration number through the signal input circuit 104 (#390), and returns the process to the initial step (#351) of the sight line calibration routine. Further, if the photographer rotates the mode dial 44 to select other photographic modes the CPU 100 detects the change of the photographic mode through the signal input circuit 104 (#391) to return the process to the main routine (#392).

If no calibration data are input at the calibration number having been set by the electronic dial 45 when the process returns to the main routine remaining in the initial values the CPU 100 resets the calibration data number to 0 so as to compulsorily set the sight line detection prohibited mode. In practices the CPU 100 resets the calibration data number currently set and stored on the EEPROM of the CPU 100 to 0 (sight line detection prohibited mode).

In this embodiments the number of sight line detection times is set to 10, but any number more than 10 may be used.

In this embodiment, the calibration is carried out with different lightness of the finder, i.e. different pupil diameter of the photographer, by controlling the stopping of the photographic lens. Alternatively, it is also possible to perform it by changing the light-emitting lightness of the superimposing LED 21 by covering the photographic lens by the photographer.

In this embodiment, the operation for confirming the passing time of the timer is shown only in the flow diagram (#354) in FIGS. 39, 40 and 41 for conveniences but practically it is, of course, carried out also when the state of the switch SW1 is confirmed (#370, #378) Just before starting the sight line detection for the calibration.

According to this embodiments the personal errors in detecting the sight line due to the lightness around the eyeball of the photographer or the change of the observing state are corrected by use of a properly set sight line detecting device so as to provide an optical apparatus having a sight line detecting device capable of performing highly accurate sight line detection.

In particulars by using the sight line detected by the sight line detecting device as function of the lightness around the eyeball of the photographer and the sight line correcting data, also by calculating the sight line correcting data for correcting the personal errors in detecting the sight line depending on the lightness around the eyeball of the photographer, it is possible to achieve an optical apparatus having a sight line detecting device capable of accurately detecting the sight line even when the photographer's observing state is changed.

Figure 42:
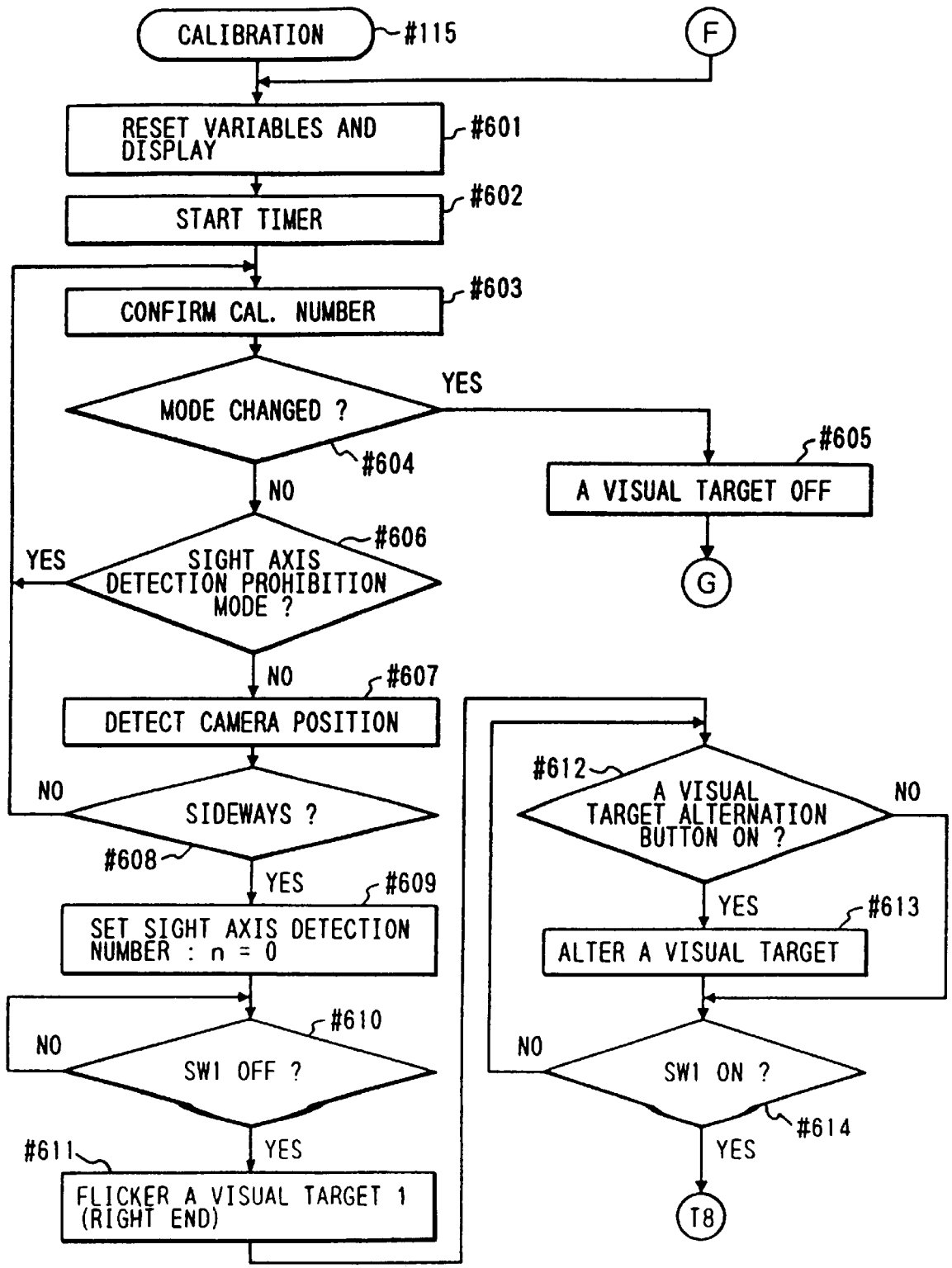
FIG. 42 is a pre-stage of a flow chart for a calibration according to a fifth embodiment.
Figure 43:
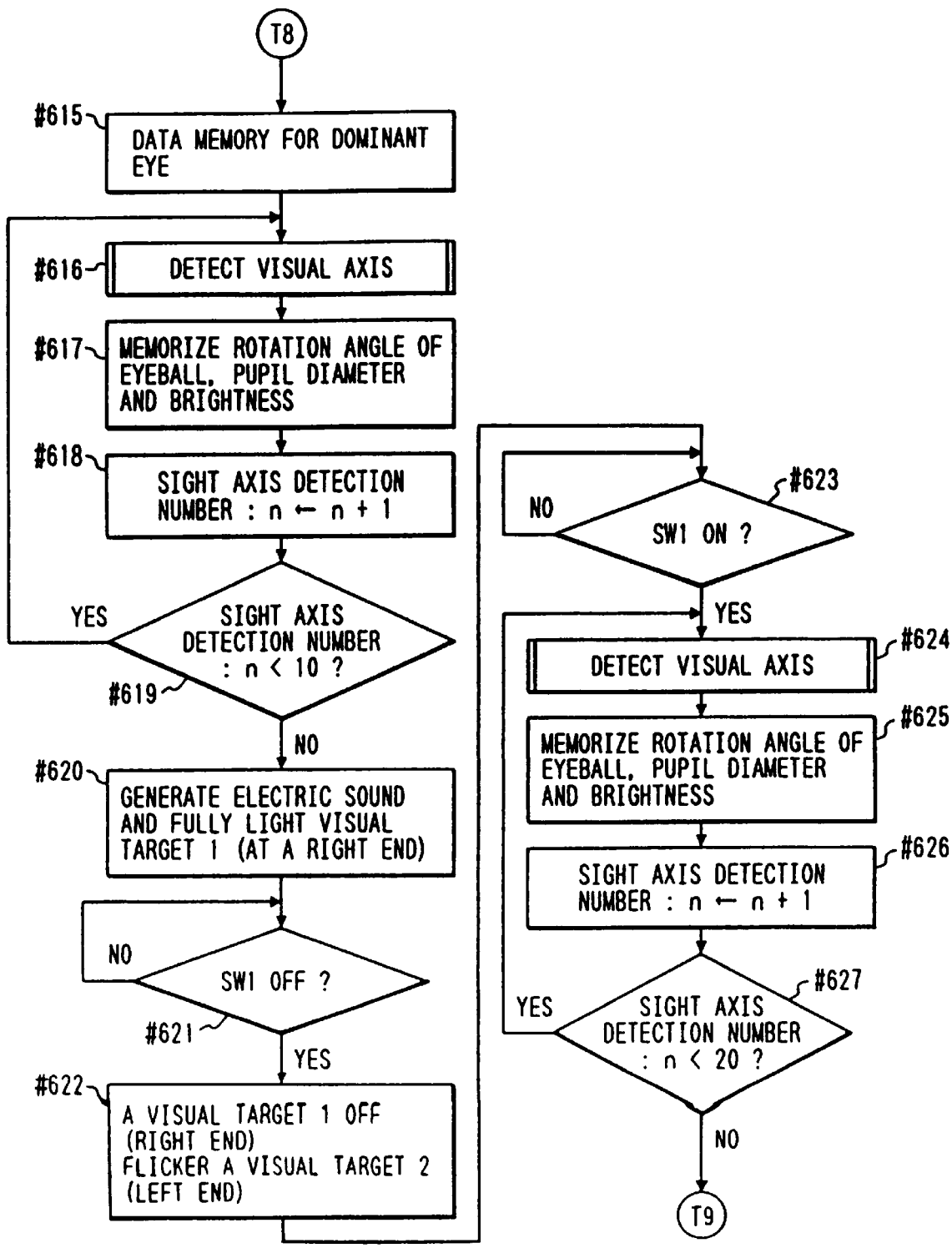
FIG. 43 is a mid-stage of a flow chart for a calibration according to the fifth embodiment.
Figure 44:
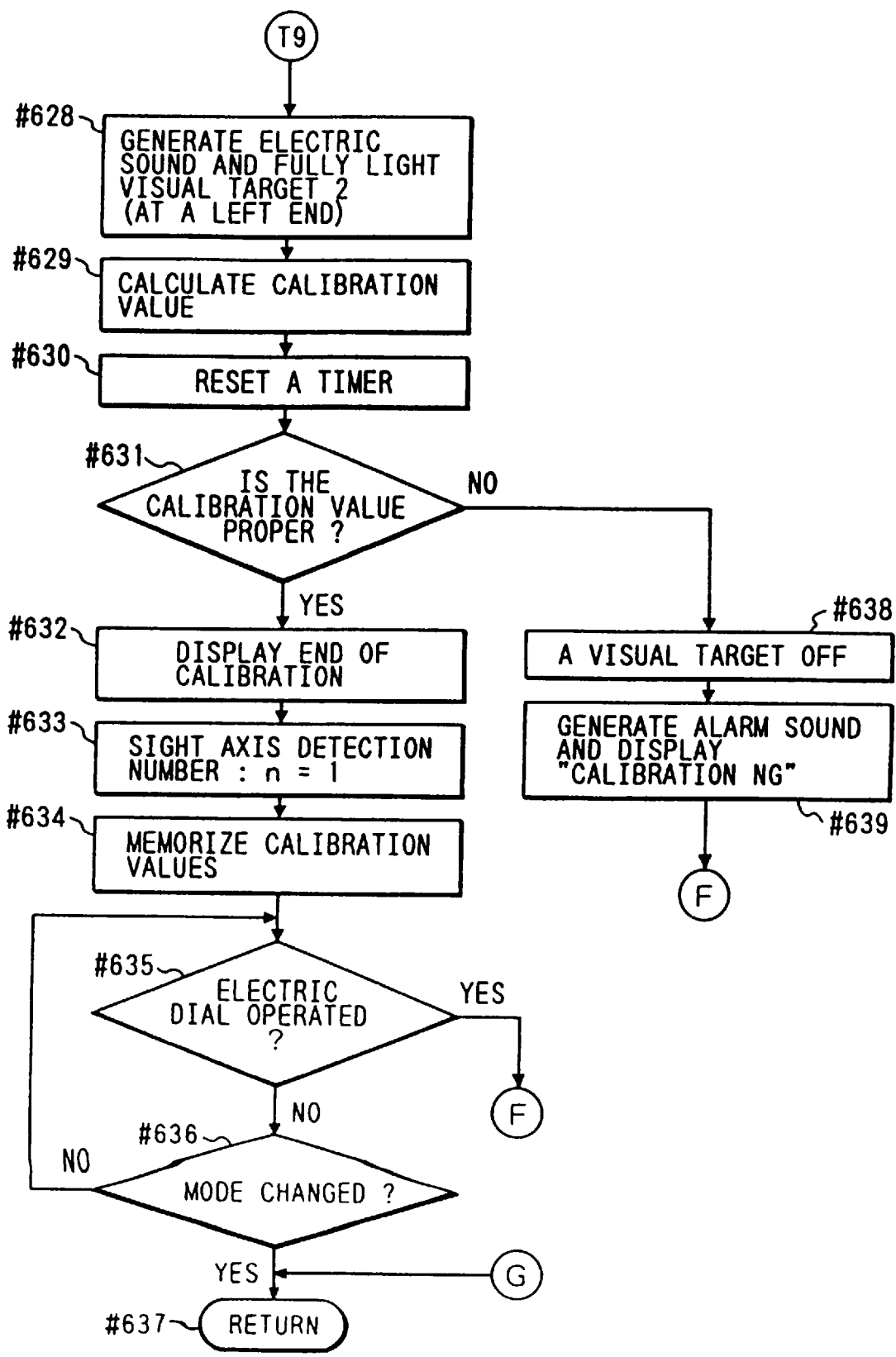
FIG. 44 is a post-stage of a flow chart for a calibration according to the fifth embodiment.

FIGS. 42 to 44 are flow diagrams for the sight line calibration according to another embodiment of the present invention. The calibration method in this embodiment is different from that in the first embodiment. Table 2 shows kinds of the calibration data and their initial values.

TABLE 2

| DATA NO. OF CALI- BRATION | ax | b0x | b0y | A DOMIN- ANT EYE | SPEC- TACLES | RELI- ABILITY |
|---|---|---|---|---|---|---|
| 0 | — | — | — | — | — | — |
| 1 | 1 | 0 | 0 | 0 | 1 | 0 |
| . | . | . | . | . | . | . |
| . | . | . | . | . | . | . |
| . | . | . | . | . | . | . |
| L | 1 | 0 | 0 | 0 | 1 | 0 |

In this embodiment, the sight line calibration is carried out by detecting the sight line when the photographer turns his eyes at two visual marks at a desired lightness. The composition of the single-lens reflex camera used in this embodiment, the flow diagram of the camera operation and the sight line detection, and the display method of the visual marks etc. in this embodiment are the same as those in the first embodiment to as to be omitted from illustrating.

When the photographer rotates the mode dial 44 shown in FIGS. 2A and 4A to adjust the mark to the CAL position 44d, the sight line calibration mode is set. The signal input circuit shown in FIG. 68 then supplies signals to the LCD driving circuit 105 through the CPU 100, while the monitoring LCD 42 indicates that any of the sight line calibration modes is being performed. The CPU 100 resets the variables other than the calibration data stored in the EEPROM (#601).

The kinds and initial values of the calibration data stored in the EEPROM of the CPU 100 are shows in Table 2. Those practically stored in the EEPROM of the CPU 100 are the data surrounded by the thick lines in Table 2 which are a plurality of calibration data being administered by the currently set calibration data numbers and the calibration data numbers. The calibration data number 0 represents a mode for prohibiting the sight line detection.

The aforementioned sight line calibration data are stored at the addresses on the EEPROM corresponding to the calibration data numbers 1–5. The initial value of the calibration data is set to such a value that the sight line can be calculated with standard eyeball parameters.

There are also provided flags representing whether the photographer wears spectacles and the degree of the reliability of the calibration data. The initial value of the flag representing the presence or absence of the spectacles is set to "1", presence, while the initial value of the flag representing the reliability of the calibration data is set to "0", unreliable.

Further, a flag for determining a dominant eye of the photographer is provided. The initial value of the flag representing the dominant eye of the photographer is "0" (e.g. corresponding to the right eye, in the case of the left eye, it would be "1") which is stored at the time of sight line calibration in the same manner as the other flags.

The currently set calibration mode is displayed on the monitoring LCD 42 as shown in FIG. 17A. The calibration mode includes "ON" state for performing the calibration and "OFF" for not performing that.

In "ON" state, there are prepared calibration numbers CAL1–CAL5 to correspond to the calibration data numbers 1–5, and the display is made by use of the seven-segment 62 indicating the shuttering time and the seven-segment 63 for indicating the stopping value. All the other fixed segment display sections 42a are lighted off (in the shown embodiment, the state of the data number 1 is shown with only the seven-segment display section being enlarged).

At this time, if the calibration data of the set calibration data number is the initial value, the calibration number displayed on the monitoring LCD 42 flickers (FIG. 17B), while if calibration data are already stored at the set calibration number, the calibration number displayed on the monitoring LCD 42 is fully lighted (FIG. 17A).

As a result, the photographer can recognize whether the currently set calibration number already has the corresponding data or not. The initial value of the calibration data number is set to 0 such that sight line information is not input unless the sight line calibration is carried out.

The seven-segment 62 in "OFF" state indicates "OFF" (FIG. 17C) during which the calibration data number 0 is always selected to set the sight line detection prohibited mode. This would be useful to photograph with the sight line information input being prohibited for preventing misoperation due to erroneous sight line detecting position which would occur when the photographer is abruptly changed to another, e.g., in a commemorative photograph, as mentioned above.

The timer incorporated in the CPU 100 subsequently starts for starting the sight line calibration (#602). If no operation is carried out during a predetermined time period after the timer starts, the sight line detecting circuit 101 resets the currently set calibration data number to 0 for changing to the sight line detection prohibited (OFF) mode. If visual marks etc., for calibration are lighted in the finder, they are lighted off.

When the photographer rotates the electronic dial 45, the signal input circuit 104 having detected the rotation by the pulse signals as mentioned above supplies signals to the LCD driving circuit 105 through the CPU 100. As a result, the calibration number displayed on the monitoring LCD 42 would be changed in synchronicity with the rotation of the electronic dial 45. This state is shown in FIG. 18.

When the electronic dial 45 is rotated in the clockwise direction, the displayed number is changed in order as "CAL-1"-"CAL-2"-"CAL-3"-"CAL-4"-"CAL-5", and the photographer can store the calibration data at a desired one of the five calibration numbers by the calibrating operation mentioned later. In the state shown in FIG. 18, the calibration data are already stored in "CAL-1, 2, 3" while no calibration data in "CAL-4, 5" being remained with the initial value.

Further rotation by one click would make an "OFF" indication in which no calibration is performed and the sight line detection prohibited mode is set. Further more rotation by one click would return to "CAL-1". In this manner, the calibration numbers are cyclically displayed. When the rotation is made in the opposed direction, the directly opposed display to that shown in FIG. 18 would be made.

Thus, when the photographer viewing the calibration number displayed on the monitoring LCD 42 selects the desired calibration number, the sight line detecting circuit 101 confirms the corresponding calibration data number through the signal input circuit 104 (#603). The confirmed calibration data number is stored in the EEPROM of the CPU 100. If the confirmed calibration data number is not changed, it is not stored in the EEPROM.

The sight line detecting circuit 101 then confirms the photographic mode through the signal input circuit 104 (#604). When it is confirmed that the photographer rotates the mode dial 44 to change the mode to a photographic mode other than the sight line calibration mode (#604), the "CAL" display on the in-finder LCD 24 is turned off, and if a visual mark for the sight line calibration is flickering in the finder, it is also lighted off (#605), and the process returns to the photographic operation of the camera, being the main routine (#437).

With the calibration numbers "CAL–5" being displayed, when the mode dial is operated to set to another photographic mode (shutter preferential AE), the sight line detection is carried out using the data of that calibration number to enable the photographic operations using the aforementioned sight line information. The state of the monitoring LCD 42 at this time is shown in FIG. 19 where in addition to the normal photographic mode display, the sight line input mode display 61 is lighted to inform the photographer of the currently operating mode being the sight line input mode for controlling the photographic operation based on the sight line information.

When it is confirmed that the sight line calibration mode remains to be set (#604), the calibration number set by the electronic dial 45 is confirmed again (#606). At this time, if the calibration number 0 is selected and the sight line detection prohibited mode is set, the calibration data number is stored again in the EEPROM of the CPU 100 (#603). When the sight line detection is prohibited during the calibration mode, the camera remains in stand-by state until the mode is changed to a photographic mode other than the sight line calibration mode through the mode dial 44 by the photographer.

Namely, if the mode dial 44 is switched with "OFF" being displayed, the photographic operation is carried out without performing the sight line detection and the sight line input mode display 81 is lighted off on the monitoring LCD 42.

If the calibration data number is set to a value other than 0 (#606), the CPU 100 subsequently detects the position of the camera through the signal input circuit 104 (#607). The signal input circuit 104 processes the output signals from the mercury switch 27 to determine whether the camera, is laterally or longitudinally positioned, and in the case of being longitudinally positioned, it determines whether the release button 41 side is upwardly or downwardly directed.

Since the camera is generally used in a lateral position, the hardware for performing the sight line calibration is also designed to enable the calibration when the camera is laterally positioned. Therefore, when the sight line detecting circuit 101 is informed of the camera position not being lateral by the CPU 100, the sight line calibration is not carried out (#608). Further, the sight line detecting circuit 101, for informing the photographer of the impossibility of performing the sight line calibration due to the non-lateral position of the camera, flickers the "CAL" indication using the seven-segment 73 in the in-finder LCD 24 incorporated in the finder of the camera. At this time, it may also be possible to produce warning sound by a sounding body not shown.

On the other hand, if it is detected that the camera is laterally positioned (#608), the sight line detecting circuit 101 sets the number n of sight line detection times to 0 (#609). At this time, the in-finder LCD 24, if flickering "CAL" indication, is lighted off. The sight line calibration is set to start upon turning on of the switch SW1. For preventing the calibration from starting at the camera side before the photographer is ready to perform the calibration, the sight line detecting circuit 101 confirms the state of the switch SW1 and remains in stand-by state until the switch SW1 is turned off if the switch SW1 is depressed by the release button 41 and turned on (#410).

Upon confirming that the switch SW1 is turned off through the signal input circuit 104 (#610), the sight line detecting circuit 101 supplies signals to the LED driving circuit 106 for flickering the visual mark for the sight line calibration (#611). The visual mark for the sight line calibration is partly used also as a detecting point mark such that the photographer can smoothly perform the calibration by being guided by the superimposed indication mentioned later. Firstly, the right-end detecting point mark 204 and the dot mark 206 flicker (FIG. 20A).

In this embodiment, the camera can detect the dominant eye of the photographer from the direction of the visual mark at the time of starting the calibration. Namely, it is determined that if the dominant eye direction of the photographer and the flickering visual mark direction are not accorded (e.g. while the left eye of the photographer is viewing through the finder of the camera, the right side visual mark is flickering), the photographer should depress the AE lock button 43 acting also as a visual mark changing button for changing the flickering visual marks thereby starting the calibration.

When the right-side visual mark 1 starts flickering (#611), and the signal input circuit 104 detects that the photographer depresses the AE lock button 43 also acting as a visual mark changing button upon recognizing the flickering visual mark direction being different from the dominant eye direction (#612), the sight line detecting circuit 101 supplies signals to the LED driving circuit 106 to change the position of the flickering visual point (#613).

Further, the camera remains in stand-by state unless the ON signal of the switch SW1 being the trigger for starting the sight line calibration is input (#614).

If the right-side visual point 1 starts flickering (#611), and the photographer recognizing that the flickering visual point direction is accorded with the photographer's dominant eye direction does not depresses the AE lock button 43 (#612), the camera remains in stand-by state until the ON signal of the switch Sol being a trigger signal for starting the sight line calibration is input (#614).

If the photographer turning his eyes at the flickering visual mark depresses the release button 41 and turns on the switch SW1 (#614), the information of the flickering visual mark direction e.g. in the case of the visual mark 1, the information of "right" is stored at a predetermined address on the EEPROM as the photographer's dominant eye data (#615). Subsequently, the sight line detection is carried out (#616). The sight line detecting operations are the same as explained with reference to the flow diagram shown In FIG. 9.

Dot marks 206, 205 are formed in the right-end detecting point mark 204 and the left-end detecting point mark 200 representing that the calibration is carried out at these two positions, and both are illuminated by the superimposing LED 21 to light, light-off and flicker. Since the detecting point mark stands for the focus detection region, this region should be indicated.

For accurate calibration, the photographer should preferably turn his eyes only at one point. These dot marks 205 and 206 are sized to be smaller than the detecting point mark for enabling the photographer to easily concentrate on the single point.

The sight line detecting circuit 101 stores the rotational angle θx, θy of the eyeball, the pupil diameter rp and the reliability of the data which are variables from the sight line detection sub-routine (#617), and further counts up the number n of the sight line detection times (#618). Since the photographer's sight line tends to be somewhat dispersed, it is effective for obtaining accurate sight line calibration data to perform several times of the sight line detection for one visual mark and use the averaged value of the results. In this embodiment, the number n of the sight line detection times for one visual mark is set to 10. If n is less than 10 (#619), the sight line detection is continued (#616). If n is 10, the sight line detection for the visual mark 1 (detecting point mark 204, dot mark 206) is terminated (#619).

For informing the photographer of the termination of the sight line detection for the visual mark 1, the sight line detecting circuit 101 produces electronic sound several times by a sounding body not shown through the CPU 100. At the same time, the sight line detecting circuit 101 fully lights the visual mark 1 through the LED driving circuit 106 (#620) (FIG. 20B).

Subsequently, the sight line detecting circuit 101 confirms whether the switch SW1 is turned off or on through the signal input circuit (#621). If the switch SW1 is turned on, the camera remains in stand-by state until it is turned off, while if the switch SW1 is turned off, the visual mark 1 is lighted off and at the same time the left-end visual mark 2 (detecting point mark 200, dot mark 205 starts flickering (#622) (FIG. 20C)).

The sight line detecting circuit 101 confirms again through the signal input circuit 104 whether the switch SW1 is turned on or off (#623). If the switch SW1 is turned off, the sight line detecting circuit 101 remains in stand-by states until it is turned on for starting the sight line detection (#624). The sight line detecting circuit 101 stores the rotational angle θx, θy, the pupil diameter rp and the reliability of the data which are variables from the sight line detection sub-routine (#625), and further counts up the number n of the sight line detection times (#625). Further, if n is less than 20 (#627), the sight line detection is continued (#624). If n is 20, the sight line detection for the visual mark 2 is terminated (#627).

For informing the photographer of the termination of the sight line detection for the visual mark 2, the sight line detecting circuit produces electronic sounds several times by using a sounding body not shown through the CPU 100. At the same time, the sight line detecting circuit 101 fully lights the visual mark 2 through the LED driving circuit 106 (#628) (FIG. 20D).

Subsequently, the sight line calibration data are calculated from the rotational angle θx, θy and the pupil diameter rp stored in the sight line detecting circuit 101 (#629). The sight line calibration data are calculated in the manner described below.

The coordinates of the visual marks 1 and 2 on the focus plate 7 are represented by (x1, 0), (x2, 0), the averaged values of the rotational angle (θx, θy) of the eyeball when the photographer turns his eyes at the visual marks stored in the sight line detecting circuit 101 are represented by (θx1, θy1), (θx2, θy2), and the averaged values of the pupil diameter are represented by r1, r2.

(θx1, θy1) and (θx2, θy2) represent the averaged values of the rotational angle of eyeball detected when the photographer turns his eyes at the visual marks 1 and 2 respectively. In the same manner, r1 and r2 represent the averaged value of the pupil diameter detected when the photographer turns his eyes at the visual marks 1 and 2 respectively. The suffixes 1 and 2 represent to be data gained when the photographer turns his eyes at the visual marks 1 and 2 respectively.

The sight line calibration data in the horizontal direction (x direction) can be calculated as follows:

$$k0+\pm const.$$

$$ax=(x1-x2)/m/\{\theta x1-\theta x2+k0^*(r1-r2)\}$$

$$b0x=-k0\{(r1+r2)/2-rx\}-(\theta 1+\theta 2)/2$$

where |k0| constant. The code (+or −) for k0 depends on the photographer's dominant eye is right or left.

The sight line calibration data in the vertical direction (y direction) can be calculated as follows:

$$ky=0$$

$$b0y=-(\theta y1+\theta y2)/2$$

After the sight line calibration data are calculated, or after the sight line detection is finished, the timer is reset (#630).

The sight line detecting circuit 101, also acting as a means for judging the reliability of the calibration data, judges whether the sight line calibration data are reliable or unreliable (#340).

This judgment is carried out based on the reliability of the rotational angle of eyeball and the pupil diameter, and the sight line calibration data themselves. Namely, if the rotational angle of the eyeball and the pupil diameter having been detected by the sight line detection sub-routine are unreliable, the calculated sight line calibration data are also judged to be unreliable. In the case of the rotational angle of the eyeball and the pupil diameter are reliable, if the calculated sight line calibration data are within a general range of the personal error, they are judged to be reliable. Meanwhile, if the calculated sight line calibration data are departed from that range, the data are judged to be unreliable. The sight line detecting circuit 101 judges not only whether the data are reliable or unreliable, but also the degree of the reliability thereof.

The degree of the reliability depends on the rotational angle of the eyeball and the pupil diameter etc. detected by the sight line detection sub-routine. The reliability of the sight line calibration data is converted into a two-bit numerical value to be stored in the EEPROM of the CPU 100 as mentioned later.

When the calculated sight line calibration data are judged to be unreliable (#430), the LED driving circuit 106 stops energizing the superimposing LED 21 to turn off the visual mark (#638). Further, the sight line detection circuit 101 produces electronic sound by using a sounding body not shown for a predetermined time for warning of the failing of the sight line calibration. At the same time, it supplies signals to the LCD driving circuit 105 to flicker "CAL" indication on the in-finder LCD 24 and the monitoring LCD 42 for warning (#639) (FIGS. 21A and 22A).

After warning by sound produced by the sounding body and by display on the LCDS 24, 42 for a predetermined time, the process returns to the initial step (#601) of the calibration routine to be ready for performing the sight line calibration again.

If the calculated sight line calibration data are reliable (#631), the sight line detection circuit 101 displays the termination of the sight line calibration through the LCD driving circuit 105 and the LED driving circuit 106 (#632). The LED driving circuit 106 energizes the superimposing LED 21 to flicker the visual marks 1 and 2 several times, while the LCD driving circuit 105 supplies signals to the LCD 24, 42 to display an "End-Calibration No" display for a predetermined time (FIGS. 21B and 22B).

The sight line detection circuit 101 sets the number n of the sight line detection times to 1 (#633), and stores the calculated sight line calibration data, the spectacle information of the photographer, and the reliability of the calculated sight line calibration data at addresses on the EEPROM corresponding to the currently set calibration data numbers (#634). If there are already sight line calibration data at those addresses on the EEPROM, the data are updated.

After a series of sight line calibration have been completed the camera remains in stand-by state until the photographer operates the electronic dial 45 or the mode dial 44. When the photographer rotates the electronic dial 45 to select other calibration number, the sight line detection circuit 101 detects the change of the calibration number through the signal input circuit 104 (#635) to return the process to the initial step (#601) of the sight line calibration routine. If the photographer rotates the mode dial 44 to select other photographic mode, the sight line detection circuit 101 detects the change of the photographic mode through the signal input circuit 104 (#636) to return the process to the main routine (#637).

If no calibration data are input at the calibration number set by the electronic dial 45 at the time of returning to the main routine with the initial value, the sight line detection circuit 101 resets the calibration data number to 0 for compulsorily setting the sight line detection prohibited mode. In practice, the calibration data number currently set and stored in the EEPROM of the CPU 100 is reset to 0 (sight line detection prohibited mode).

In this embodiment, the data as to the dominant eye of the photographer are input by selecting the lighted visual mark in the finder by the photographer, but alternatively it may also possible to display the dominant eye information on the monitoring LCD and select it.

Further, in this embodiment the dominant eye information is detected such that the photographer depresses the visual mark changing button to select the visual mark in the same direction as that of his dominant eye, but alternatively it may also possible to employ a composition such that the camera alternately changes the position of the camera and detects the position of the visual mark for which the photographer started the sight line detection as the dominant eye side of the photographer.

According to this embodiment, the errors in detecting the sight line due to the personal difference in photographer's pupil diameter etc. or change of the observing conditions are corrected by a properly set sight line detecting device to provide an optical apparatus having a sight line detecting device capable of performing accurate sight line detection.

In particular, by setting the calculated sight line by the sight line detecting device as a function of the photographer's pupil diameter and the sight line correcting data, the sight line correcting data for correcting the personal errors in detecting the sight line are calculated in accordance with the photographer's pupil diameter so as to provide an optical apparatus having a sight line detecting device capable of accurately detect the sight line even when the photographer's observing conditions are varied.

If the position of the optical apparatus such as camera is longitudinal, the detection of the sight line correcting data by the sight line detecting means is controlled to provide high detection accuracy.

In particular, by prohibiting the detection of the sight line correcting data and warning the photographer of the impossibility of the sight line correcting-data detection by a warning means depending on the position of the camera, the sight line calibration can be smoothly performed.

By suitably using the sight line correcting data for correcting the-personal errors in detecting the sight line, high accuracy in detection can be assured.

In particular, it is possible to provide an optical apparatus having a sight line detection device performing excellent sight line detection by providing a sight line correcting means for correcting personal errors in detecting sight line due to the personal difference in the eyeball and a memory means for storing the sight line correcting data, the sight line correcting data being composed of a sight line correcting factor calculated by the sight line correcting means, reliability of the sight line correcting factor, and spectacle information whether the photographer wears spectacles, such that the camera (optical apparatus) can be accurately controlled by judging the reliability of the sight line information in accordance with the reliability of the sight line correcting factor, and selecting the position of the light source for illuminating the photographer's eyeball i.e. illuminating direction by the spectacle information contained in the sight line correcting data to prevent the reflected light from the spectacles from entering onto the image sensor.

By providing a sight line correcting means for correcting the personal errors in detecting the sight line due to eyeball difference between persons and a judging means for judging the reliability of the sight line correcting data, it is possible to achieve an optical apparatus having a sight line detecting device capable of correctly controlling the optical apparatus by determining the reliability of the sight line information from the reliability of the sight line correcting data and using the sight line information and the reliability thereof.

It is possible to attain an optical apparatus having a sight line detecting device capable of accurately detecting the sight line by providing a sight line correcting means for correcting the personal errors in detecting the sight line due to the eyeball difference by use of sight line correcting data, a memory means for storing the sight line correcting data, and a means for confirming the sight line correcting data stored in the memory means, the confirming means changing the sight line correcting data upon determining that the sight line correcting data e.g. the sight line correcting data set in the optical apparatus based on the spectacle information are unreliable.

It is possible to realize an optical apparatus having a sight line detecting device capable of preventing undesirable operation of the camera by providing a sight line correcting means for correcting the personal errors in detecting the sight line using sight line correcting data and a memory means for storing the sight line correcting data wherein the camera controlling operation is prohibited unless the photographer's sight line correcting data are not stored in the memory means.

It is possible to achieve an optical apparatus having a sight line detecting device capable of reducing the time required for the sight line detection by detecting the rotational angle of the optical axis of eyeball of a photographer, setting a reading region for a image sensor receiving light of the photographer's eye image for calculating the sight line of the photographer from the rotational angle, and performing empty reading for the regions other than the reading region of the image sensor.

Another embodiment of the "calibration" sub-routine will now be described with reference to FIGS. 45 to 50B, and Table 3.

Table 3 shows kinds and initial values of calibration data stored in the EEPROM 100a of the CPU 100. Those practically stored in the EEPROM 100a of the CPU 100 are the data surrounded by the thick line in Table 3 which are a plurality of currently set calibration data numbers and calibration data being administered by these numbers.

Figure 45:
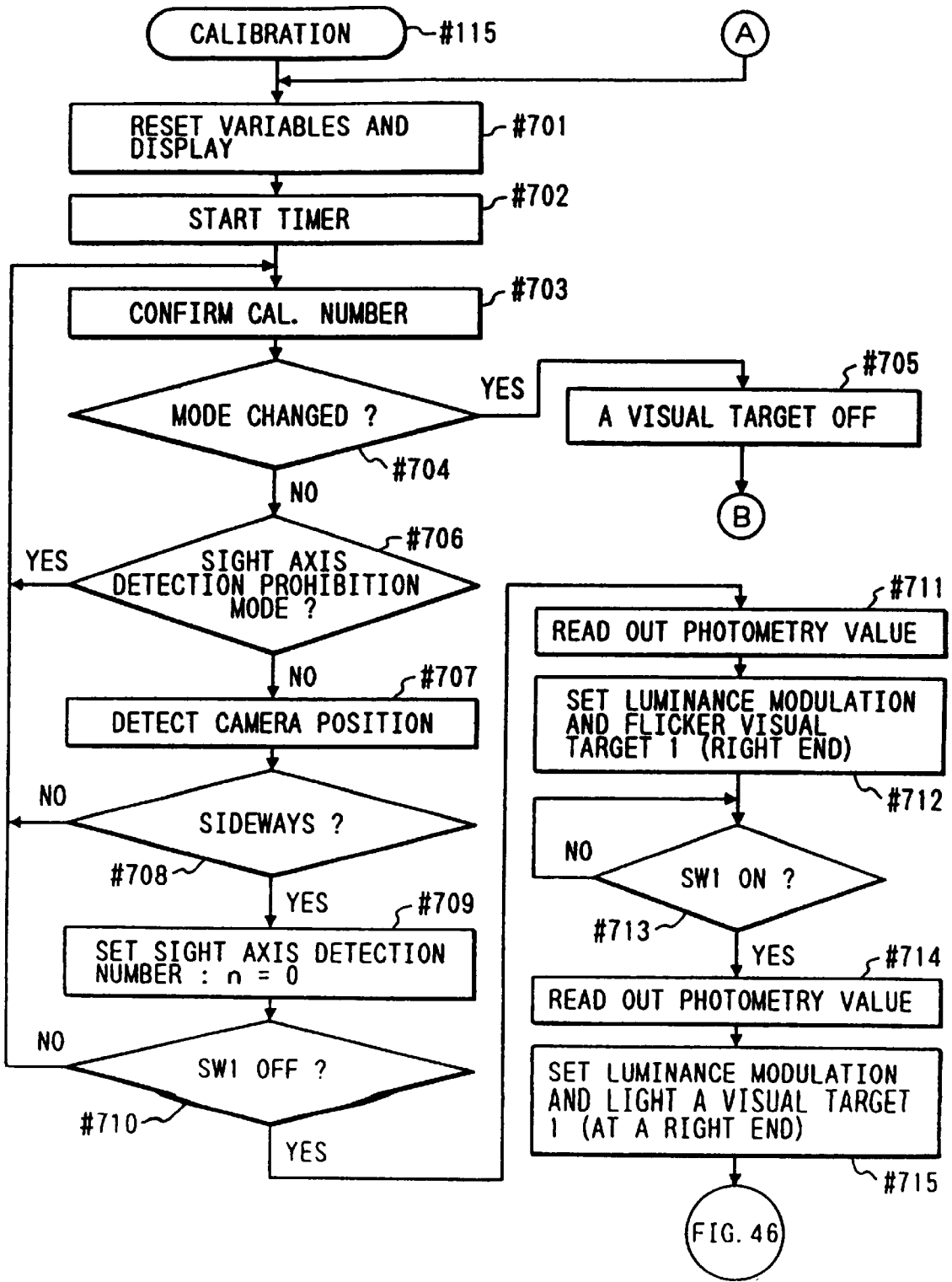
FIG. 45 is a pre-stage of a flow chart for a calibration according to a sixth embodiment.
Figure 46:
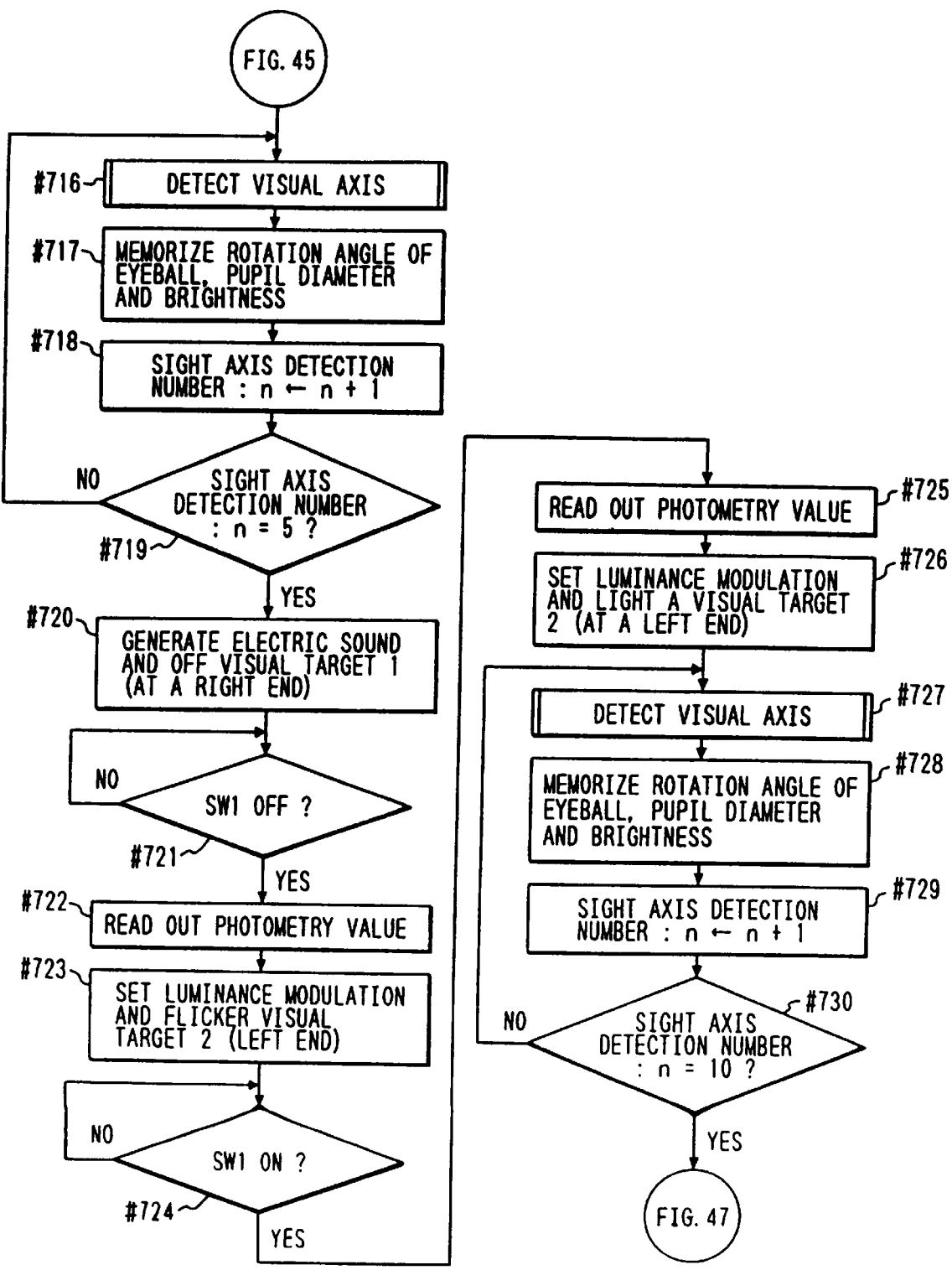
FIG. 46 is a mid-stage of a flow chart for the calibration according to the sixth embodiment.
Figure 47:
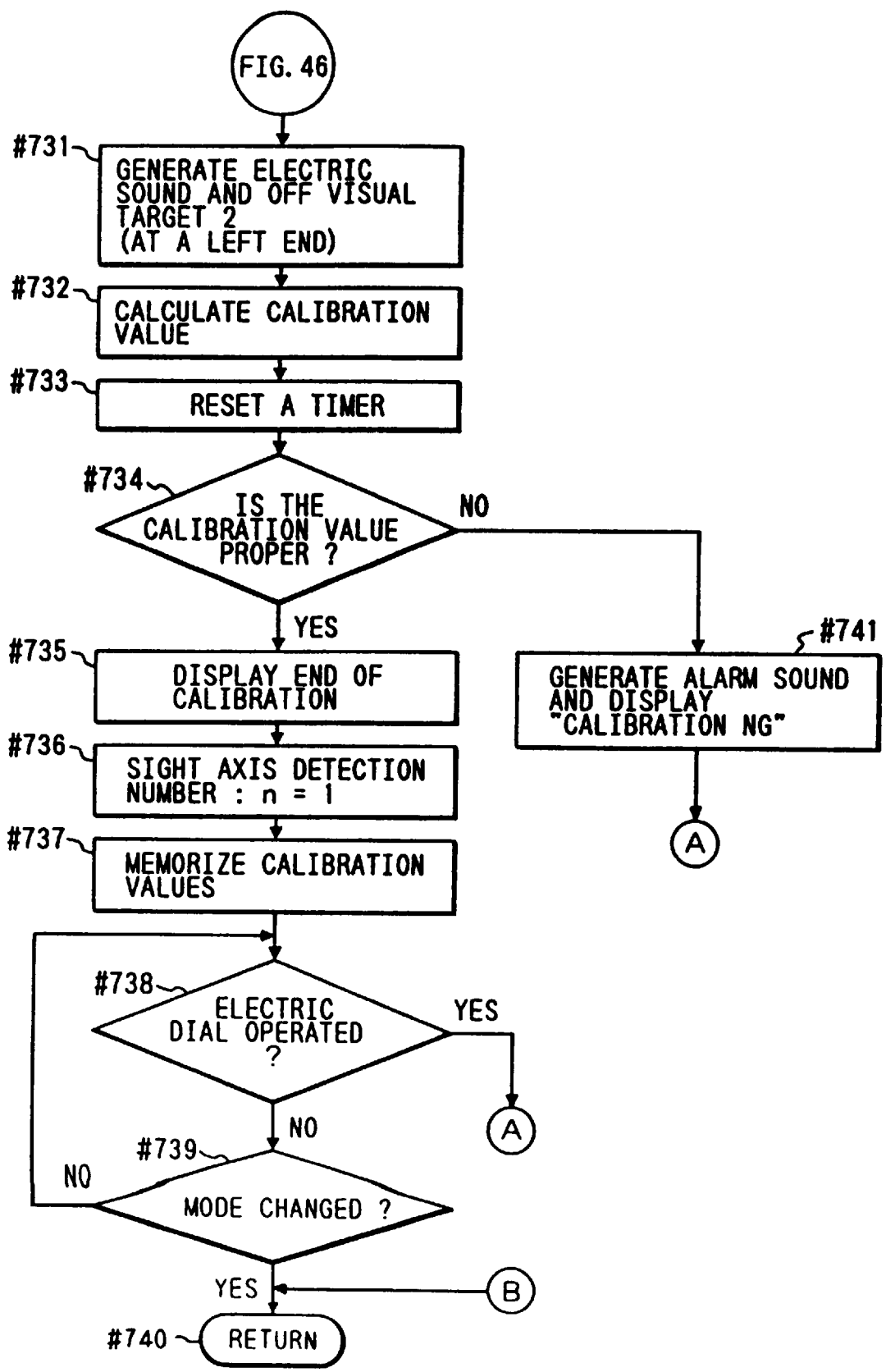
FIG. 47 is a post-stage of a flow chart for a calibration according to the sixth embodiment.

Steps 701–709 in FIG. 45 are totally corresponding to the steps 301–309 in FIG. 12 so as to be omitted in description.

TABLE 3

| CALIBRATION DATA NO. | ax | bx | cx | dx | by | cy | dy | spectacles | reliability |
|---|---|---|---|---|---|---|---|---|---|
| 0 | — | — | — | — | — | — | — | — | — |
| 1 | 0 | 0 | 0 | 0 | 0 | 0 | 0 | 1 | 0 |
| . | . | . | . | . | . | . | . | . | . |
| . | . | . | . | . | . | . | . | . | . |
| . | . | . | . | . | . | . | . | . | . |
| 5 | 1 | 0 | 0 | 0 | 0 | 0 | 0 | 1 | 0 |

Figure 48A:
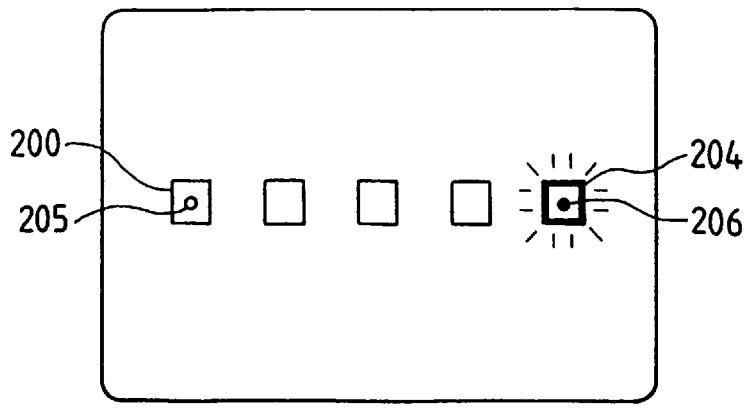
FIGS. 48A and 48B are explanatory views of a display state in the field of view of the finder.
Figure 48B:
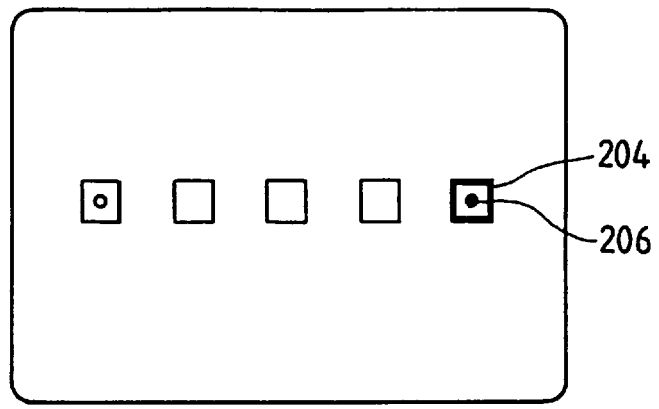

The sight detection circuit 101 confirms through the signal input circuit 104 whether the switch SW1 is turned off or on (#710). If the switch SW1 is turned on, the process returns to the previous step #303 to start again with confirming the calibration data number. If the switch SW1 is turned off, the output value of the photometric circuit 102 is read out (#711). The sight line detection circuit 101 supplies intensity-modulated signals set from the photometric value to the LED driving circuit 106 through the CPU 100 to flicker the right-end visual mark 1 (detecting point mark 204, dot mark 206) (#712) (FIG. 48A). Namely, the lightness of the visual mark 1 during flickering is changed depending on the lightness in the finder, in other words, the lightness of the visual mark 1 is increased as that in the finder increases, for always making easy-looking display.

The sight line detection circuit 104 confirms again through the signal input circuit 104 whether the switch SW1 is turned on (#713). If the switch SW1 is turned off, it remains in stand-by state until the switch SW1 is turned on. The sight detection circuit 101, upon turning on of the switch SW1, likewise the steps 711, 712, lights the visual mark 2 by the luminance-modulated signal set by the photometric value from the photometric circuit 102 (FIG. 48B) (#714, #715) to perform the sight line detection described with reference to FIG. 12 (#716).

Figure 50A:
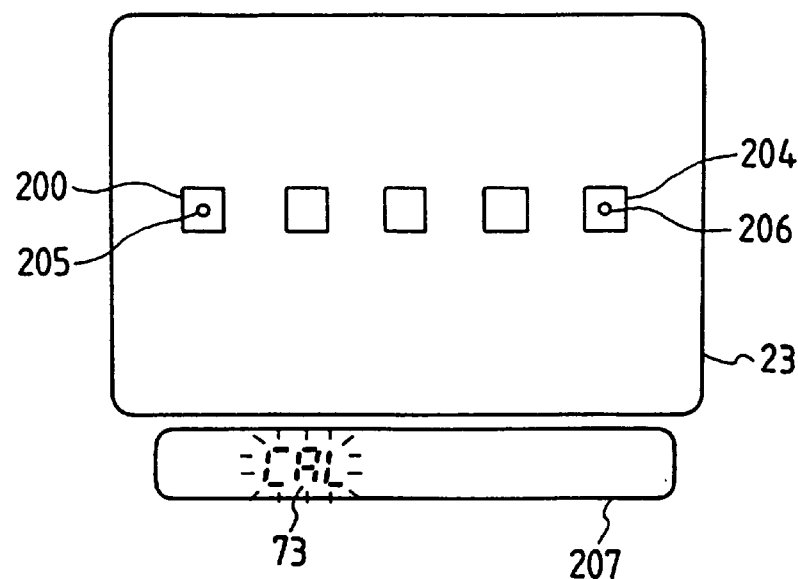
FIGS. 50A and 50B are explanatory views of a display state in the field of view of the finder.

Dot marks 205 and 206 are formed in the right-end detecting point mark 204 and left-end detecting point mark 200 in FIG. 50A in which the calibration is carried out. Both marks can be lighted, lighted off, and flickered by being illuminated by the superimposing LED. Since the detecting point mark represents the focus detection region, this region should be indicated.

For accurate calibration, the photographer should preferably turn his eyes only at one point. To this end, the dot marks 205 and 206 are sized to be smaller than the detecting point mark for enabling the photographer to easily concentrate on one point. The sight line detection circuit 101 stores the rotational angle θx, θy of the eyeball, the pupil diameter rp and the reliability of the data which are variables from the sight line detection sub-routine (#717).

Further, the number n of the sight line detection times is counted up (#718). Due to certain dispersion of the sight lines of the photographer, it would be effective to perform the sight line detection several times for one visual mark and to use the averaged value of the results thereof. In this embodiment, n is set to 5. If n is not 5, (#719), the sight line detection is continued (#716).

If n is 5, the sight line detection for the visual mark 1 (detecting point 204, dot mark 206) is terminated (#319). For informing the photographer of the termination of the sight line detection for the visual mark 1, the sight line detection circuit 101 produces electronic sound several times by using a sounding body 112 through the CPU 100. At the same time, the sight line detection circuit 101 lights off the visual mark 1 through the LED driving circuit 106 (#720).

Figure 49A:
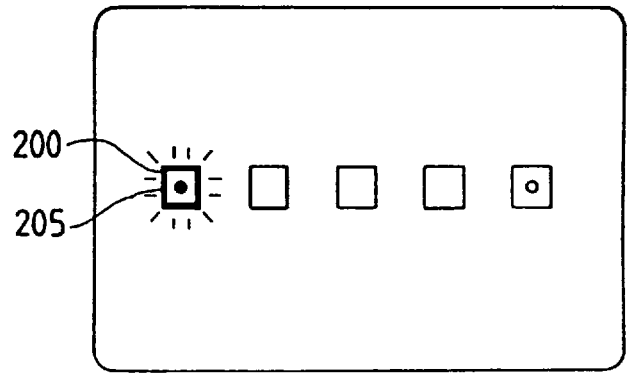
FIGS. 49A and 49B are explanatory views of a display state in the field of view of the finder.
Figure 49B:
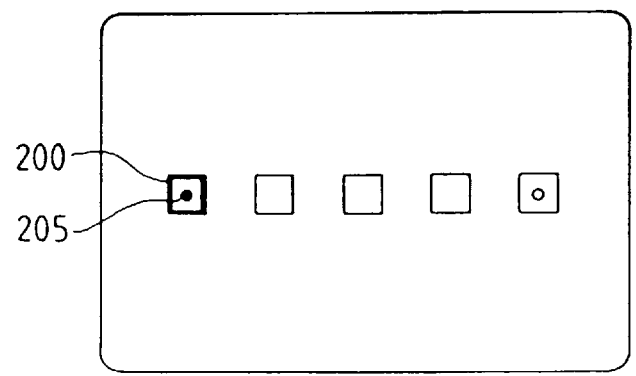

Subsequently, the sight line detection circuit 101 confirms whether the switch SW1 is turned off or on through the signal input circuit 104 (#721). If the switch SW1 is turned on, the sight line detection circuit 101 remains in stand-by state until it is turned off, while if the switch SW1 is turned off, the output value of the photometric circuit 102 is read out (#722). The sight line detection circuit 101 supplies luminance-modulated signals set from the photometric value to the LED driving circuit 106 through the CPU 100 to start flickering of the left-end flickering (detecting point mark 200, dot mark 205 (#723) (FIG. 49A).

The sight line detection circuit 101 confirms again through the signal input circuit 104 whether the switch SW1 is turned on or off (#724). If the switch SW1 is turned off, the circuit 101 remains in stand-by state until it is turned on, and upon turning on of the switch SW1, it lights the visual mark 2 by the luminance-modulated signals set from the photometric value obtained from the photometric circuit 102 (FIG. 49B) (#725, #728) to perform the sight line detection (#727).

The sight line detecting circuit 101 stores the rotational angle θx, θy, pupil diameter rp, and the reliability of the data which are variables from the sight line detection sub-routine (#728), and further counts up the number n of sight line detection times (#729). If n is not 10 (#730), the sight line detection is continued (#727). If n is 10, the sight line detection for the visual mark 2 is terminated (#730).

For informing the photographer of the termination of the sight line detection for the visual mark 2, the sight line detection circuit 101 produces electronic sound several times by using a sounding body 112 through the CPU 100. At the same time, the sight line detection circuit 101 lights off the visual mark 2 through the LED driving circuit 106 (#731).

The sight line calibration data are calculated from the rotational angle θx, θy and the pupil diameter rp stored in the sight line detection circuit 101 (#732), in the following manner.

The coordinates of the visual marks on the focus plate 7 are represented by (x1, 0), (x2, 0), averaged values of the rotational angle (θx, θy) of the eyeball when the photographer turns his eyes at the visual marks stored in the sight line detection circuit 101 are represented by (θx1, θy1), (θx2, θy2) respectively, and averaged values of the pupil diameter are represented by r1 and r2 respectively. (θx1, θy1) represent averaged values of the rotational angle of eyeball when the photographer turns his eyes at the visual mark 1, (θx2, θy2) represent averaged values of that when the photographer turns his eyes at the visual mark 2. In the same manners r1 and r2 represent averaged values of pupil diameter detected when the photographer turns his eyes at the visual marks 1 and 2 respectively.

The sight line calibration data in the horizontal direction (x direction) can be calculated as follows:

$$ax = 0$$

$$bx = m(\theta x1 - \theta x2)/(x1 - x2)$$

$$cx = 0$$

$$dx = (\theta x1 + \theta x2)/2$$

The sight line calibration data in the vertical direction (y direction) can be calculated as follows:

$$by = bx$$

$$cy = 0$$

$$dy = \theta y = (\theta y1 + \theta y2)/2$$

After the sight line calibration is calculated, or after the sight line detection is finished, the timer is reset (#723).

The sight line detection circuit 101, acting also as a means for judging the reliability of the calibration data, judges whether the calculated sight line calibration data are reliable or unreliable. This judgment is performed on the basis of the reliability of the rotational angle of eyeball and the pupil diameter which are variables from the sight line detection sub-routine and the sight line calibration data themselves.

Namely, if the rotational angle of the eyeball and the pupil diameter detected by the sight line detecting sub-routine are unreliable, the calculated sight line calibration data are also judged to be unreliable. Meanwhile, in the case of the rotational angle of the eyeball and the pupil diameter being reliable, if the calculated sight line calibration data are within a range of general personal error, they are judged to be reliable. On the other hand, if the data are departed from the range, they are judged to be unreliable.

The sight line detecting circuit 101 judges not only whether the calculated sight line calibration data are unreliable or reliable, but also the degree of the reliability of the calculated sight line calibration data. The degree of the reliability, of course, depends on the reliability of the rotational angle of the eyeball and the pupil diameter detected by the sight line detection sub-routine. The reliability of the sight line calibration data is then converted into two-bit numerical value depending on their degrees and stored in the EEPROM 100*a* of the CPU 100 as mentioned later.

Figure 50B:
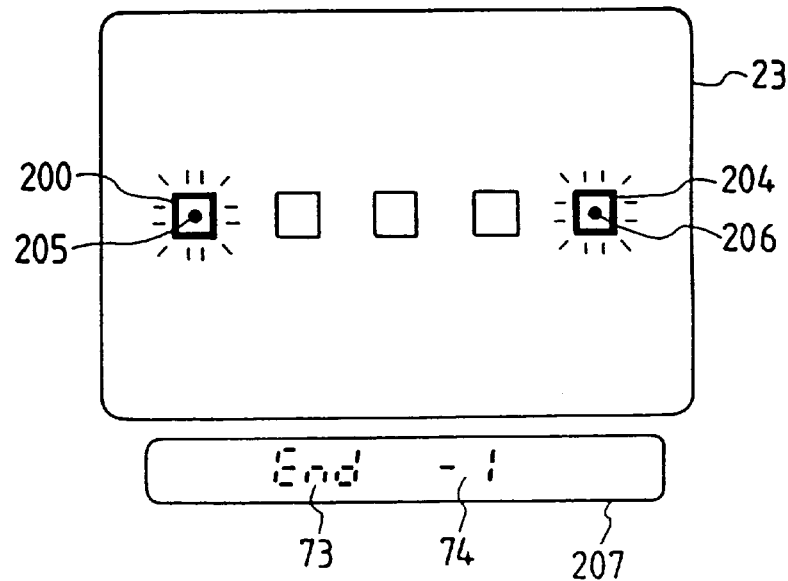

When the calculated sight line calibration data are judged to be unreliable (#734), the LED driving circuit 106 stops energizing the superimposing LED 21 to turn off the visual mark 1 and 2. The sight line detecting circuit 101 produces electronic sound several times using the sounding body 112 through the CPU 100 (i.e., drives the sounding body 112 with a period different from steps #720 and 731) for warning of the failed sight line calibration. At the same time, the sight line detection circuit 101 supplies signals to the LCD driving circuit 105 to flicker the "CAL" indication on the in-finder LCD 24 and the monitoring LCD 42 for warning (#741) (FIGS. 50A and 50B). After the warning by sound produced by the sounding body 112 and by display on the LCDS 24 and 42 has been performed for a certain time, the process returns to the initial step (#701) of the calibration routine to be ready for performing again the sight line calibration.

If the calculated sight line calibration data are reliable (#734), the sight line detection circuit 101 indicates the termination of the sight line calibration through the LCD driving circuit 105 and the LED driving circuit 106 (#735).

The LED driving circuit 106 energizes the superimposing LED 21 for flickering the visual marks 1 and 2 several times, while the LCD driving circuit 105 supplies signals to the LCD 24, 42 for displaying the "End-Calibration No" indication for a predetermined time (FIGS. 50A and 50B)

The sight line detection circuit sets the number n of sight line detection times to "1" (#734), and stores the calculated sight line calibration data, the spectacle information of the photographer and the reliability of the calculated sight line calibration data at addresses on the EEPROM corresponding to the currently set calibration data number (#337). At this time, if there are already sight line calibration data stored at that address on the EEPROM 100*a*, the data are updated.

After termination of a series of sight line calibrations, the camera remains in stand-by state until the photographer operates the electronic dial 45 or the mode dial 44. When the photographer rotates the electronic dial 45 to select other calibration number, the sight line detection circuit 101 detects the change of the calibration number through the signal input circuit 104 (#338), and returns the process to the initial step of the sight line calibration routine (#301).

Further, when the photographer rotates the mode dial 44 to select other photographic mode, the sight line detection circuit 101 detects the change of the photographic mode through the signal input circuit 104 (#339) and returns the process to the main routine (#340).

If no calibration data are input at the calibration number set by the electronic dial 45 on returning to the main routine with the initial value remained, the sight line detection circuit 101 resets the calibration data number to "0" for compulsorily setting to the sight line detection prohibited mode. Actually, the calibration data number currently set in the EEPROM 100*a* of the CPU 100 is reset to "0" (sight line detection prohibited mode).

In this embodiment, the number n of sight line detection times for one visual mark is set to 10, but any other number larger than 10 may also be used.

According to this embodiment, the photographer can quite readily recognize the proceeding state of the calibrating operation, since displayed state of the visual marks are varied (flickered, lighted, and lighted off) depending on the states i.e. when the photographer turns his eyes at the visual mark, when the correcting data are sampled (calibrating operation), and when the sampling of the correcting data are finished (calibrating operation termination), by providing at least two visual marks capable of lighting (including flickering) and lighting-off at different positions in the finder.

Further, the luminance of the flickering and lighting of the visual marks is modulated on the basis of the information obtained from the photometric circuit 102, and the lighting and the flickering are carried out with luminance depending on the lightness in the finder such that the photographer can easily recognize the position of the visual mark so as to enable to perform the calibration with high accuracy irrespective of the lightness in the finder.

Further, since the calibration is carried out using, in addition to the visual mark and the photographic information display (sight line input mark 78), the sounding body 112 for obtaining the correcting data, the flow of a series of the operations can be recognized more easily.

Further, since the failed calibration is warned by display or sound, the photographer can easily be aware of the failing of the calibration. In particular, if the electronic sound used for warning the failing is different from that at the termination of the calibration data detection, the effect would be enhanced.

As mentioned above, according to this embodiment, a display control means is provided for controlling the display means for changing the display state of the visual mark depending on the states that the photographer is turning his eyes at the visual marks, the correcting data are being sampled by the sight line correcting means, several times of correcting data sampling by the sight line correcting means is completed.

Thus, it is possible to enable the photographer to readily recognize the proceeding state of the sight line correcting operation.

Further, the lightness if the visual mark when lighting can be varied depending on the luminance of the effective region in the visual field in the finder by providing a photometric means for measuring the luminance at the effective region In the visual field in the finder, and a lighting luminance changing means for changing the lightness of the visual mark when lighting in accordance with the information from the photometric means.

In this manner, the visual mark in the visual field in the finder can be always positioned to be easily looked at.

There are provided a first display means having visual marks provided at least two positions in the visual field of the finder, a second display means having a photographic information display section for displaying the photographic information and provided out of the visual field of the finder, and a driving means for suitably driving the sounding means for externally producing sounds. A series of operational processes of the sight line correcting means is carried out by use of the visual mark, the photographic information and the sound produced by the sounding means.

As a result, the photographer can easily recognize the proceeding state of, the sight line correction operations.

Further, the display on the photographic information display section of the second display means is changed depending whether the correcting data have been obtained by the sight line correcting means or not, and the driving means is provided for varying the frequency of the sound generated in the sounding means. As a result, the display state on the photographic information display section and the sound generating period in the sounding means are changed depending whether the correcting data have been obtained by the correcting means or not, i.e., the sight line correcting operation has succeeded or failed.

What is claimed is:

1. An optical apparatus comprising:

detecting means for detecting rotation information of a human eye;

correcting data forming means, electrically connected to said detecting means, for forming correcting data as to personal differences of the human eye;

visual mark presenting means electrically coupled to said correcting data forming means for presenting a plurality of focus detecting frames for sampling information related to correcting data at different positions in a visual field and being capable of flickering and lighting without flickering, said visual mark presenting means selectively employing said lighting and said flickering before and after sampling the information; and control means for controlling said apparatus by using sight line information obtained on the basis of the rotation information and the correcting data.

2. An apparatus according to claim 1, wherein said visual mark Presenting means displays a visual mark for sampling the correcting data near the focus point detecting frame, wherein the visual mark is also capable of flickering and lighting.

3. An optical apparatus comprising:

detecting means for detecting rotation information of a human eye;

correcting data forming means, electrically connected to said detecting means, for forming correcting data as to personal differences of the human eye;

visual mark presenting means electrically coupled to said correcting data forming means for presenting a plurality of focus detecting frames for sampling correcting data at different positions in a visual field and being capable of flickering and lighting without flickering; and control means for controlling said apparatus by using sight line information obtained on the basis of the rotation information and the correcting data, wherein said visual mark presenting means selectively uses flickering and lighting, during and after sampling the correcting data.

4. An optical apparatus comprising:

detecting means for detecting rotation information of a human eye;

correcting data forming means, electrically connected to said detecting means, for forming correcting data as to personal differences of the human eye;

visual mark presenting means electrically coupled to said correcting data forming means for presenting a plurality of focus detecting frames for sampling correcting data at different positions in a visual field and being capable of flickering and lighting without flickering;

control means for controlling said apparatus by using sight line information obtained on the basis of the rotation information and the correcting data; and observing means for observing scenes and having an information display section in the vicinity of an observing visual field, wherein a series of operations for obtaining correcting data are shown by use of the visual mark and the display on said information display section.

5. An apparatus according to claim 4, wherein termination of the series of operations for obtaining the correcting data is displayed by use of said information display section.

6. An apparatus according to claim 4, wherein warning display is carried out by said information display section if the correcting data are not properly obtained.

7. An apparatus according to claim 4, wherein the display on said information display section is made to turn off while the correcting data are being sampled.

8. An optical apparatus comprising:

detecting means for detecting rotation information of a human eye;

correcting data forming means, electrically connected to said detecting means, for forming correcting data as to personal differences of the human eye;

visual mark presenting means electrically coupled to said correcting data forming means for presenting a plurality of focus detecting frames for sampling correcting data at different positions in a visual field and being capable of flickering and lighting without flickering;

control means for controlling said apparatus by using sight line information obtained on the basis of the rotation information and the correcting data;

means for measuring lightness of the visual field; and means for changing the lightness of the visual mark in accordance with the measured lightness of the visual field.

9. An apparatus according to claim 2, wherein said visual mark presenting means selectively uses flickering and lighting, during and after sampling the correcting data.

10. An apparatus comprising:

detecting means for detecting a state of rotation of an eye;

means for forming personal data used when a direction of a sight line of the eye is determined based on the detected state of rotation of the eye;

display means for displaying a visual mark for sampling information relating to the personal data at a position, wherein said display means either flickers the visual mark or lights the visual mark without flickering, and the flickering and the lighting is selectively performed before and after sampling the information relating to the personal data, wherein the personal data is formed based on the state of rotation of the eye when the sight line of the eye is directed to the visual mark.

11. An apparatus according to claim 10, wherein the visual mark is displayed at a plurality of mutually different positions.

12. An apparatus comprising:

detecting means for detecting a state of rotation of an eye;

means for generating personal data used when a direction of a sight line of the eye is determined based on the detected state of rotation of the eye;

first display means for displaying a visual mark for sampling information relating to the personal data at a position, wherein the personal data is formed based on the state of rotation of the eye when the sight line of the eye is directed to the visual mark; and second display means for displaying a process for sampling the information relating to the personal data.

13. An apparatus according to claim 12, wherein the visual mark is displayed at a plurality of mutually different positions.

14. An apparatus comprising:

detecting means for detecting a state of rotation of an eye;

means for generating personal data used when a direction of a sight line of the eye is determined based on the detected state of rotation of the eye;

display means for displaying a visual mark for sampling information relating to the personal data at a position within a view field, wherein said display means can either flicker the visual mark or light the visual mark without flickering and either of the flickering and the lighting is selectively performed before and after sampling the information relating to the personal data, wherein the personal data is formed based on the state of rotation of the eye when the sight line of the eye is directed to the visual mark;

detecting means for detecting lightness of the view field; and means for changing the lightness of the visual mark according to a detection result of said detecting means for detecting lightness of the view field.

15. An apparatus according to claim 14, wherein the visual mark is displayed at mutually different positions.

16. An optical apparatus comprising:

detecting means for detecting rotation information of a human eye;

correcting data forming means, electrically connected to said detecting means, for forming correcting data regarding personal differences of the human eye;

visual mark presenting means, electrically coupled to said correcting data forming means, for presenting a plurality of focus detecting frames for sampling information related to correcting data at different positions in a visual field and being capable of flickering and lighting without flickering, said visual mark presenting means selectively employing the lighting and the flickering before and during sampling the information; and control means for controlling said apparatus by using sight line information obtained on the basis of the rotation information and the correcting data.

17. An apparatus comprising:

detecting means for detecting a state of rotation of an eye;

means for forming personal data used when a direction of a sight line of the eye is determined based on the detected state of rotation of the eye;

display means for displaying a visual mark for sampling information relating to the personal data at a position, wherein said display means either flickers the visual mark or lights the visual mark without flickering, and the flickering and the lighting is selectively performed before and during sampling the information relating to the personal data, wherein the personal data is formed based on the state of rotation of the eye when the sight line of the eye is directed to the visual mark.

18. An apparatus comprising:

detecting means for detecting a state of rotation of an eye;

means for forming personal data used when a direction of a sight line of the eye is determined based on the detected state of rotation of the eye;

display means for displaying a visual mark for sampling information relating to the personal data at a position, wherein said display means either flickers the visual mark or lights the visual mark without flickering, and the flickering and the lighting is selectively performed before and after a start of sampling the information relating to the personal data, wherein the personal data is formed based on the state of rotation of the eye when the sight line of the eye is directed to the visual mark.

19. An apparatus comprising:

detecting means for detecting a state of rotation of an eye;

means for forming personal data used when a direction of a sight line of the eye is determined based on the detected state of rotation of the eye;

display means for displaying a visual mark for sampling information relating to the personal data at a position, wherein said display means either flickers the visual mark or lights the visual mark without flickering, and the flickering and the lighting is selectively performed during and after sampling the information relating to the personal data, wherein the personal data is formed based on the state of rotation of the eye when the sight line of the eye is directed to the visual mark.

20. An optical apparatus comprising:

detecting means for detecting rotation information of a human eye;

correcting data forming means, electrically connected to said detecting means, for forming correcting data regarding personal differences of the human eye;

visual mark presenting means, electrically coupled to said correcting data forming means, for presenting a plurality of focus detecting frames for sampling information related to correcting data at different positions in a visual field and being capable of flickering and lighting without flickering, said visual mark presenting means selectively employing the lighting and the flickering during and after sampling the information; and control means for controlling said apparatus by using sight line information obtained on the basis of the rotation information and the correcting data.

21. An optical apparatus comprising:

detecting means for detecting rotation information of a human eye;

correcting data forming means, electrically connected to said detecting means, for forming correcting data regarding personal differences of the human eye;

visual mark presenting means, electrically coupled to said correcting data forming means, for presenting a plurality of focus detecting frames for sampling information related to correcting data at different positions in a visual field and being capable of flickering and lighting without flickering, said visual mark presenting means selectively employing the lighting and the flickering before and after sampling the information; and control means for controlling said apparatus by using sight line information obtained on the basis of the rotation information and the correcting data.

22. An optical apparatus comprising:

detecting means for detecting rotation information of a human eye;

correcting data forming means, electrically connected to said detecting means, for forming correcting data regarding personal differences of the human eye;

visual mark presenting means, electrically coupled to said correcting data forming means, for presenting a plurality of focus detecting frames for sampling information related to correcting data at different positions in a visual field and being capable of flickering and lighting without flickering, said visual mark presenting means selectively employing the lighting and the flickering before and after a start of sampling of the information; and control means for controlling said apparatus by using sight line information obtained on the basis of the rotation information and the correcting data.

\* \* \* \* \*

UNITED STATES PATENT AND TRADEMARK OFFICE
CERTIFICATE OF CORRECTION

PATENT NO.   : 5,983,029
DATED        : November 9, 1999
INVENTOR(S)  : Akira Yamada, et al.

Page 1 of 6

It is certified that error appears in the above-identified patent and that said Letters Patent is hereby corrected as shown below:

Title page
At [63] Related US Application Data: "continuation-in-part" should read -- continuation --.

COLUMN 1
Line 7, "divisional" should read -- division --.

COLUMN 3
Line 63, "therefore," should be deleted.

COLUMN 4
Line 7, "corresponded" should read -- correspond --.
Line 24, "vies" should read -- view --.
Line 36, "i.e." should read -- i.e., --; and "this" should read -- but this --.

COLUMN 5
Line 49, "from" should read -- from a --.
Line 54, "ghost" should read -- a ghost --.
Line 63, "Undesirable" should read -- An undesirable --.

COLUMN 6
Line 14, "spectacles" should read -- spectacle --.
Line 17, "spectacles" should read -- spectacle --.
Line 37, "at" should read -- at an --.
Line 48, "e.g." should read -- e.g., --.

COLUMN 7
Line 1, "optical axis of" should read -- an optical axis of the --.
Line 9, "of" (first occurrence) should read -- of a --.
Line 10, "finder" should read -- the finder --.
Line 11, "sight" should read -- a sight --.
Line 16, "form" should read -- from --.
Line 19, "present particularly features to" should read -- particular features of the present situation --.
Line 20, "being" should be deleted.
Line 27, "function" should read -- functions. --.
Line 55, "photographer's" should read -- a photographers --.

UNITED STATES PATENT AND TRADEMARK OFFICE
CERTIFICATE OF CORRECTION

PATENT NO. : 5,983,029
DATED : November 9, 1999
INVENTOR(S) : Akira Yamada, et al.

It is certified that error appears in the above-identified patent and that said Letters Patent is hereby corrected as shown below:

COLUMN 12
Line 16, "dichloic" should read -- dichroic --.
Line 27, "15 is" should read -- 15) and is --.

COLUMN 14
Line 44, "e.g." should read -- e.g., --.

COLUMN 16
Line 62, "that" should read -- those --.

COLUMN 18
Line 50, "closet" should read -- closest --.
Line 53, "closet" should read -- closest --.
Line 54, "depth." should read -- depth --.

COLUMN 20
Line 20, "reading" should read -- read --.

COLUMN 23
Line 65, "can" should read -- can be --.

COLUMN 24
Line 42, "sun light" should read -- sunlight --.

COLUMN 25
Line 11, "number." should read -- numbers. --.

COLUMN 27
Line 19, "(#318)." should read -- (#318), --.

COLUMN 28
Line 7, "#314-#327" should read -- #314-#327 --.
Line 42, "represent that the data" should be deleted.

UNITED STATES PATENT AND TRADEMARK OFFICE
CERTIFICATE OF CORRECTION

PATENT NO. : 5,983,029
DATED : November 9, 1999
INVENTOR(S) : Akira Yamada, et al.

It is certified that error appears in the above-identified patent and that said Letters Patent is hereby corrected as shown below:

COLUMN 29
Line 33, "k0=-{(θx3+θx4)-(74 x1+θx2)}/{(L3+L4)-(L1+L2)}" should read
-- k0=-{(θx3+θx4)-(θx1+θx2)}/{(L3+L4)-(L1+L2)} --.
Line 65, "case of in" should be deleted.

COLUMN 31
Line 9, "depending" should read -- depending on --.
Line 12, "is shown" should be deleted.
Line 13, "operation)" should read -- operation) is shown --.

COLUMN 35
Line 33, "uses" should read -- use --.

COLUMN 37
Line 18, "date" should read -- data --.

COLUMN 39
Line 12, "OM" should read -- ON --.
Line 49, "a electronic" should read -- an electronic --.

COLUMN 40
Line 5, "(#374)D" should read -- (#374), --.
Line 22, "circuit III" should read -- circuit 111 --.
Line 45, "times" should read -- time, --.

COLUMN 41
Line 54, "Judged" should read -- judged --.

COLUMN 42
Line 6, "Furthers" should read -- Further, --.
Line 33, "that" should read -- the --.

COLUMN 43
Line 50, "Is" should read -- is --.

UNITED STATES PATENT AND TRADEMARK OFFICE
CERTIFICATE OF CORRECTION

PATENT NO.     : 5,983,029
DATED          : November 9, 1999
INVENTOR(S)    : Akira Yamada, et al.

It is certified that error appears in the above-identified patent and that said Letters Patent is hereby corrected as shown below:

COLUMN 44
Line 15, "44," should read -- 44d, --.
Line 22, "Table 1" should read -- Table 1 shows --.

COLUMN 45
Line 35, "Just" should read -- just --.

COLUMN 47
Line 37, "i.e." should read -- i.e., --.

COLUMN 49
Line 26, "Judgment" should read -- judgment --.
Line 41, "depends-on" should read -- depends on --.

COLUMN 50
Line 20, "Furthers" should read -- Further, --.
Line 21, "modes" should read -- mode, --.
Line 24, "times" should read -- time, --.
Line 30, "mode)" should read -- mode). --.
Line 36, "i.e." should read -- i.e., --.

COLUMN 51
Line 31, "results" should read -- result, --.

COLUMN 53
Line 10, "Firstly" should read -- Firstly, --.

COLUMN 54
Line 27, "Switch I" should read -- switch 1 --.

COLUMN 55
Line 3, "the-time" should read -- the time --.
Line 29, "b0x= -k0<{(rl+r2)/2-rx}-(θ1+θ2)/2" should read
-- b0x= -k0* {(rl+r2)/2-rx}-(θ1+θ2)/2--.

COLUMN 56
Line 46, "practices" should read -- practice, --.
Line 49, "embodiments" should read -- embodiment, --.
Line 60, "conveniences" should read -- convenience, --.

UNITED STATES PATENT AND TRADEMARK OFFICE
CERTIFICATE OF CORRECTION

PATENT NO.   : 5,983,029
DATED        : November 9, 1999
INVENTOR(S)  : Akira Yamada, et al.

It is certified that error appears in the above-identified patent and that said Letters Patent is hereby corrected as shown below:

COLUMN 56
Line 62, "Just" should read -- just --.
Line 64, "embodiments" should read -- embodiment, --.

COLUMN 57
Line 4, "particular" should read -- particular, --.
Line 49, "shows" should read -- shown --.

COLUMN 58
Line 65, "Further" should read -- Further, --.

COLUMN 60
Line 49, "Sol" should read -- SW1 --.

COLUMN 62
Line 15, "|k0 | constant." should read -- |k0 |: constant, --.
Line 62, "LCDS" should read -- LCDs --.

COLUMN 63
Line 40, "possible" should read -- be possible --.
Line 46, "possible" should read -- be possible --.
Line 64, "detect" should read -- detecting --.

COLUMN 64
Line 5, "correcting-data" should read -- correcting data --.
Line 9, "the-personal" should read -- the personal --.

COLUMN 67
Line 47, "(#734)." should read -- (#734), --.
Line 58, "LCDS 24" should read -- LCDs 24 --.

UNITED STATES PATENT AND TRADEMARK OFFICE
CERTIFICATE OF CORRECTION

PATENT NO.  : 5,983,029
DATED       : November 9, 1999
INVENTOR(S) : Akira Yamada, et al.

It is certified that error appears in the above-identified patent and that said Letters Patent is hereby corrected as shown below:

COLUMN 69
Line 12, "In" should read -- in --.
Line 30, "of," should read -- of --.
Line 33, "depending" should read -- depending on --.
Line 39, "depending" should read -- depending on --.
Line 61, "Presenting" should read -- presenting --.

COLUMN 70
Line 27, "control means" should read -- ¶control means --.

SHEET 36 OF THE DRAWINGS
In FIGURE 38, "TARGET 2 AT" should read -- TARGET 2 --.

Signed and Sealed this

Fourth Day of September, 2001

*Attest:*

NICHOLAS P. GODICI
*Attesting Officer*   *Acting Director of the United States Patent and Trademark Office*